(12) United States Patent
Sengupta et al.

(10) Patent No.: US 9,135,290 B2
(45) Date of Patent: Sep. 15, 2015

(54) ANALYZING TIME VARIATIONS IN A DATA SET

(71) Applicant: BeyondCore, Inc., San Mateo, CA (US)

(72) Inventors: Arijit Sengupta, San Mateo, CA (US); Brad A. Stronger, San Mateo, CA (US); Griffin Chronis, Mountain View, CA (US)

(73) Assignee: BeyondCore, Inc., San Mateo, CA (US)

( * ) Notice: Subject to any disclaimer, the term of this patent is extended or adjusted under 35 U.S.C. 154(b) by 0 days.

(21) Appl. No.: 14/672,031

(22) Filed: Mar. 27, 2015

(65) Prior Publication Data

US 2015/0205827 A1 Jul. 23, 2015

Related U.S. Application Data

(60) Continuation-in-part of application No. 14/328,705, filed on Jul. 11, 2014, which is a division of application No. 13/249,168, filed on Sep. 29, 2011, now Pat. No. 8,782,087, which is a continuation-in-part of application No. 12/944,554, filed on Nov. 11, 2010, now abandoned, which is a continuation of application No. 12/787,342, filed on May 25, 2010, now Pat. No. 7,849,062, which is a continuation-in-part of application No. 11/389,612, filed on Mar. 24, 2006, (Continued)

(51) Int. Cl.
*G06F 17/30* (2006.01)

(52) U.S. Cl.
CPC .... *G06F 17/30371* (2013.01); *G06F 17/30312* (2013.01)

(58) Field of Classification Search
CPC ................................ G06F 17/00; G06F 17/30
USPC .................................................. 707/600–899
See application file for complete search history.

(56) References Cited

U.S. PATENT DOCUMENTS

2003/0088320 A1* 5/2003 Sale ................................ 700/30
2006/0155410 A1* 7/2006 Yamartino .................... 700/108

*Primary Examiner* — Isaac M Woo
(74) *Attorney, Agent, or Firm* — Fenwick & West LLP

(57) ABSTRACT

Methods for analyzing and rendering business intelligence data allow for efficient scalability as datasets grow in size. Human intervention is minimized by augmented decision making ability in selecting what aspects of large datasets should be focused on to drive key business outcomes. Variable value combinations that are predominant drivers of key observations are automatically determined from several competing variable value combinations. The identified variable value combinations can then be then used to predict future trends underlying the business intelligence data. In another embodiment, an observed outcome is decomposed into multiple contributing drivers and the impact of each of the contributing drivers can be analyzed and numerically quantified—as a static snapshot or as a time-varying evolution. Similarly, differences in observations between two groups can be decomposed into multiple contributing sub-groups for each of the groups and pairwise differences among subgroups can be quantified and analyzed.

20 Claims, 59 Drawing Sheets
(57 of 59 Drawing Sheet(s) Filed in Color)

Related U.S. Application Data now Pat. No. 7,844,641, which is a continuation-in-part of application No. 11/084,759, filed on Mar. 18, 2005, now Pat. No. 7,720,822, said application No. 13/249,168 is a continuation-in-part of application No. PCT/US2011/037956, filed on May 25, 2011, application No. 14/672,031, which is a continuation-in-part of application No. 13/310,783, filed on Dec. 4, 2011, and a continuation-in-part of application No. 13/190,377, filed on Jul. 25, 2011, which is a continuation-in-part of application No. 13/103,883, filed on May 9, 2011, now abandoned, which is a continuation-in-part of application No. 11/286,080, filed on Nov. 23, 2005, now Pat. No. 7,940,929, application No. 14/672,031, which is a continuation-in-part of application No. 13/080,603, filed on Apr. 5, 2011.

ANALYZING TIME VARIATIONS IN A DATA SET

CROSS-REFERENCE TO RELATED APPLICATION(S)

This application is a continuation-in-part of U.S. patent application Ser. No. 14/328,705, "Analyzing large data sets to find deviation patterns," filed Jul. 11, 2014 [case 26649]; which is a division of U.S. patent application Ser. No. 13/249,168 (U.S. Pat. No. 8,782,087) filed Sep. 29, 2011; which is a continuation-in-part of U.S. patent application Ser. No. 12/944,554 (U.S. Pat. No. 7,933,878) filed Nov. 11, 2010; which is a continuation of U.S. patent application Ser. No. 12/787,342 (U.S. Pat. No. 7,849,062) filed May 25, 2010; which is a continuation-in-part of U.S. patent application Ser. No. 11/389,612 (U.S. Pat. No. 7,844,641) filed Mar. 24, 2006; which is a continuation-in-part of U.S. patent application Ser. No. 11/084,759 (U.S. Pat. No. 7,720,822) filed Mar. 18, 2005. U.S. patent application Ser. No. 13/249,168 is also a continuation-in-part of international application no. PCT/US 11/37956, filed May 25, 2011.

This application is also a continuation-in-part of U.S. patent application Ser. No. 13/310,783, "Analyzing data sets with the help of inexpert humans to find patterns," filed Dec. 4, 2011 [case 19915].

This application is also a continuation-in-part of U.S. patent application Ser. No. 13/190,377, "Secure distributed storage of documents containing restricted information, via the use of keysets," filed Jul. 25, 2011 [case 19329]; which is a continuation-in-part of U.S. patent application Ser. No. 13/103,883 filed May 9, 2011; which is a continuation-in-part of U.S. patent application Ser. No. 11/286,080 (U.S. Pat. No. 7,940,929) filed Nov. 23, 2005.

This application is also a continuation-in-part of U.S. patent application Ser. No. 13/080,603, "Automatically optimizing business process platforms," filed Apr. 5, 2011 [case 18624].

The subject matter of all of the foregoing is incorporated herein by reference in their entirety.

BACKGROUND

The present invention relates to automated data analysis with the help of potentially untrained humans. In one aspect, it relates to leveraging structured feedback from untrained humans to enhance the analysis of data to find actionable insights and patterns.

Traditional data analysis suffers from certain key limitations. Such analysis is used in a wide variety of domains including Six Sigma quality improvement, fraud analytics, supply chain analytics, customer behavior analytics, social media analytics, web interaction analytics, and many others. The objective of such analytics is to find actionable underlying patterns in a set of data.

Many types of analytics involve "hypothesis testing" to confirm whether a given hypothesis such as "people buy more pizza when it is raining" is true or not. The problem with such analytics is that human experts may easily not know of a key hypothesis and thus would not know to test for it. Analysts thus primarily find what they know to look for. In our quality improvement work with Fortune 100 firms and leading outsourcing providers, we have often found cases where clear opportunities to improve a process were missed because the analysts simply did not deduce the correct hypothesis.

For example, in a medical insurance policy data-entry process, there were several cases of operators marking applicants as the wrong gender. These errors would often go undetected and only get discovered during claims processing when the system would reject cases such as pregnancy related treatment for a policy that was supposed to be for a man. The underlying pattern turned out to be that when the policy application was in Spanish, certain operators selected "Male" when they saw the word Mujer which actually means female. In three years of trying to improve this process, the analysts had not thought to test for this hypothesis and had thus not found this improvement opportunity. Sometimes analysts simply do not have the time or resources to test for all possible hypotheses and thus they select a small subset of the potential hypotheses to test. Sometimes they may manually review a small subset of data to guess which hypotheses might be the best ones to test. Sometimes they interview process owners to try to select the best hypotheses to test. Because each of these cases is subject to human error and bias, an analyst may reject key hypotheses even before testing it on the overall data. Thus, failure to detect or test for the right hypotheses is a key limitation of traditional analytics, and analysts who need not be domain experts are not very good at detecting such hypotheses.

Another limitation of traditional data analysis is the accuracy of the analysis models. Because the analysis attempts to correlate the data with one of the proposed models, it is critically important that the models accurately describe the data being analyzed. For example, one prospective model for sales of pizza might be as follows: Pizza sales are often correlated with the weather, with sporting events, or with pizza prices. However, consider a town in which the residents only buy pizza when it is both raining and there is a football game. In this situation, the model is unable to fit the data and the valuable pattern is not discovered. In one aspect of our invention, humans could recognize this pattern and provide the insight to the computer system.

A third limitation of traditional analysis is that the analysis is subject to human error. For example, many analysts conduct statistical trials using software such as SAS, STATA, or Minitab. If an analyst accidentally mistypes a number in a formula, the analysis could be completely incorrect and offer misleading conclusions. This problem is so prevalent that one leading analysis firm requires all statistical analyses to be performed by two independent analysts and the conclusions compared to detect errors. Of course, this is just one way in which humans can introduce error into the broad process of bringing data from collection to conclusion.

Finally, because humans cannot easily deal with large volumes of data or complex data, analysts often ignore variables they deem less important. Analysts may easily accidentally ignore a variable that turns out to be key. During an analysis of a credit card application process, it was found that the auditors had ignored the "Time at current address" field in their analysis as it was thought to be a relatively unimportant field. However, it turned out that this field had an exceptionally high error rate (perhaps precisely because operators also figured that the field was unimportant and thus did not pay attention to processing it correctly). Once the high error rate was factored in, this initially ignored field turned out to be a key factor in the overall analysis. Analysts also sometimes initially explore data to get a "sense of it" to help them form their hypotheses. Typically, for large datasets, analysts can only explore subsets of the overall data to detect patterns that would lead them to the right hypotheses or models. If they accidentally look at the wrong subset or fail to review a subset with the clearest patterns, they may easily miss key factors that would affect the accuracy of their analysis.

On the other hand, an emerging best practice in the world of business analytics is the practice of "crowdsourcing." This refers to tapping a large set of people (the "crowd") to provide insight to help solve business issues. For example, a customer might fill out a comment card indicating that a certain dress was not purchased because the customer could not find matching shoes. This can be a very valuable insight, but the traditional collection procedure suffers from several problems.

The first step in crowdsourcing is undirected social idea generation. Employees, customers, and others submit ideas and patterns that they have identified. Of course, any pattern that is not noticed by a human is not submitted and is therefore not considered in the analysis.

The next step is for someone to sort and filter all the submitted ideas. Because there are a large volume of suggestions, and it is impossible to know if the suggestions are valuable without further research, someone must make the decision on which ideas to follow up on. This can be based on how many times an idea is submitted, how much it appeals to the people sorting the suggestions, or any number of methods. The issue is that good ideas may be rejected and never investigated.

Once the selected ideas are passed to an analyst, he or she must decide how to evaluate the ideas. Research must be conducted and data collected. Sometimes the data is easily available, for example, if a customer suggests that iced tea sells better on hot days, the sales records can be correlated with weather reports. Sometimes the data must be gathered, for example, if a salesman thinks that a dress is not selling well due to a lack of matching shoes, a study can be performed where the dress is displayed with and without clearly matching shoes and the sales volumes compared. However, sometimes it is impossible to validate a theory because the corresponding data is not available.

Finally, the analysis is only as good as the analyst who performs it in the first place. An inexperienced analyst often produces much less useful results than an experienced analyst even when both work on the same data.

Thus there is a need for a solution which takes the strengths of the computer and the strengths of the humans and leverages both in a scalable manner. Such a solution could increase the effectiveness of analytics by decreasing the impact of human errors and human inability to select the correct hypotheses and models.

Further, there is a need for a scalable approach to crowdsourcing which does not suffer from the limitations of traditional crowdsourcing described above.

On the other hand, automated analysis also suffers from certain limitations. The software may not see that two different patterns detected by it are actually associated or be able to detect the underlying reason for the pattern. For example, in the policy data entry example described above, an automated analysis could detect that Spanish forms had higher error rates in the gender field but automated analysis may not be able to spot the true underlying reason. A human being however may suggest checking the errors against whether or not the corresponding operator knew Spanish. This would allow the analysis to statistically confirm that operators who do not know Spanish exhibit a disproportionately high error rate while selecting the gender for female customers (due to the Mujer=male confusion).

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The preferred embodiments of the invention will hereinafter be described in conjunction with the appended drawings provided to illustrate and not to limit the invention, wherein like designations denote like elements, and in which:

FIGS. 4A-4F are screen shots illustrating various advanced settings and options that allow a user to customize aspects of analysis, according to some embodiments.

FIGS. 5A-5C are screen shots illustrating the creation of a story by analyzing a data set, subject to the user's feedback (described above with reference to FIGS. 3 and 4), according to some embodiments.

FIG. 13 is a screen shot illustrating display of an underlying analysis method, according to some embodiments.

DESCRIPTION OF PREFERRED EMBODIMENTS

Introduction

Figure 1:
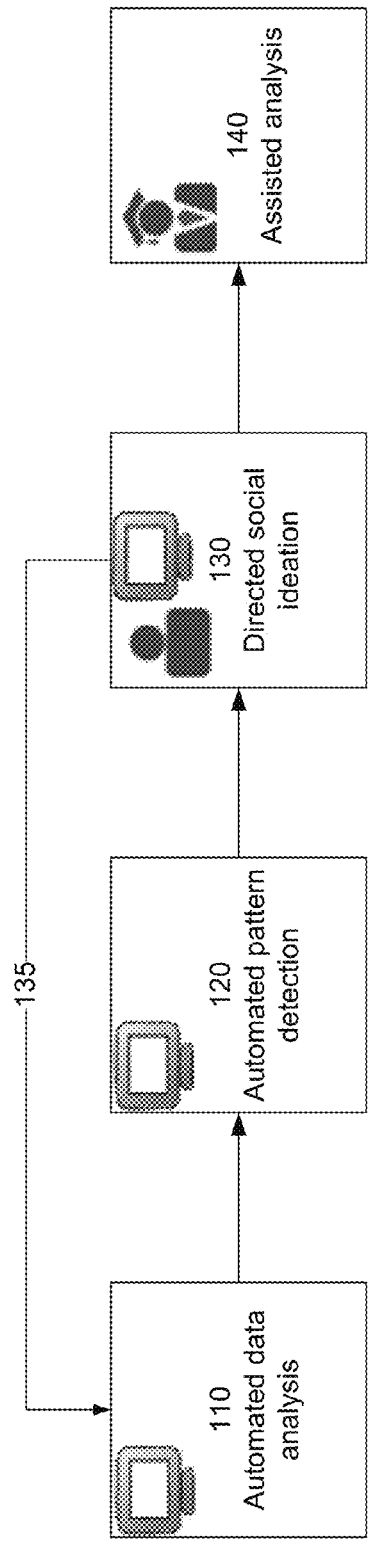
FIG. 1 is block diagram illustrating a combined computer/human approach to finding patterns and other actionable insights in large data sets.

FIG. 1 is block diagram illustrating a combined computer/human approach to finding patterns and other actionable insights in large data sets. For simplicity, most of the following discussion is in the context of finding meaningful patterns, but the principles illustrated can also be applied to identify other types of actionable insights. Steps 110 and 120 are largely based on automatic computer analysis. Step 130 is largely based on human analysis (e.g., crowdsourcing), preferably by relatively untrained humans. Optional step 140 is a more formal analysis, preferably by trained analysts, to test and refine the findings and suggestions of steps 110-130.

In this context, "untrained" means little to no training in the statistical principles underlying the search for actionable insights. The term "statistically untrained" may sometimes be used. Thus, in a conventional approach, statistical analysts review the data, form hypotheses and design and run statistically significant experiments to test their hypotheses. These statistical analysts will generally be "trained humans" or "statistically trained humans." On the other hand, consider a case where the process being examined is a loan underwriting process. Feedback may be solicited from humans ranging from data entry operators to those making final decisions on loan applications. These will generally be "untrained humans" or "statistically untrained humans" because they are not providing feedback on the statistical aspect of the search for actionable insights. Note that the term "untrained human" does not mean that these humans are unskilled. They may be highly trained in other areas, such as loan evaluation. They may even have enough training in statistics to play the role of a statistical analysis; they just are not playing that role in this context.

Steps 110 and 120 are the automatic analysis of large data sets and the automatic detection of potentially valuable and meaningful patterns within those data sets. We have previously disclosed multiple approaches to automatically analyzing data to detect underlying patterns and insights. Examples include U.S. Pat. No. 7,849,062 "Identifying and Using Critical Fields in Quality Management" that disclosed means to automatically detect underlying error patterns in data processing operations as well as pending patent application PCT/US2011/033489 "Identifying and Using Critical Fields in Quality Management" that disclose additional approaches to automatically analyzing data to detect underlying patterns. While some of these inventions were described in the context of data processing or human error patterns detection, the underlying methods are also applicable to a broad range of analytics. In U.S. patent application Ser. No. 13/249,168 "Analyzing Large Data Sets to Find Operator Deviation Patterns," we specifically disclosed approaches that allowed the automatic detection of subsets of data with high p-values indicating the high likelihood that the specific subset contained some underlying patterns and that the corresponding data distribution was unlikely to have been random. Thus, the underlying patterns have a higher chance of leading to meaningful actionable insights. These approaches can be applied to analyses including but not limited to customer segmentation (psychographics), sales analysis, marketing campaign optimization, demand forecasting, inventory/resource/supply chain optimization, assortment/product mix optimization, causal analysis, fraud detection, overbilling detection, and risk analysis. All of the foregoing are incorporated by reference herein.

The output of such automated analysis 110/120 can be further enhanced by the addition of manual feedback 130. Such feedback can be provided by statistically trained humans, however, certain types of extremely valuable feedback can be provided by statistically untrained humans. For example, a company's employees, customers, suppliers or even interested humans without special knowledge/experience may be able to provide valuable feedback that can enhance the automated analysis 110/120.

For example, in the policy data entry example described above, an automated analysis 110/120 could detect that Spanish forms had higher error rates in the gender field but automated analysis may not be able to spot the true underlying reason. A human being however may suggest 130 checking the errors against whether or not the corresponding operator knew Spanish. As indicated by the feedback arrow 135, this would allow the analysis 110/120 to statistically confirm that operators who do not know Spanish exhibit a disproportionately high error rate while selecting the gender for female customers (due to the Mujer=male confusion). In this way, actionable insights can be iteratively developed through a combination of computer analysis and statistically untrained human feedback.

One goal here is to minimize the need for expert knowledge, such as deep understanding of statistics, so that the scope of potential crowdsourcing contributors 130 is as broad as possible. At the same time, an additional goal is to make the opportunities for crowdsourcing feedback 135 sufficiently structured in nature, such that the overall process can be as automated as possible and does not require subjective human evaluation or processing of the crowdsourced feedback. A final optional goal is tying the crowdsourced feedback and the automated analytics tightly and interactively to the available data so that the analysis produces actionable insights backed by statistically valid evidence.

Automated Analysis

Various types of automated analysis have been described previously by the inventors. For example, in the context of document processing by operators, one goal may be to find documents that are similar in some way in order to identify underlying patterns of operator behavior. A search can be conducted for segments of the data which share as few as one or more similar field or parameter values. For example, a database of loan applications can be searched for applicants between 37 and 39 years of age. Any pair of applications from this sample might be no more similar than a randomly chosen pair from the population. However, this set of applications can be statistically analyzed to determine whether certain loan officers are more likely to approve loans from this section of the population.

Alternatively, it may not be necessary to find even one very similar parameter. Large segments of the population may be aggregated for analysis using criteria such as "applicants under 32 years old" or "applicants earning more than $30,000 per year." Extending this methodology one step further, a single analysis can be conducted on the sample consisting of the entire population.

In addition, it is possible to analyze sets of data which do not contain all of the information that the operators use to make decisions. In the case of loan applications requiring a personal interview, it would be very hard to conduct a controlled experiment that includes the personal interview. It would also be difficult to search for "similar" interviews. However, we can still search for applications with some parameters similar, and aggregate the statistics across all interviews. It may not be possible to identify any single loan decision as incorrect or suspect, but if, for example, among applicants aged 26-28, earning over $32,000, one loan officer approves 12% of loans and another approves 74% of loans, there may be training or other issues.

These methods can be combined to find a diverse variety of samples to analyze. A sample might consist of the documents with each field similar to a given value for that field, or it might comprise the set of all the documents. In addition, some fields may be restricted to a small or large range, where other fields have no restriction. Each sample may be analyzed with statistical methods to determine whether operators are processing documents consistently.

There are several statistical hypothesis tests which may be appropriate for making this determination. If the output of the process is binary, such as a loan approval, and the number of documents in the sample under analysis is small, a test such as Fisher's Exact Test may be used. If the output is a number, such as a loan interest rate, and the sample is large, a Chi-Square Test may be used. These tests can be used to determine whether one operator is producing significantly differing output from the remainder of the operators. Alternately, the operators can be split into two groups and these tests can be used to determine whether the operators in the two groups are producing significantly differing output. All possible splits can be analyzed to find the one with the highest statistical significance. Alternately, these tests can be used to determine simply whether the distribution of operator output for this sample is significantly more unusual than what would be expected under the null hypothesis, i.e., all operators making decisions in the same manner.

If numerous statistical tests are conducted, it is expected that some of them will be statistically significant, even without any underlying pattern. It is important to search for p-values which are more extreme than would normally be sought. For example, if 1000 tests are conducted, we could require a p-value of 0.00005 rather than the typical 0.05. Alternately, we can split the data into two sets of data: a training set and a testing set. We can conduct a large number of tests on the training data, but may find that our lowest p-values are not statistically significant due to the large number of tests conducted. We can then use the results to construct new hypotheses and design a small number of new tests. These new tests can be conducted on the testing data set. Because only a few tests are being conducted, we would not need very extreme p-values to achieve significance. Alternately, we can use the results as a starting point for any other review process, including supervisor review of indicated historic documents. Rules can potentially also be created to automatically flag documents from this segment of the population, as they are processed, for additional review.

Another method for computing the statistical significance of complicated test statistics is as follows. We are testing against the null hypothesis that all operators behave in the same manner. Disproving this null hypothesis means there is some statistically significant underlying pattern to the behavior of the operators. For statistics where operators are separated into multiple groups under a grouping plan, we can randomly assign operators into groups repeatedly under multiple different grouping plans and re-compute the test statistic for each grouping plan. If the value for a specific grouping plan is higher than the value for 95% of randomized grouping plans then we have 95% confidence that our null hypothesis was incorrect. Of course, we cannot simply compute many random grouping plans and assert that the top few grouping plans are statistically significant. However, we can identify a possibly significant grouping plan by doing this for the training dataset, and see if that grouping plan is again in the best 5% of random grouping plans for the testing data set.

It should be noted that a statistical hypothesis test can be very useful for showing that one or more operators produce different output (or a different output distribution) for documents from the same section of the population. However, it may be more valuable to find sections of the population where the operator output difference is large, rather than merely statistically significant. Metrics other than statistical p-value can be used to determine which population sections require further study. One such metric is related to the variance in the means of the operators output. Because we only have access to a sample of the data, we typically cannot compute the actual means. We can instead compute an estimate of each of the means and use this to calculate an estimate of the variance in the means.

In a stable process where there were no deviations from the norm, the variance would be significantly lower than in a process with patterns of deviations from the norm. Any of these metrics, or others, can be used as the basis of a hill climb or other local search method to identify interesting samples of the population that would be most useful to analyze to detect underlying patterns of deviations from norms or fragmented norms. A key property of these metrics is that they are highest for the section of the document population that actually represents the variance in operator behavior. For example, if one operator is not approving loans from males aged 20-30, the metric should be higher for "males aged 20-30" than for "males aged 20-50" and "people aged 20-30."

Local search methods operate by considering a given sample, and repeatedly modifying it with the goal of raising the metric. This continues until the metric is higher for the sample under consideration than for any nearby samples (a local optimum). The notion of proximity is complex for samples of the sort we are discussing. The "modify" step in the algorithm will change the restrictions defining the current sample. This can consist of widening or tightening the restriction on one field, or adding a restriction on a new field, or removing the restriction on a restricted field. For example, if we consider a sample consisting of "Loan applications from females aged 30-40" and calculate the metric to be X, we could then calculate the metric for "females", "females aged 30-50", "females aged 20-40", "people aged 30-40", and others. Each of these metrics will be compared to X and the search algorithm will continue.

Because the metrics are highest for samples with acute variances, samples obtained using parameter values which are responsible for the unusual behavior will have the highest scores. Much larger and much smaller samples will have lower scores. As the search algorithm runs, the sample under consideration will "evolve" to contain the features that are causing the discrepancy in operator processing while not containing unrelated random information. Of course, the search will cease on one local maximum. If the local search is repeated multiple times from random starting samples, many samples with peak metrics can be identified in the data.

The examples above were given in the context of forming hypotheses for patterns of operator behavior, but they can also be used to form hypotheses for other types of analysis. These hypotheses can then be further qualified 130 by humans.

Human Social Ideation

Referring to FIG. 1, human feedback 130 is used to improve the hypotheses identified by the automated analysis 110/120. Multiple forms of directed crowdsourced or social feedback can be supported. Examples include the following.

Voting of Auto-Detected Patterns:

Humans may simply review the auto-detected patterns or subsets of data with high p-values and vote that the specific pattern or subset is worth further exploration. The higher the number of votes a pattern gets, the more actionable or worthy of further exploration the pattern might be.

Tagging of Auto-Detected Patterns:

Humans may also tag the patterns or subsets with comments. For example, in an invoice processing scenario, certain operators might incorrectly process debits as credits. This error would show up in different ways. First, the amount for the line item would be positive instead of negative. Second, the transaction type would be marked incorrectly. And finally, the total amount for the invoice would be incorrect. While automated analysis might detect that the three patterns are highly correlated it might not have sufficient information to reveal that there is a causal relationship between the patterns. One or more humans however may tag the three different error patterns as part of a broader "debit/credit confusion" pattern. This would help the automated analysis detect the fact that a single underlying problem, operators confusing debits and credits, is the root cause behind these multiple patterns. Another tagging example could occur for an automated analysis that revealed that a certain bank was issuing very few loans below $10,000 and that this pattern had significant statistical evidence of being significant. A human might however know that the specific bank only serves multi-millionaires and thus rarely received loan applications for small amounts. The human could thus tag this pattern as not worth exploring due to this reason. If sufficient humans tagged the pattern the same way, the automated analysis may reduce the importance of the pattern despite the high statistical evidence.

Propose Hypotheses:

The analytics may reveal patterns but due to the lack of understanding of the complex real world systems, algorithms may not detect the right corresponding hypotheses. For example, the analysis may reveal that something statistically significant is happening which is causing a significantly lower sale of certain dresses in certain shops as opposed to other shops even though the dresses were displayed the same way in all stores on identical mannequins. A customer may point out that the dress material displays certain attractive characteristics when seen under florescent light and not under incandescent light. This would be an example of a hypothesis that an automated analysis probably would not identify and even human experts may have easily missed. However, given a specific pattern to focus on as a starting point, at least one of a sufficiently large number of crowdsourced helpers may detect this key pattern.

Filter/Search Data to Find New Slices with High p-Values:

Automated analysis might leverage various heuristics such as "hill climb" to detect the subsets with the highest p-values. However, humans, especially customers and employees, because of their unique understanding of the broader context may be able to find subsets of data with high p-values that automated analysis did not detect. Humans may also realize that certain subsets were actually related and propose more complex subsets that would have even higher p-values. Additionally, because of heuristics like bucketing, the automated analysis may have somewhat imprecisely defined the subset and unnecessarily included/excluded data points in the subset that did not/did relate to the underlying pattern in question. Humans may define the subset more precisely, either including related data points or excluding unrelated data points to increase the p-values. For example, the system might detect an unusual volume of sales between $20 and $30 during the March 1-15 time period. A customer might remember a promotion of a free gift with purchases over $25 during February 25 to March 12 and suggest this as a new subset to analyze, leading to an even higher p-value.

Propose External Variables or Datum to Consider:

A key limitation of automated analysis is the lack of awareness of the physical world or overall context. Humans may easily recommend the inclusion of additional variables, the inclusion of which simplifies or enables the detection of patterns. For example, if the automated analysis was evaluating the sale of pizzas, humans might suggest the inclusion of key causal variables such as the dates on which football games are held, or the local rainfall rates as these variables significantly affect the sale of home-delivered pizza. Similarly humans may simply provide additional specific information such as "This specific shop uses incandescent lights" rather than suggest an external variable to consider.

Suggest Fields to Combine During Analysis:

Certain patterns may be relatively complex, such as "if variable A is equal to x and variable B is greater than y but variable C is not equal to z, then a specific pattern is observed." Such complex patterns may be difficult for automated analysis to detect short of expensive brute force analysis of an enormous number of possible scenarios. Humans, because of their enhanced understanding of the context, can more easily suggest such patterns.

Suggest Breaking Existing Data into Finer Grained Fields:

Certain fields may represent overly aggregated data which hides underlying patterns. For example, if sales data is aggregated by day, a user may suggest that sales in the morning and in the evening should be tracked separately because different types of customers visit the shop during the morning as opposed to the evening and they exhibit different sales behavior patterns.

Suggest Type of Regression:

Humans may have an instinct for the shape of the hidden data distribution. For example, humans may be asked to vote on whether the underlying pattern is linear, exponential, etc. They may also suggest combining certain variables during the analysis as specified in f above. In each of these cases, they are essentially suggesting the type of regression that the automated analysis should use.

Suggest Experiments to Detect or Confirm Patterns:

In some cases, the humans may be aware of a pattern that cannot be confirmed from just the available data. For example, if a dress was not selling because customers could not imagine what kind of shoe they could wear with it, merely analyzing existing data may not be sufficient. However, human feedback may suggest that this hypothesis be tested by setting up floor displays with the specific dress and corresponding shoes or selling the dress and matching shoes together as a package. The results of this experiment would offer data that could confirm this hypothesis.

The previous section talks about auto-detected patterns or auto-detected subsets of data with high p-values. However, this method may be applied to other forms of automated, assisted, or manual data analysis as well. For example, there is no reason to believe that such social feedback would not be useful to an expert analyst performing a completely manual data analysis.

Collection of Human Feedback

Although feedback can be solicited as free-form text, there are several ways that we can structure the collection of feedback from customers and others. Structured as opposed to free-form feedback allows easer automated understanding of the feedback as well as enhanced clustering of feedback to determine cases where multiple humans have essentially provided the same feedback.

One method for collecting structured feedback involves having users select each word in a sentence from a drop-down of possible words. In this way they can construct a suggestion, comment, or other insight such as "I would purchase more shoes if they were red." Each of the nouns and verbs can be altered but the sentence structure remains easy to analyze. The user could choose from insight templates such as "I would X if Y," "I feel X when Y," "I enjoy X when Y," etc.

For cases where the feedback involves filtering/searching data to find new slices with high p-values, the structured interface can be similar to standard advanced search functionality. The criteria specified by the human can be immediately tested on all the data or a selected subset of the data and the p-value measured.

Another way to accept structured feedback is to ask the users to construct their sentence using a restricted language of selected nouns, verbs, and adjectives. These can be automatically analyzed by software algorithms such as statistical aggregation, Markov chains, and others to detect patterns.

If no other option allowed the user to express herself fully, she could compose her thoughts in free-form text. However, instead of having this text interpreted by humans, it could be analyzed by computer algorithms such as statistical aggregation, Markov chains, and others as described above.

Humans may be provided financial or other rewards based on whether their feedback was useful and unique. For example, in the filtering case, a user might be rewarded based on the feedback's usefulness, namely how much better the p-value of their specified subset was than the average p-values of the top 10 subsets previously detected by the software automatically or with the help of humans. A uniqueness criterion may also be easily applied to the reward formula such that a higher reward would be paid if the human-specified subset differed significantly from previously identified subsets. The uniqueness of a user specified set N as compared to each of the previously identified sets $S_t$ may be determined by a formula such as the following: (Number of elements in N−Number of element in N intersect $S_t$)/(Number of element in N intersect $S_t$). Other uniqueness and usefulness criteria might be applied instead or in addition.

For feedback involving regression models or combinations of fields to be used in the model, a very similar approach combining usefulness and uniqueness can be used. Usefulness can be determined by the improvement in the "fit" of the model while uniqueness can be determined by whether a substantially similar model has already been submitted previously or detected automatically.

Alternate approaches to rewards may include the following for cases where humans are tagging or voting for a pattern. The first person to tag a pattern with a given phrase might be rewarded based on how many other users also tagged the same pattern with the same phrase. This motivates users to tag with the phrases that they think other users will tag with. Even a software algorithm that attempted to "game" this system would, if successful, provide valuable insight. Given that users would not know what phrases a given pattern has already been tagged with, or even whether a pattern has already been tagged, it would be difficult for a user to predictably game such a system to get unwarranted rewards. Rewards can be restricted to tags that are uniquely popular for this pattern, to avoid the possibility every pattern getting tagged with a trivial tag. Alternately, the reward can be reduced if a user provides lot of tags. Thus, users would have an incentive to provide a few tags that are good matches for the data rather than a lot of less useful tags in the hope that at least one of the tags would be a good match.

Most reward-incented systems rely on rewards which are delayed in time with respect to the feedback offered by users. Because this system as described can measure p-values interactively, rewards can be immediately awarded, significantly improving the perceived value of participating in the system and increasing participation.

The structured human feedback process may be transformed into games of various sorts. Various games related to human-based computation have been used to solve problems such as tagging images or discovering the three dimensional shape of protein structures. This is just one example of how using automated analysis to create a good starting point and then allowing a framework where different humans can handle the tasks most suited to their interests and abilities, can be more effective than either just automated or just expert manual analysis.

Existing approaches can be further improved in a number of ways. For example, one embodiment taps a human's social knowledge, something much harder for computers to emulate than specific spatial reasoning. Moreover, we tap the social knowledge in a structured machine-interpretable manner which makes the solution scalable. Humans excel at graph search problems such as geometric folding (or chess-playing) where there are many options at each step. Today, this gives people an advantage in a head-to-head competition, but with rapid advances in technology and falling costs, computers are rapidly catching up. In fact, computer algorithms are now widely considered to outperform humans at the game of chess. However, no amount of increased processor speed will enable a computer to compete in the arena of social cognizance and emotional intelligence. Socialization comes naturally to humans and can be effectively harnessed using our methods.

Additionally, various embodiments can be non-trivially reward based. By tying a tangible payment to the actual business value created, the system is no longer academic, but can encourage users to spend significant amounts of time generating value. Additionally, a user who seeks to "game" the system by writing computer algorithms to participate is actually contributing to the community in a valid and valuable way. Such behavior is encouraged. This value sharing approach brings the state of the art in crowdsourcing out of the arena of research papers and into the world of business.

Finally, some approaches allow humans to impact large aspects of the analysis, not just a small tactical component. For example, when a human suggests the inclusion of an external variable or identifies a subset with high p-value, they can change the direction of the analysis. Humans can even propose hypotheses that turn out to be the key actionable insight. Thus, unlike in the image tagging cases, humans are not just cogs in a computer driven process. Here, humans and computers are synergistic entities. Moreover, even without explicit collaboration, each insight from a human feeds back into the analysis and becomes available to other humans to build on. For example, Andy may suggest the inclusion of an external variable which leads Brad to detect a new subset with extremely high p-value, which leads Darrell to propose a hypothesis and Jesse to propose a specific regression model which allows the software to complete the analysis without expert human intervention. Thus, the human feedback builds exponentially on top of other human feedback without explicit collaboration between the humans.

Some humans may try to submit large volumes of suggestions hoping that at least one of them works. Others may even write computer code to generate many suggestions. As long as the computation resources needed to evaluate such suggestions is minimal, this is not a significant problem and may even contribute to the overall objective of useful analysis. To reduce the computational cost of the evaluation of suggestions, such suggestions may first be tested against a subset of the overall data. Suggestions would only be incorporated while analyzing the overall data if the suggestion enabled a significant improvement when used to analyze the subset data. To further save computation expenses, multiple suggestions evaluated on the subset data may be combined before the corresponding updated analysis is run on the complete data. Additionally, computation resources could be allocated to different users via a quota system, and users could optionally "purchase" more using their rewards from previous suggestions.

Feedback Loop

Once the feedback is received 135, the initial automated analysis 110/120 may be re-run. For example, if the humans suggested additional external data, new hypotheses, new patterns, new subsets of data with higher p-values, etc., each of these may enable improved automated analysis. After the automated analysis is completed in light of the human-feedback, the system may go through an additional human-feedback step. The automated-analysis through human feedback cycle may be carried out as many times as necessary to get optimal analysis results. The feedback cycle may be terminated after a set number of times or if the results do not improve significantly after a feedback cycle or if no significant new feedback is received during a given human feedback step. The feedback cycle need not be a monolithic process. For example, if a human feedback only affects part of the overall analysis, that part may be reanalyzed automatically based on the feedback without affecting the rest of the analysis.

As the analysis is improved based on human feedback, a learning algorithm can evaluate which human feedback had the most impact on the results and which feedback had minor or even negative impact on the results. As this method clearly links specific human feedback to specific impacts on the results of the analysis, the learning algorithms have a rich source of data to train on. Eventually, these learning algorithms would themselves be able to suggest improvement opportunities which could be directly leveraged in the automated analysis phase.

The human feedback patterns could also be analyzed to detect deterministic patterns that may or may not be context specific. For example, if local rainfall patterns turn out to be a common external variable for retail analyses, the software may automatically start including this data in similar analyses. Similarly, if humans frequently combine behavior patterns noticed on Saturdays and Sundays to create a higher p-value pattern for weekends, the software could learn to treat weekends and weekdays differently in its analyses.

The software may also detect tags that are highly correlated with (usually paired with) each other. If a pattern is associated with one of the paired tags but not the other, this may imply that the humans simply neglected to associate the pattern with the other tag, or it may be a special rare case where the pattern is only associated with one of the usually paired tags. The software can then analyze the data to detect which of the two cases has occurred and adjust the analysis accordingly.

This overall feedback loop may occur one or more times and may even be continuous in nature where the analysis keeps occurring in real time and users simply keep adding more feedback and the system keeps adjusting accordingly. An example of this may be a system that predicts the movement of the stock market on an ongoing basis with the help of live human feedback.

During the crowdsourcing phase, certain data will be revealed to the feedback crowd members. Companies may be willing to reveal different amounts and types of data to employees as opposed to suppliers or customers or the public at large. Security/privacy can be maintained using different approaches, including those described in U.S. Pat. No. 7,940,929 "Method For Processing Documents Containing Restricted Information" and U.S. patent application Ser. No. 13/103,883 "Shuffling Documents Containing Restricted Information" and Ser. No. 13/190,358 "Secure Handling of Documents with Fields that Possibly Contain Restricted Information". All of the foregoing are incorporated by reference herein.

Further Analysis

Once the automated analysis with human feedback is completed, the data could be presented to expert analysts 140 for further enhancement. Such analysts would have the benefit of the following:

lists of hypotheses detected automatically as well as proposed by humans;
results of how well the data fit various regression models detected automatically as well as proposed by humans;
specific subsets of data with high p-values, corresponding to automatically or manually detected patterns, and corresponding manually proposed causal links;
votes and tags indicating agreement from communities such as customers or employees; and
other valuable context information Such information significantly ameliorates some of the key limitations of manual expert analysis such as picking the wrong hypotheses, the wrong models, ignoring key variables, reviewing the wrong subsets, etc.

The analyst's responsibilities can also be restricted to tasks such as slightly changing models, etc. or improving the way the data is analyzed rather than having to write complex code from scratch or figuring out which data sources need to be included in the analysis. By reducing the complexity and the "degrees of freedom" of the work the analyst has to perform, we significantly reduce the risk of human error or the impact of an analyst's experience on the final results. This may also enable superior analysis with lower cost analysts.

Given the nature of the automated analysis, the structured nature of the crowdsourced feedback, and the minimal optional involvement of expert analysts, such an analysis can be carried out much faster, at lower overall cost and higher overall accuracy and effectiveness than traditional methods.

Given the report-writing flexibility and freedom that analysts enjoy under traditional methods, it can be difficult to create scalable user-friendly reports with drill-down, expand-out, context-aware features and context specific data details. In essence, when an analyst writes custom code or analysis formulae to create analyses, the reports themselves have to be custom in nature and are difficult to build automatically without manual customization. However, the methodology specified above can restrict the expert analyst to configure, not customize. Due to the nature of the automated analysis, the structured feedback, and the limited expert configuration, the software solution is fully aware of all aspects of the report context and can automatically generate a rich context specific report with drill-down, expand-out, context specific data capabilities.

The system, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer comprises a microprocessor. The microprocessor can be one or more general- or special-purpose processors such as a Pentium®, Centrino®, Power PC®, and a digital signal processor. The microprocessor is connected to a communication bus. The computer also includes a memory, which may include Random Access Memory (RAM) and Read Only Memory (ROM). The computer system also comprises a storage device, which can be a hard disk drive or a removable storage device such as a floppy disk drive, optical disk drive, and so forth. The storage device can also be other similar means for loading computer programs or other instructions into the computer system. The computer system also includes one or more user input devices such as a mouse and a keyboard, and one or more output devices such as a display unit and speakers.

The computer system includes an operating system (OS), such as Windows, Windows CE, Mac, Linux, Unix, a cellular phone OS, or a proprietary OS.

The computer system executes a set of instructions that are stored in one or more storage elements, to process input data. The storage elements may also hold data or other information as desired. A storage element may be an information source or physical memory element present in the processing machine.

The set of instructions may include various commands that instruct the processing machine to perform specific tasks such as the steps that constitute the method of the present invention. The set of instructions may be in the form of a software program. The software may be in various forms, such as system software or application software. Further, the software may be in the form of a collection of separate programs, a program module with a larger program, or a portion of a program module. The software might also include modular programming in the form of object-oriented programming and may use any suitable language such as C, C++ and Java. The processing of input data by the processing machine may be in response to user commands to results of previous processing, or in response to a request made by another processing machine.

Overview of BeyondCore

FIGS. 2-13 illustrate examples and implementations of various aspects of the analysis methodology and frameworks described above. For convenience, these examples and implementations will be referred to as BeyondCore. These examples concern the analysis of a data set for a process, where the term "process" is intended to include any system, business, operation, activity, series of actions, or any other things that can generate a data set. The data set contains observations of the process, which are expressed as values for the outcome of the process and for variables that may affect the process. Depending on the application, the data set may contain at least 100,000 observations, at least 1,000,000 observations or more. The outcome may be directly observed or it may be derived. Typically, the data set will be organized into rows and columns, where each column is a different outcome or variable and each row is a different observation of the outcomes and variables. Typically, not every cell will be filled. That is, some variables may be blank for some observations.

In one example, the process is sales for a company. The outcome is revenue. The variables might include store location, category of item sold, month when sale took place, promotion (if any), demographics of buyer (age, gender, marital status, income), etc. Another example may be patient claims where the outcome is the amount paid or the length of stay or whether the patient was readmitted, while the other variables may include demographics of the patient (age, gender, etc.), facility/hospital visited, diagnosis, treatment, primary physician, date of visit, etc. Yet another example may be logistics analysis where the outcome is whether or not a shipment was delayed or the amount paid for the shipment while the other variables are shipment type, weight, starting location, destination location, shipper details, weather characteristics, etc. Examples may involve almost any revenue cost or risk metric as well as other kinds of metrics and corresponding variables that may or may not impact the outcome.

Typically, the data set is initially processed to determine the impact of different variable combinations on the outcome. The variable combinations are defined by values for one or more of the variables. Examples of variable combinations include {item=camera}, {buyer gender=male}, {item=camera; month=Nov}, {item=television; buyer age=21 to 39; promotion=Super Bowl}, etc. Here, the semi-colon indicates "and" so {item=camera; month=Nov} means the variable combination of item=camera and month=November.

The impact of each variable combination typically is determined by the behavior of a variable combination with respect to the outcome and by the population of the variable combination. In one approach, automated analysis learns the normative behavior for each variable combination as it relates to the outcome. For example it may learn that Men in California spend more while 18 to 25 year olds who buy over the Mobile channel spend less than usual in general (here amount spent is the outcome). But a specific transaction may be for a Male 18 to 25 years old from California who purchased goods over the Mobile channel. By observing the norm for each variable combination in isolation and in combinations across multiple transactions, we can learn the "net impact" (the behavior) of a variable combination. This is the positive or negative impact of the variable combination on the observed outcome, net of the impact of all other variable combinations that may also be affecting that specific transaction. This allows automated analysis to learn a behavior metric that is similar to obtaining a regression coefficient in a regression analysis, but which can be learned via the search-based approach described above with reference to FIG. 1, instead of running a regression analysis. In an alternative approach, a type of regression analysis is run for the outcome with respect to all of the variable combinations being considered. For each variable combination, there will be a regression term (the impact) that equals the regression coefficient (the behavior) multiplied by the population. Behavior may also be measured in terms of correlation coefficients, net-effect impact net of all other variables, or any other suitable metric that captures how the variable combination affects the outcome or how the outcome trends as a function of the variable combinations. Population may also be measured in terms of counts (i.e., number of observations), whether or not something occurred, frequency/percentage of overall population, or relative frequencies of observations. The overall impact of a variable combination depends on both its behavior (i.e., how strongly does that variable combination affect the outcome) and its population (i.e., how much of that variable combination exists in the data set of interest). These impacts, behaviors and populations can then be used to analyze the data set in different ways.

Preferably, "all" possible variable combinations will be initially processed. However, in practice, there may be good reasons to limit the analysis to less than every theoretically possible combination. For example, some variable combinations may not have enough observations to yield a statistically reliable or meaningful result. In one approach, initial processing is applied to all variable combinations of up to N variables provided that the variable combination has a statistically meaningful sample (e.g., at least M observations). For example, behaviors for all variable combinations of between 2-10 variables may be determined for which the data set contains a statistically meaningful number of observations. In one approach, statistically meaningful is determined based on the number of observations (e.g., requiring at least M observations, where M is a predetermined integer). M=25 or greater are typical values. The total number of variable combinations considered may be greater than 200, greater than 1000, or even more. Alternatively, the variable combinations considered may represent a significant fraction of the total possible variable combinations, for example at least 50% of the total possible four-variable combinations. As another example, behaviors for at least one variable combination may be determined for every variable for which the data set contains a statistically meaningful number of observations (e.g., at least 1% of the observations). In some embodiments, the variable combinations considered represent a significant number (e.g., at least 10, or at least 25) or proportion (e.g., at least 50%) of the total variables of the data set.

As yet another example, due to time or compute limitations the analysis might consider 1000 variable combinations in the final model and may exclude any variable combinations that have less than 30 observations (because of statistical significance thresholds or privacy objectives such as not disclosing information on groups smaller than a certain size to prevent identification of specific people via the analysis). In other approaches, the processed variable combinations include at least 1,000,000 combinations of variables, or include combinations for at least 100 variables, or include variable combinations for every variable for which there is a statistically meaningful sample.

Figure 2:
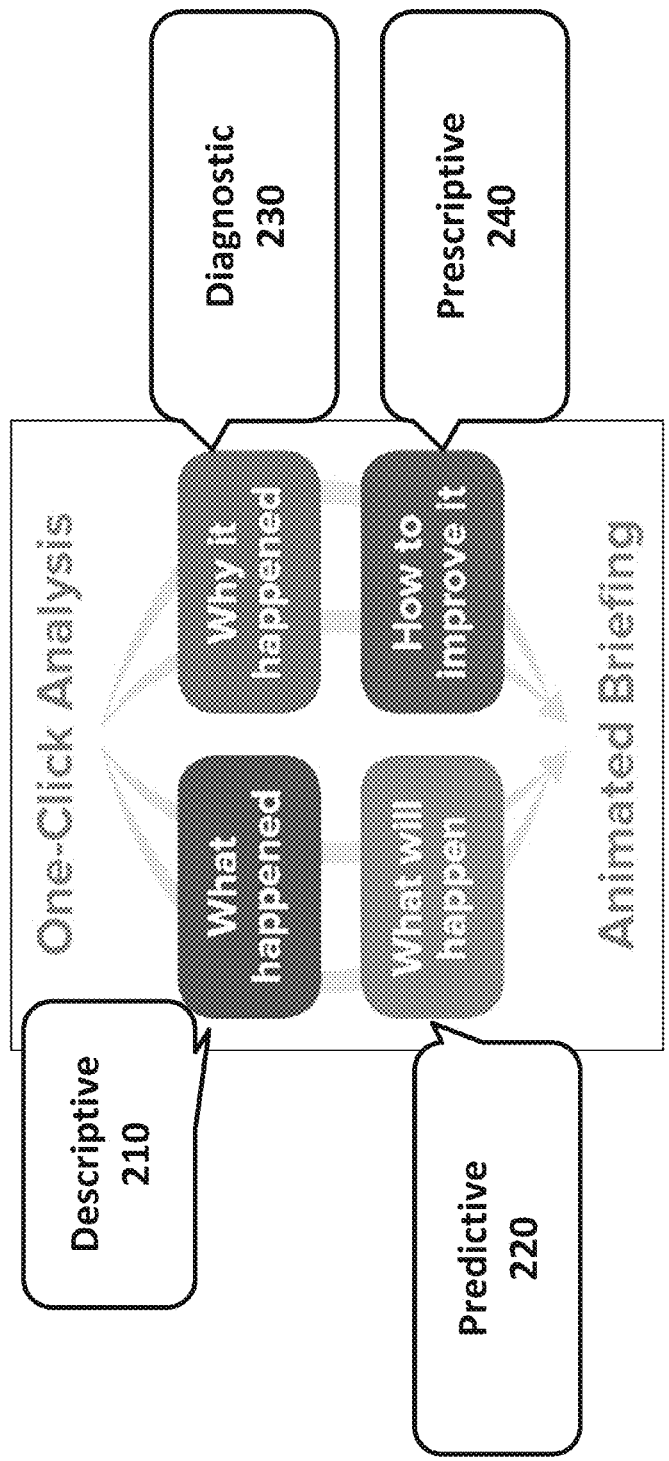
FIG. 2 illustrates an overview of various ways to display the state of underlying data or processed results at various points along the various analysis methods, according to some embodiments.

FIG. 2 illustrates an overview of various types of graphs that can be used to display the state of underlying data or processed results at various points along the analysis methods described above. A user can create an analysis project by specifying a data set and analysis parameters for analyzing the data.

Descriptive graphs 210 are graphs used in an analysis project (also referred to as a story). Typically, BeyondCore has looked at all the possible graphs (i.e., variable combinations) and automatically highlighted those that a user should see e.g., (highest statistical importance). BeyondCore also conducts statistical soundness tests and highlights the specific parts of each graph the user should focus on.

Predictive graphs 220 illustrate an outcome of predictive analysis that selects the Descriptive graphs 210 to be displayed as well as to make Prescriptive recommendations 240. Expert users can access the predictive capabilities directly from the 'Choose a graph' feature.

Diagnostic graphs 230 highlight multiple unrelated factors (i.e., variable combinations) that contribute to an outcome or visual pattern displayed in a graph. For a Descriptive graph 210, BeyondCore automatically checks for what other factors might be contributing to the pattern. For example, a hospital that is doing badly may actually have far more emergency patients and that is why it is doing badly. Diagnostic graphs 230 help ensure that the patterns the user focuses on are real and not accidents of the data.

Prescriptive graphs 240 provide a means for the user to communicate to BeyondCore which of the variables are actionable (things that can be changed easily) and whether the user wants to maximize or minimize the outcome. BeyondCore can then look at millions (typically) of possibilities for changing variables, conducts Predictive analysis, recommends specific actions, quantifies the expected impact, and explains the reasoning behind the recommendations.

BeyondCore Stories

FIGS. 3A-3E illustrate the evolution of a story (an analysis project) in BeyondCore. This is an example of the generation of rich context-aware reports based on structured feedback from untrained humans described previously. In some embodiments, "STORIES" is configured as a user's home page in BeyondCore.

Figure 3A:
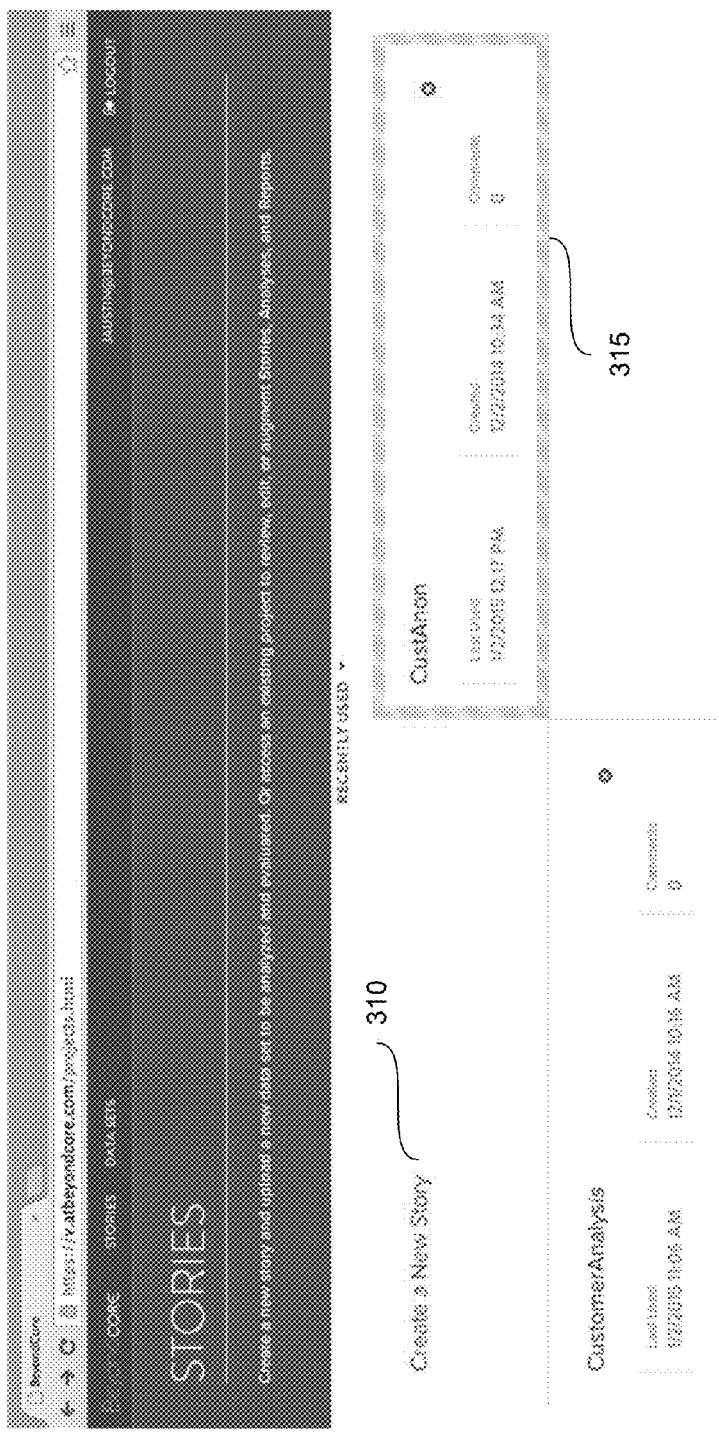
FIGS. 3A-3E are screen shots illustrating the evolution of a story (an analysis project), according to some embodiments.
Figure 3B:
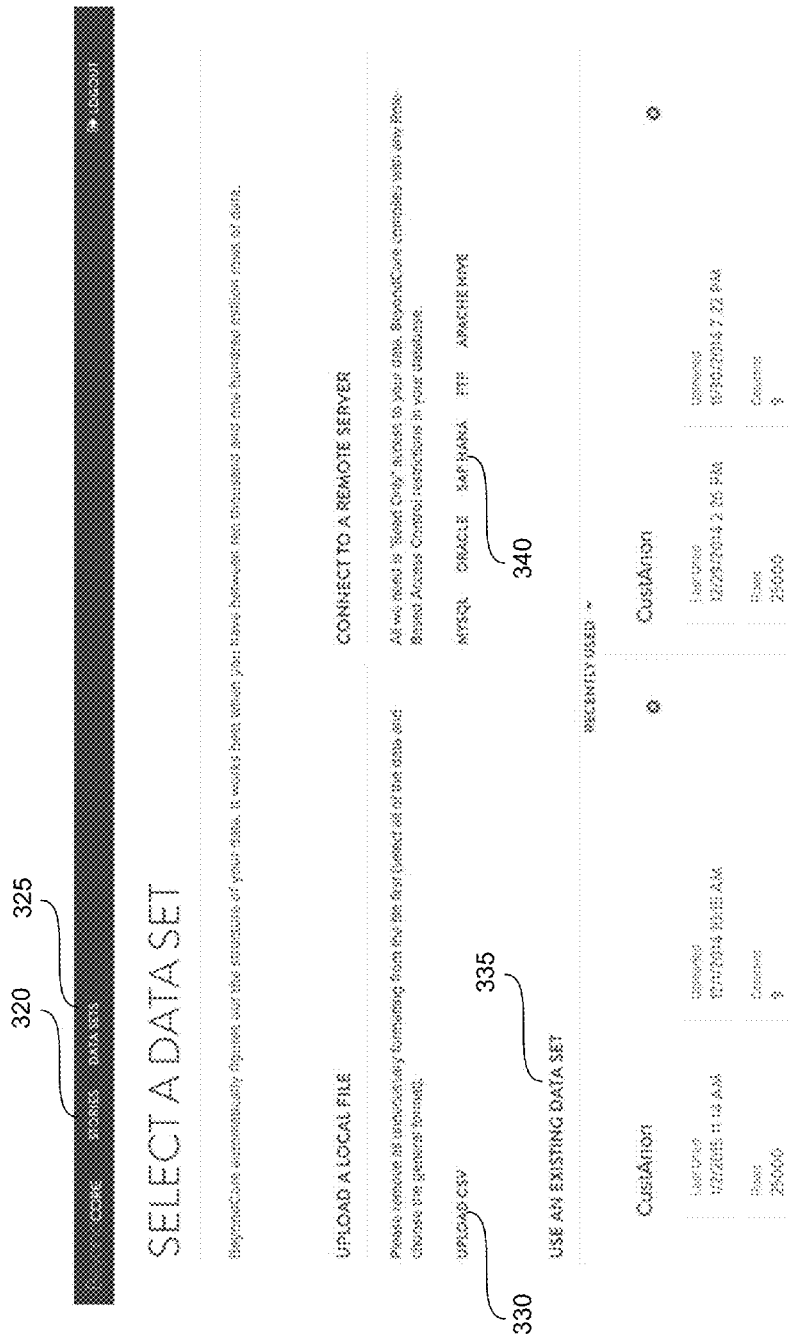

Referring to FIGS. 3A-3B, a user can start a new analysis/project (e.g., via user interface element 310), called a Story, or access any previous Stories (e.g., via user interface element 315). When a user selects the 'Create a New Story' button (UI element 310, FIG. 3A) on the home page (FIG. 3A), the Select a Data Set page (FIG. 3B) is displayed. On the Select a Data Set page (FIG. 3B), the user can access his stories (UI element 320), access his data sets (UI element 325), upload his data file (UI element 330), use an existing data set (UI element 335), or connect to remote servers with data (UI element 340). For example, enterprise customers can upload data from a remote database or Hadoop.

Figure 3C:
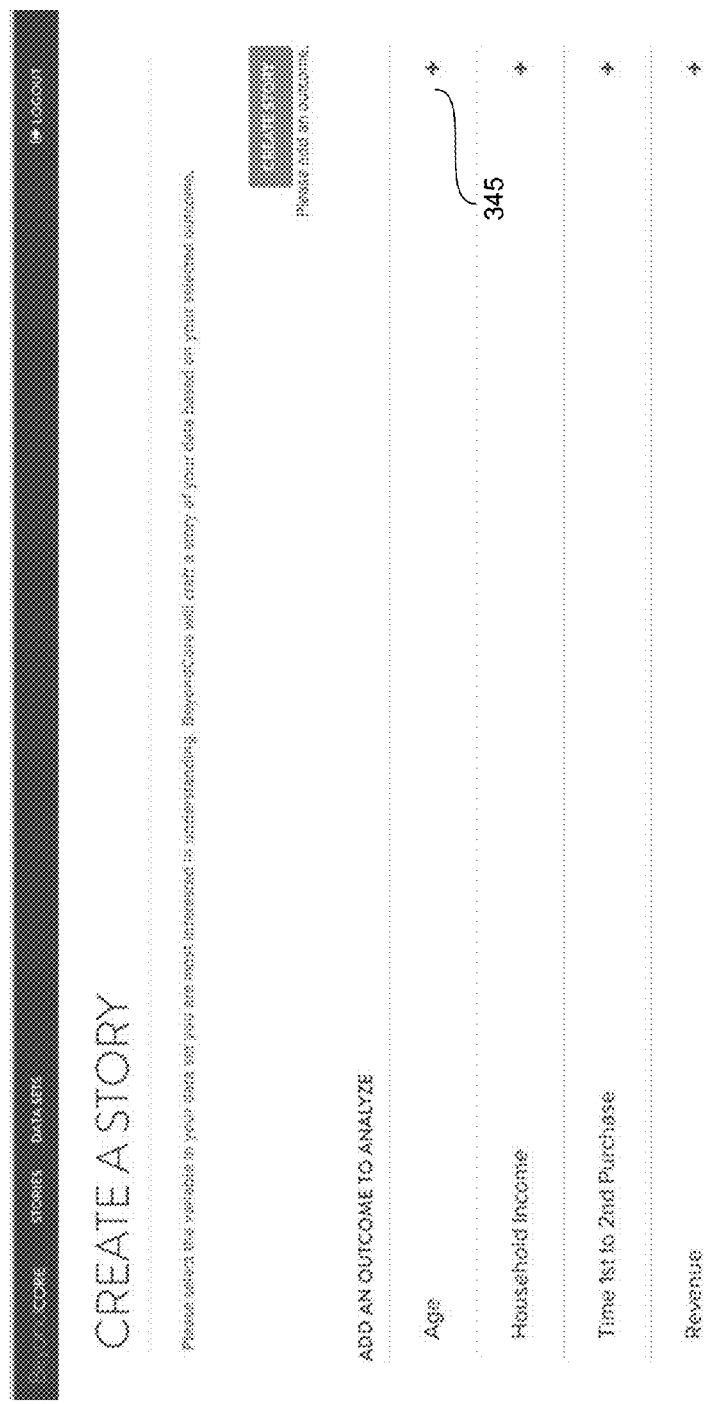

FIG. 3C illustrates a user interface for selecting the business outcome (the variable) that the user wishes to analyze. This is typically the KPI or metric in the user's dashboards and reports, e.g. revenue or cost. This page lists all the numeric or binary (e.g. Male/Female) columns in the user's data that have sufficient variability. If the user does not see a variable that is expected, the user may verify that the variable has numerical values and not text. If a variable has only a few values (e.g. 1, 2, 5), BeyondCore will treat it as a categorical variable instead of numeric. In most cases this is desired and statistically appropriate. To change a variable from categorical to numeric, the user may go to the Data Setup page and manually filter or reformat data (see advanced options at FIG. 4A). Returning to FIG. 3C, the user may click user element 345 to select the business outcome. (which would be the y-axis of the graph, or the number the user wants to predict).

Figure 3D:
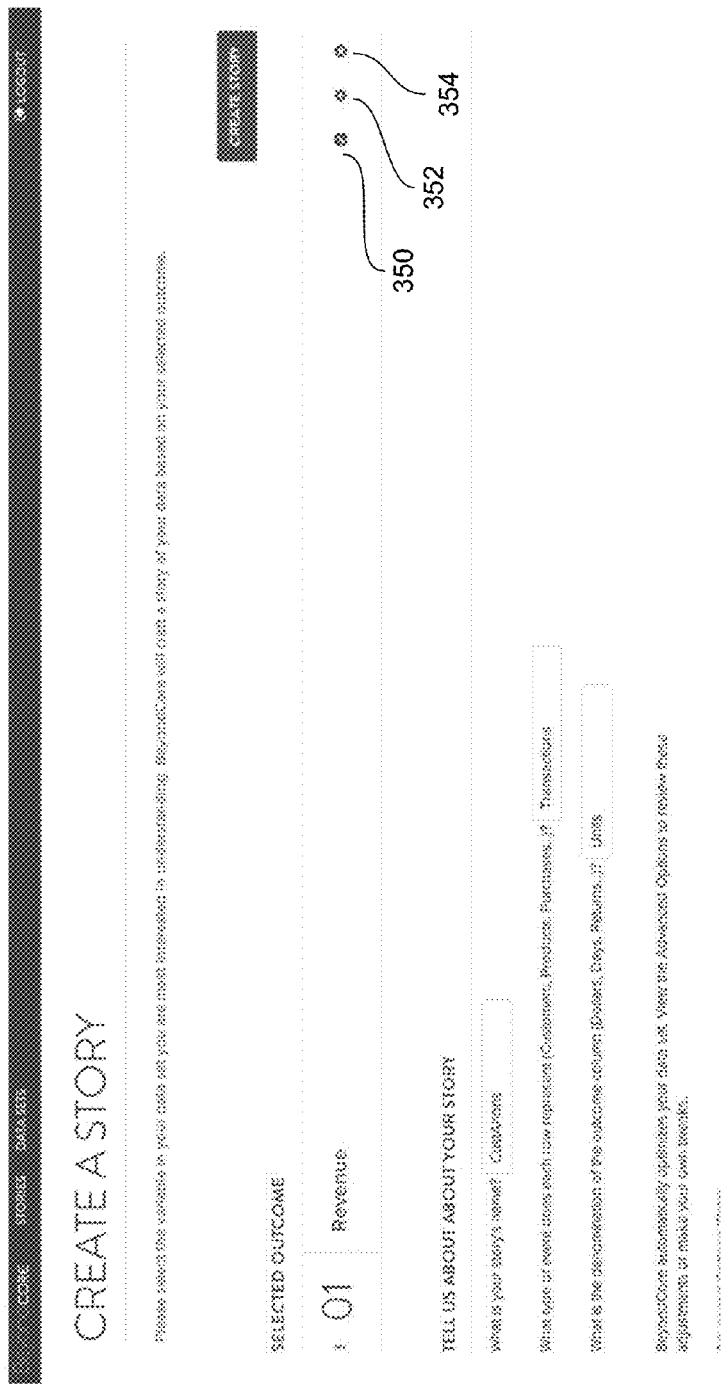

FIG. 3D illustrates a scenario where the user may want to exclude extreme cases from his analysis. For example, the user may know that most of his sales are between $250 and $500. The user can set the maximum acceptable value to $500 to exclude data above $500 from the analysis, for example by specifying a range of acceptable values for the outcome (UI element 352). The user may additionally rename the outcome (UI element 350) or choose a different outcome (UI element 354).

Figure 3E:
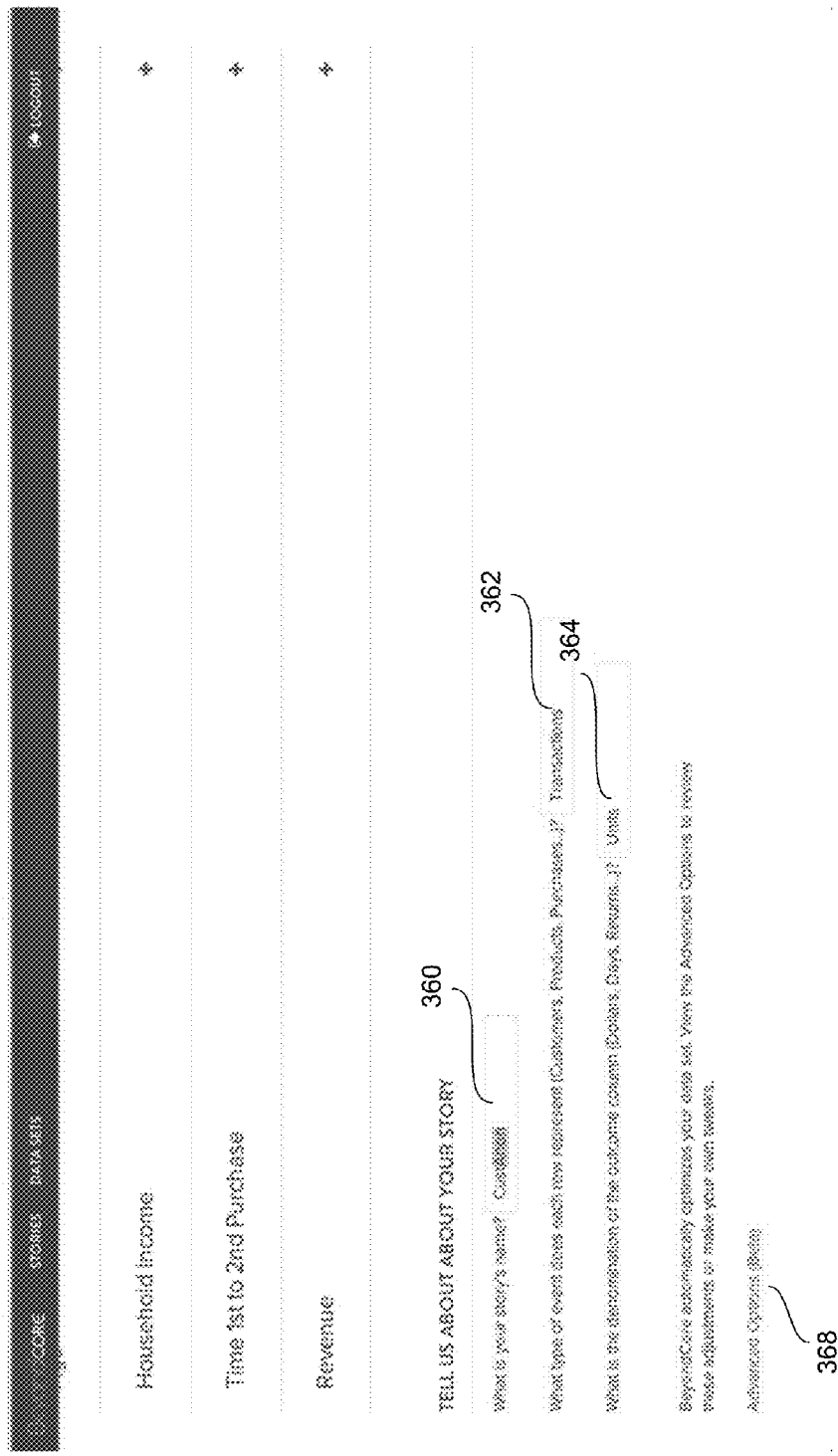

FIG. 3E illustrates a user interface that allows a user to further customize a BeyondCore story. The user may edit the story name, row labels, column labels, and the like. For example, UI element 360 allows a user to specify a story title, UI element 362 allows a user to specify how BeyondCore should refer to a row in the data, UI element 364 enables the user to specify the unit of the y-axis of his graphs (the outcome variable), UI element 368 enables the user to access advanced options or further customize a story.

Figure 4A:
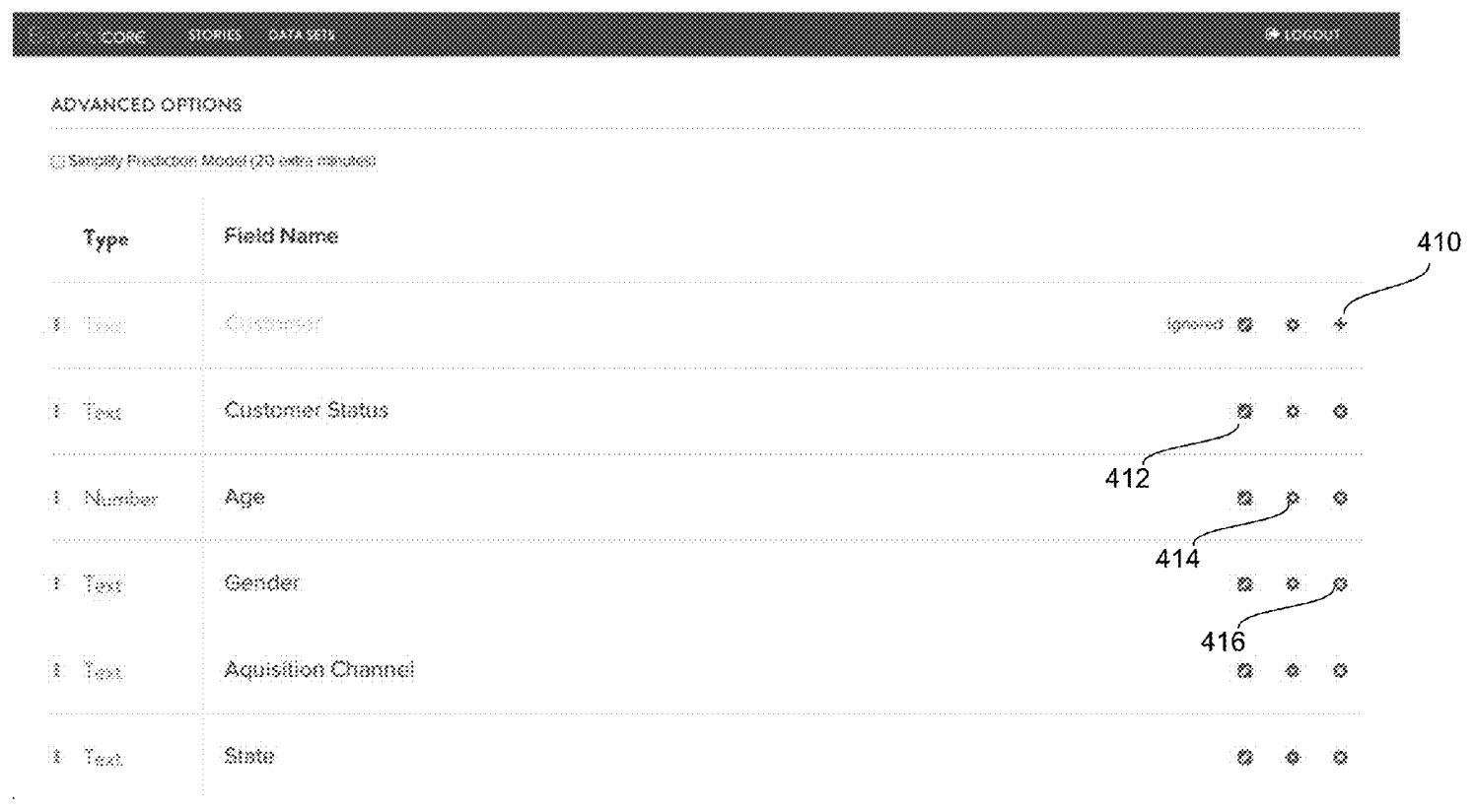
Figure 4B:
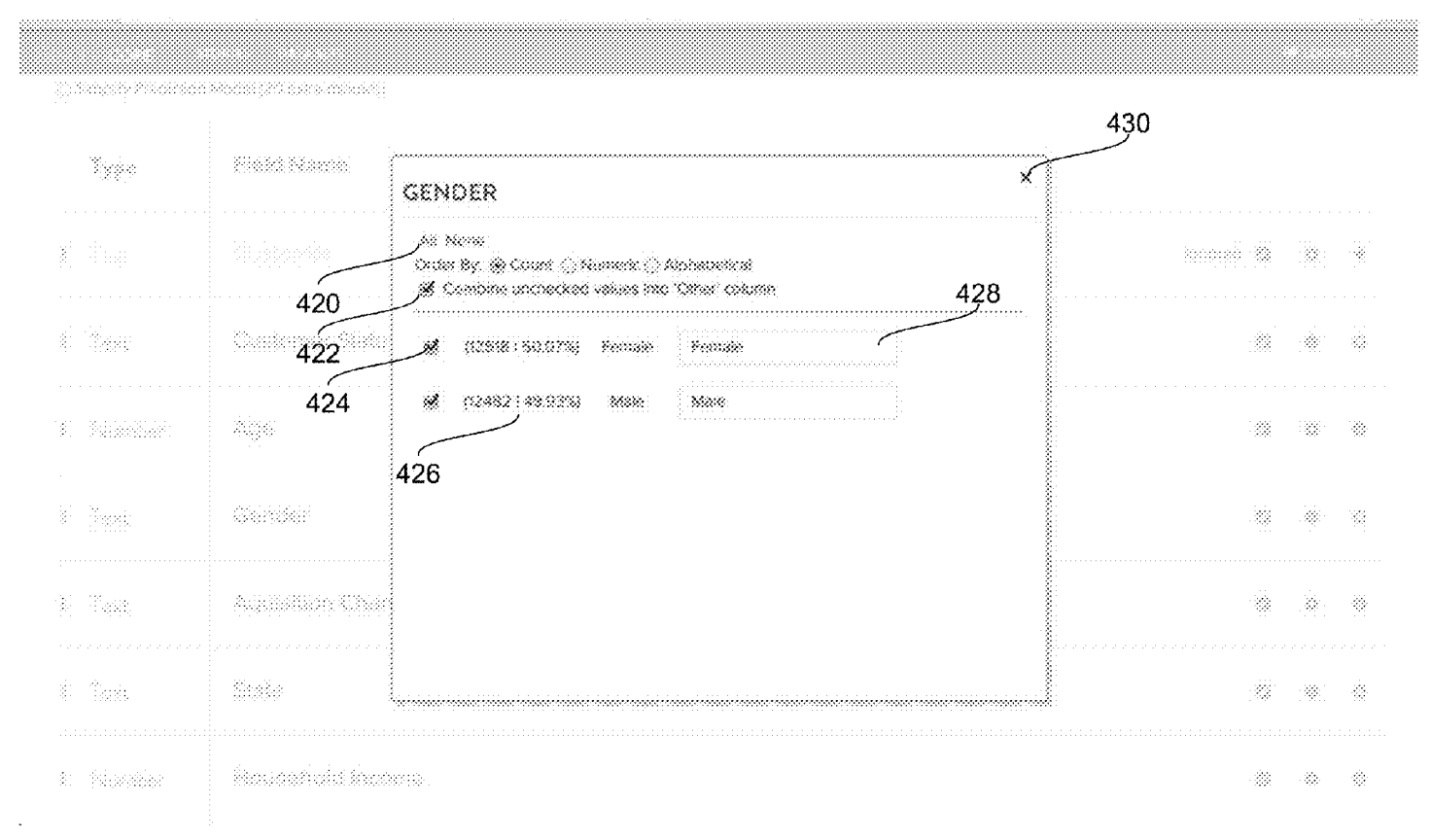
Figure 4C:
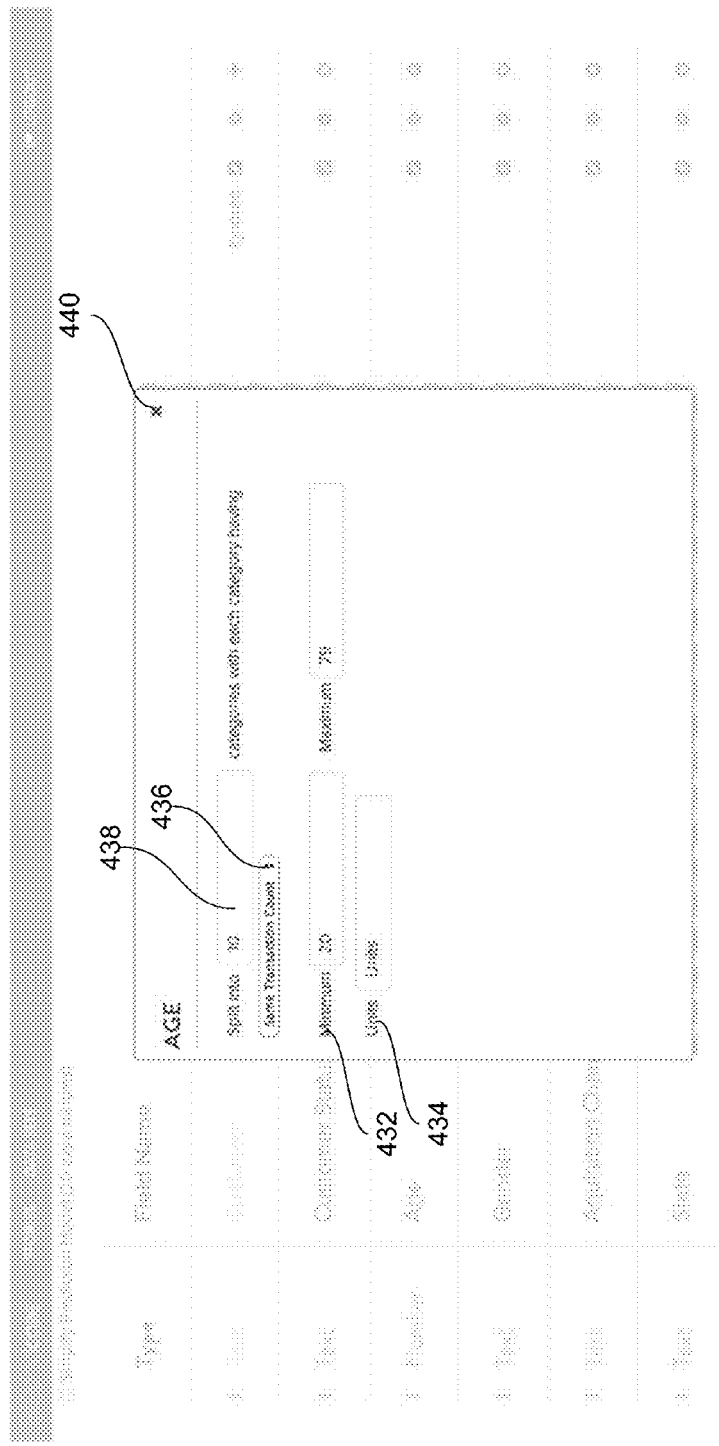

FIGS. 4A-4F illustrate various advanced settings and options that allow a user to customize how BeyondCore treats variables in the analysis, including ignoring specific variables. Referring to FIG. 4A, BeyondCore may automatically ignore variables (e.g., the 'Customer' variable) that are very sparse in information. As another example, an identification code that is unique for each row or observation may be ignored. The user may choose to undo the ignore (e.g., via UI element 410). The advanced setting of FIG. 4A also enables the user to rename variables (e.g., via UI element 412), specify advanced settings (e.g., via UI element 414), ignore a variable (e.g., via UI element 416), and the like.

FIG. 4B illustrates another example of advanced settings where the user can override BeyondCore's treatment of each variable to appropriately analyze text and categorical variables. For example, a user may Click All (UI element 420) to include all categories in the analysis, uncheck UI element 422 if he wants the data corresponding to the unchecked categories to be excluded from the analysis (rather than being included in an 'Other' category), uncheck a category (e.g., UI element 424) to exclude it from being specifically analyzed, or rename any category (e.g., UI field 428). If the user renames any two categories to the same name, they will be combined automatically. Smaller categories may be excluded (426) automatically by BeyondCore. UI element 430 enables the user to close the advanced settings window of FIG. 4B.

FIG. 4C illustrates yet another example of advanced settings where the user can override BeyondCore's automated categorizations to tailor the analysis of numeric variables.

Figure 4D:
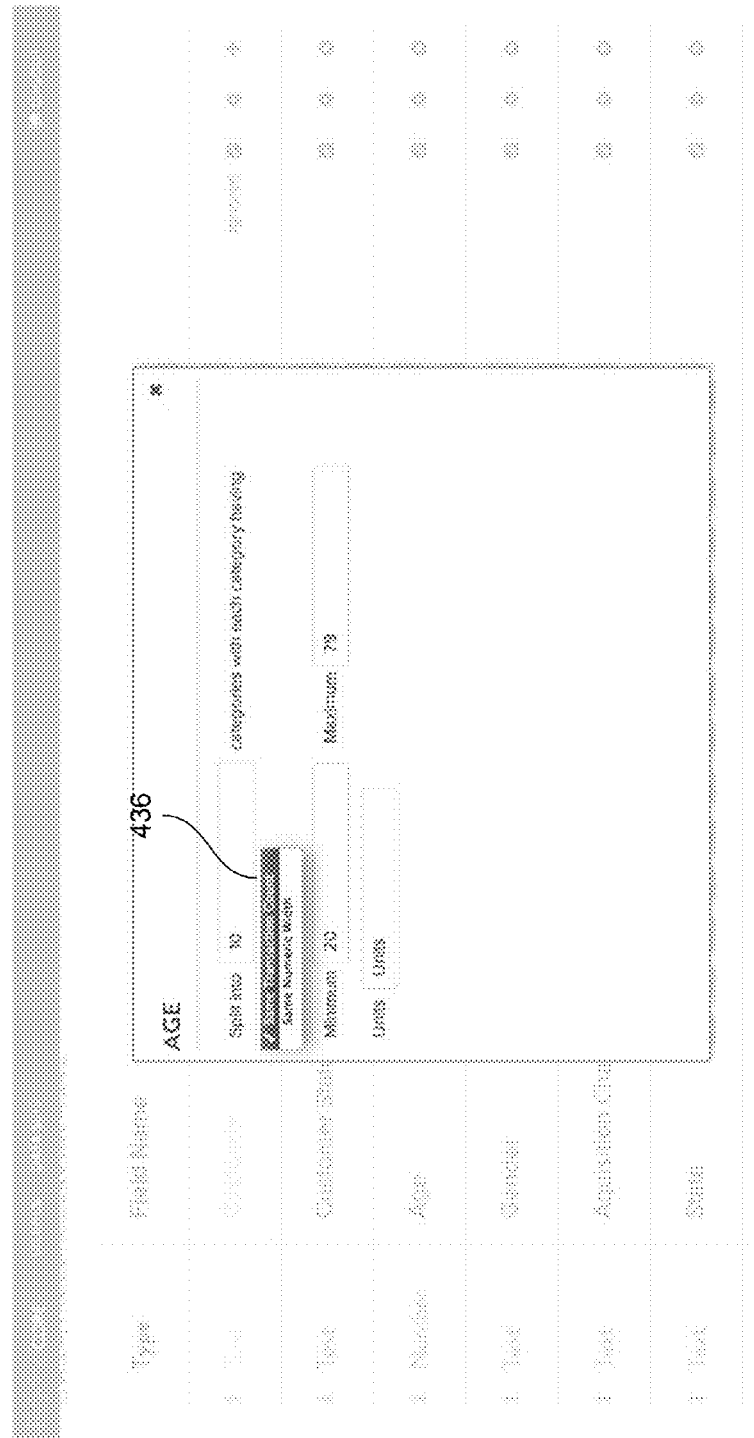

BeyondCore breaks numbers into categories, as is typically done when the user looks at numbers in categories. Either these are linear categories (0-9, 10-19), or are frequency-based such as deciles, percentiles, etc. By setting the categorization scheme up front, BeyondCore simplifies the analysis complexity and reduces privacy risk. The user may specify (e.g., via UI element 432) to exclude rows where this variable is lower than the specified Minimum or higher than the Maximum. The user may choose (e.g., via UI element 434) to set up the categories so they have the same number of rows (deciles, quartiles, etc.) or the same numeric width 0-9, 10-19, etc. The user may also set categories with fixed widths rather than categories based on number of transactions (e.g., via UI element 436, and as explained further with reference to FIG. 4D). The user may also specify (e.g., via UI element 438) how many categories should we split this variable into for graphs. UI element 440 enables the user to close the advanced settings window of FIG. 4C. FIG. 4D illustrates that the user may also set categories with fixed widths rather than categories based on number of transactions (e.g., via UI element 436). In this example, BeyondCore uses transaction count categorization as a default because it is the most useful approach statistically. However, the user may want to have fixed widths such as 10 year age groups (1-10, 11-20, 21-30, etc. . . . ). Toggling this box 436 changes that method of categorization.

Figure 4E:
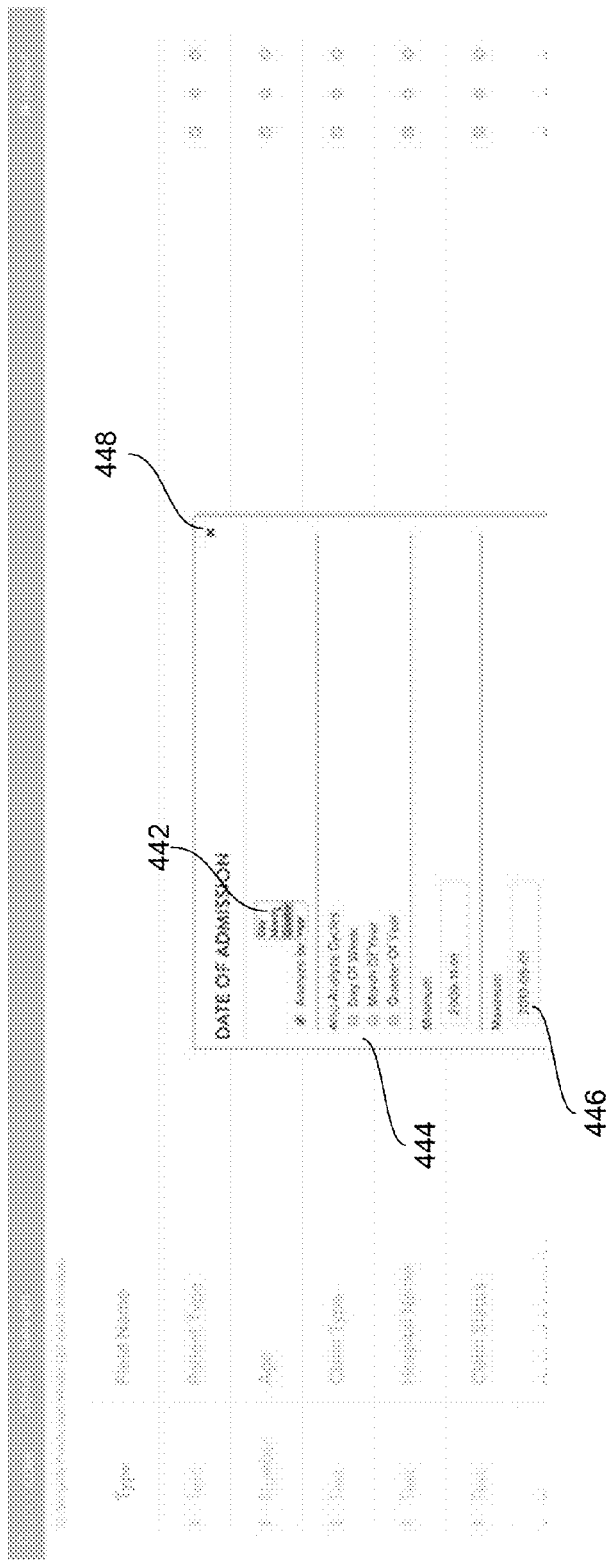

FIG. 4E is an example of a user interface that enables a user to overrule the specific decisions BeyondCore automatically makes to appropriately analyze date variables. Often, it is important to test for cyclicity when analyzing date fields. For example, sales may jump on Saturdays, or in November. In traditional analysis, users have to apply pre-specified transformations to the data to detect/address cyclicity. With BeyondCore, the user may only need to specify at which detail level to look for cycles. It will automatically learn and adjust for cyclicity, even if the pattern is specific to an unrelated variable, like gender or state (e.g. men buy more on Friday and women on Saturday). For example, the user may specify whether to report the date variable (e.g., 442) by Date, Month, Quarter, etc. The user may specify the granularities 444 at which we should look for and report cyclical behavior. The user may specify to exclude rows where a variable (e.g., 446) is lower than the specified Minimum or higher than the Maximum.

Figure 4F:
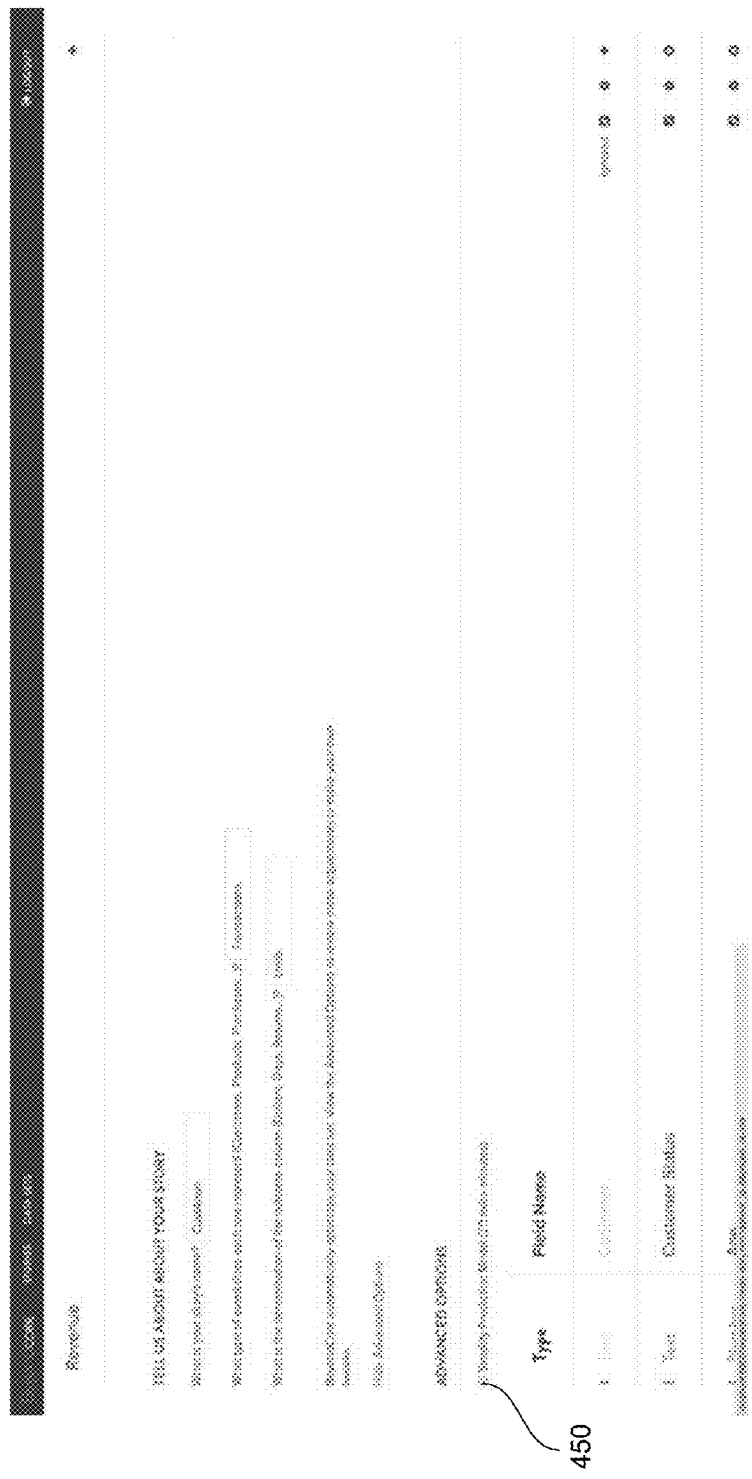

FIG. 4F illustrates an example where a user may specify (via UI element 450) that BeyondCore should generate the simplest prediction model possible, even if it takes extra time. BeyondCore potentially looks at millions of variable combinations to create the best regression model based on the data. However, because business users do not always understand "net effect," the BeyondCore model does not look like a traditional statistical model. For example, a model may include an effect for males and a separate effect for females rather than just a net effect for males. While the second approach creates a simpler model, it is sometimes more difficult for business users to understand. Expert users can specify "simplify prediction model" and BeyondCore automatically uses traditional term reduction approaches to craft a simpler prediction model for the data.

Figure 5A:
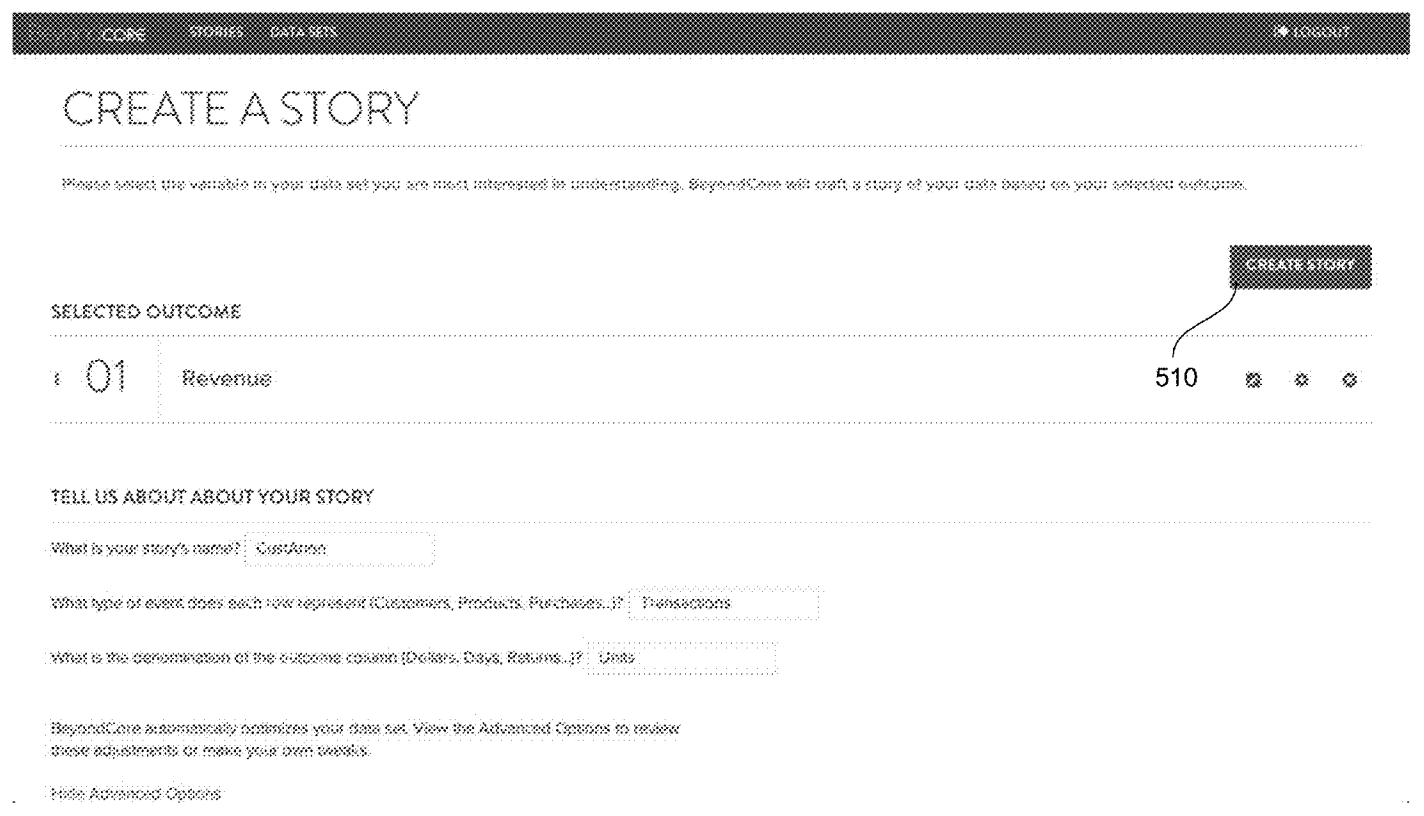
Figure 5B:
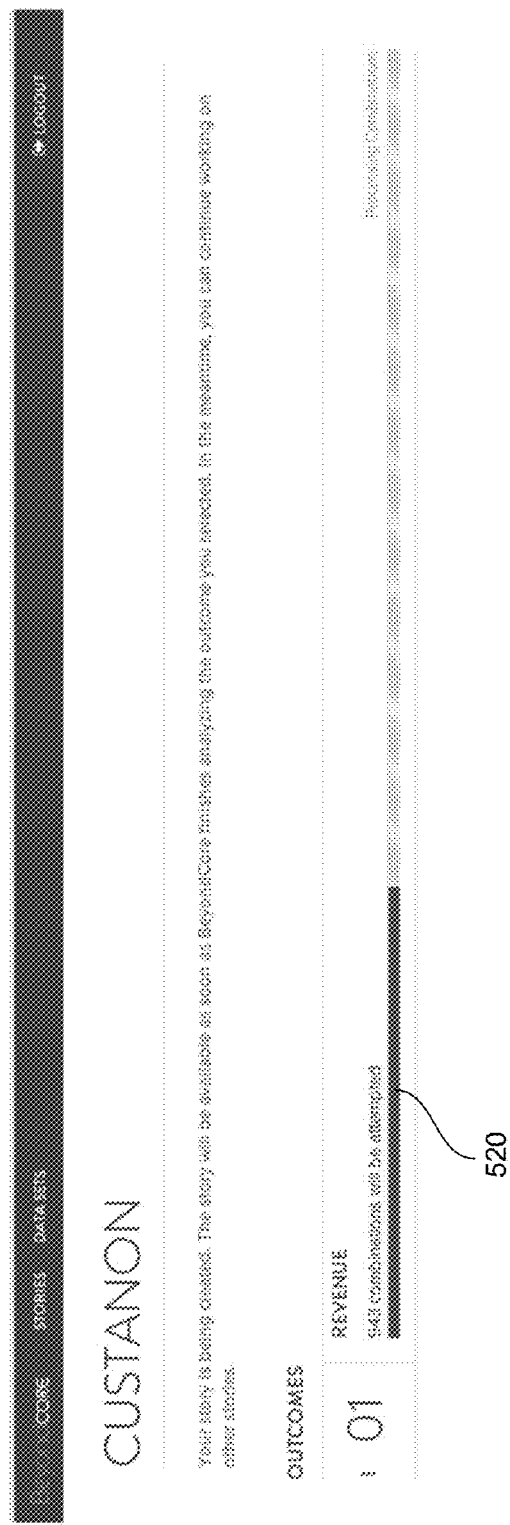
Figure 5C:
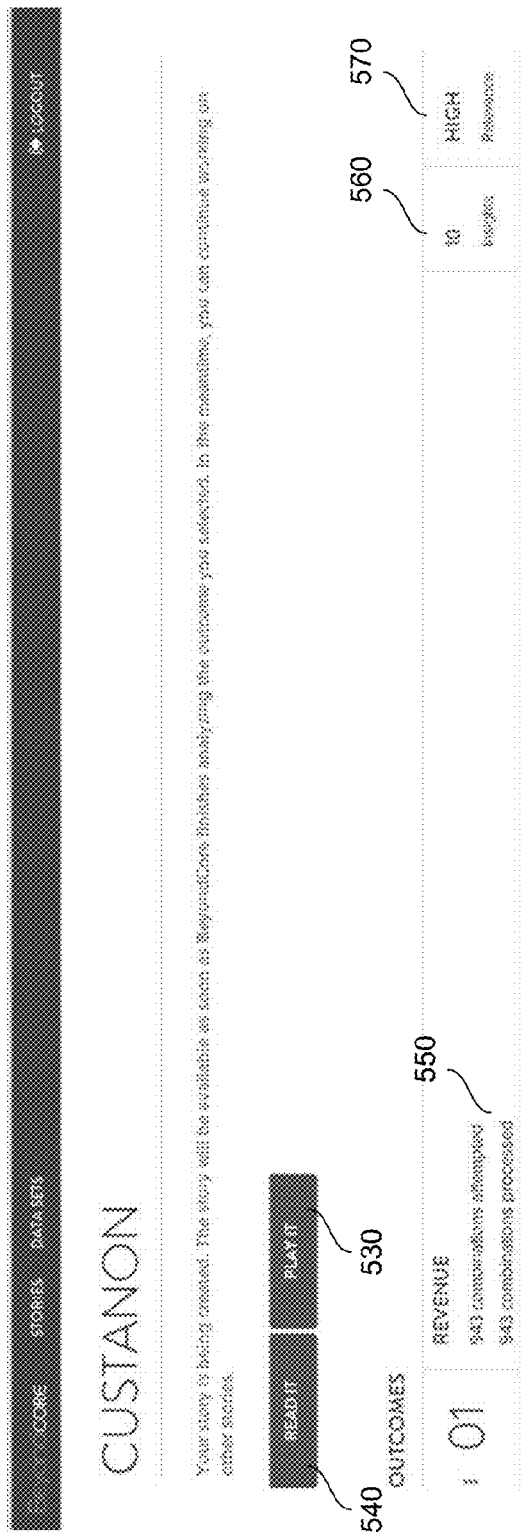

FIGS. 5A-5C illustrate the creation of a story by analyzing the user's data, subject to the user's specifications (described above with reference to FIGS. 3 and 4). Once the user has selected the outcome variable and made any desired adjustments, the user may click "create story" 510 (FIG. 5A) to create a story using the data previously provided. The status bar 520 (FIG. 5B) shows the status of the current stage of analysis as BeyondCore analyzes (all) possible variable combinations. The story page (FIG. 5C) informs the user of how confident BeyondCore is of the analysis based on the unique characteristics of the user's data, and lets the user either play the animated briefing 530 or read the story 540. Playing the animated briefing 530 takes the user through the key insights in his data. Reading the story 540 provides an executive report. The story page also displays 550 the number of combinations for which there was sufficient data to analyze and points out the number of insights 560 and statistical relevance 570. If BeyondCore says the relevance is LOW, it means the variability (noise) in the data was too high. The user may be able to address this by cleaning the data, increasing the amount of data he is analyzing or using the advanced setup page to filter out extreme cases from his data. Even though the relevance is low overall, certain specific graphs may still have sufficient significance.

Figure 6A:
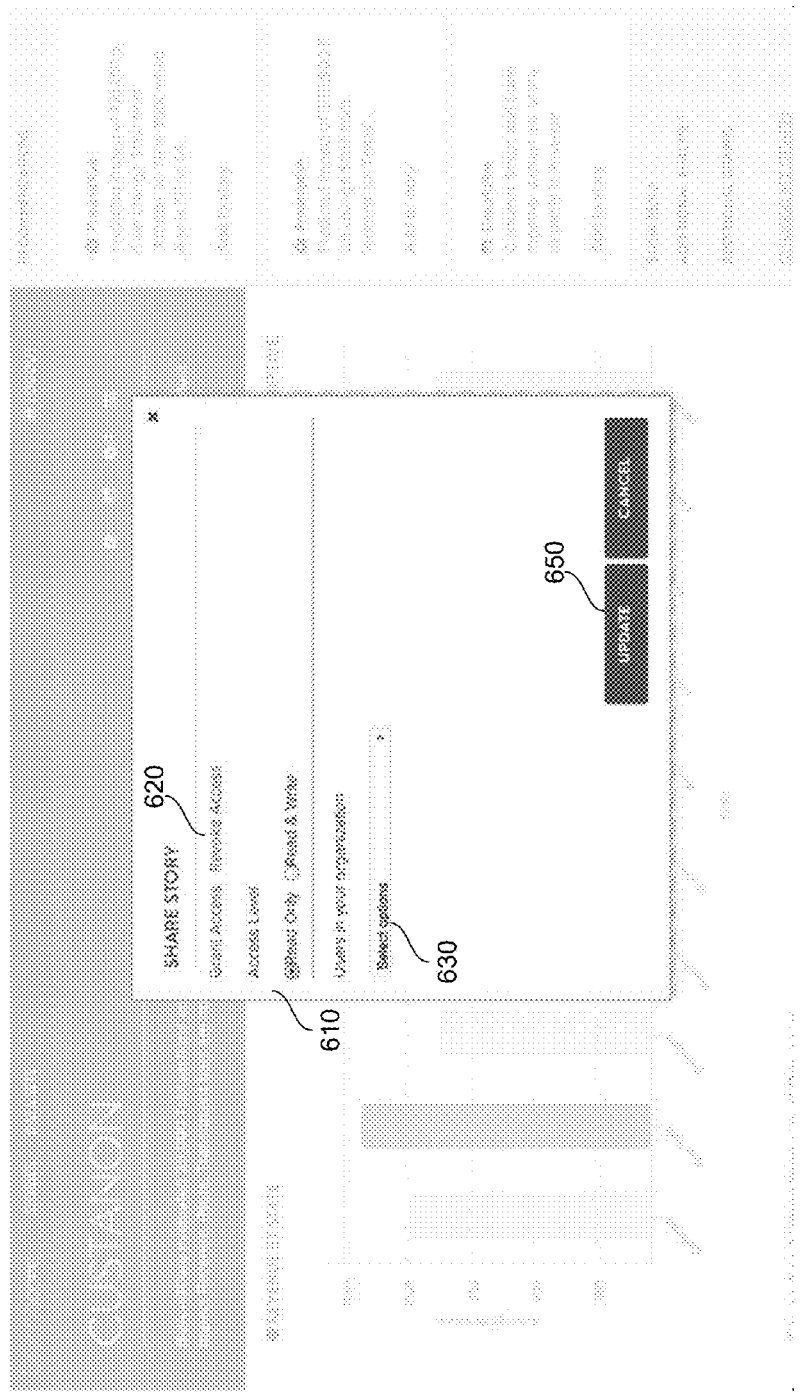
FIGS. 6A-6B are user interfaces that enable a user to share (FIG. 6A) or download (FIG. 6B) a story, according to some embodiments.
Figure 6B:
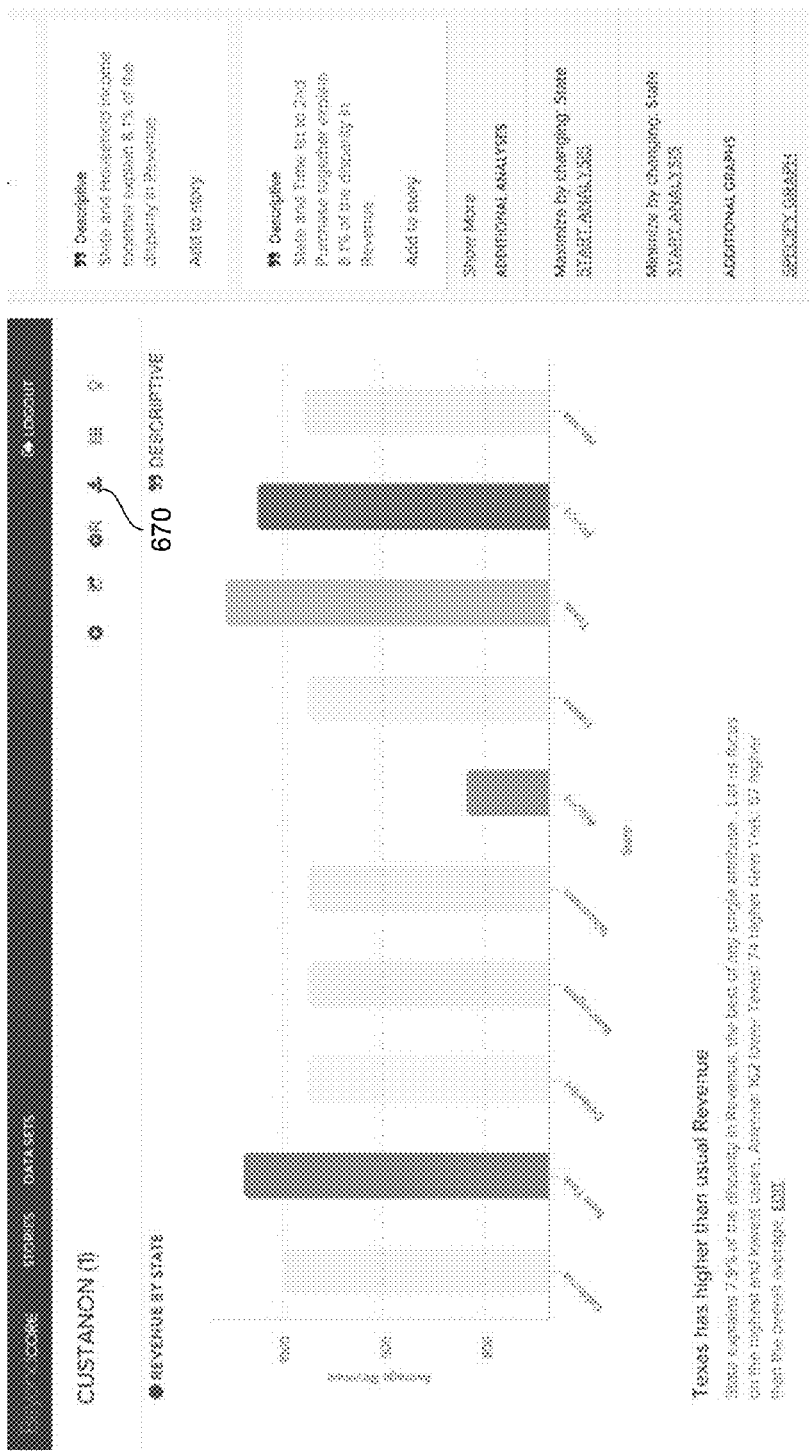

FIGS. 6A-6B illustrate user interfaces that enable a user to share (FIG. 6A) or download (FIG. 6B) a story. FIG. 6A illustrates that a user can share the story with other users in the organization and either authorize them to view the story or edit the story as well. Any edits made by authorized users can be seen by every other user. The user can use the 'History' link below each graph to revert to his preferred version of the story. BeyondCore users can be grouped into organizations and, in some embodiments, users can share stories only with people within their organization. If a user does not see a specific user in their share screen, the user may confirm that the specific user has registered with BeyondCore and is in the same organization as the user himself. Additional options to include allowing or denying editing capabilities of story 610, granting or revoking access to the story 620, selecting users with whom he wants to share his story 630 (e.g., via a drop down list that includes every user in the viewing user's organization that has registered with BeyondCore), sharing the story 650, and so on. Further, as illustrated in FIG. 6B, a user can download (e.g., via UI element 670) and email a static HTML version of the story to other licensed users in his organization. In some embodiments, only the main story (excluding the recommendations panel) is available through this HTML file. Users may also download the story in other formats such as PowerPoint, Word and pdf files.

Figure 7A:
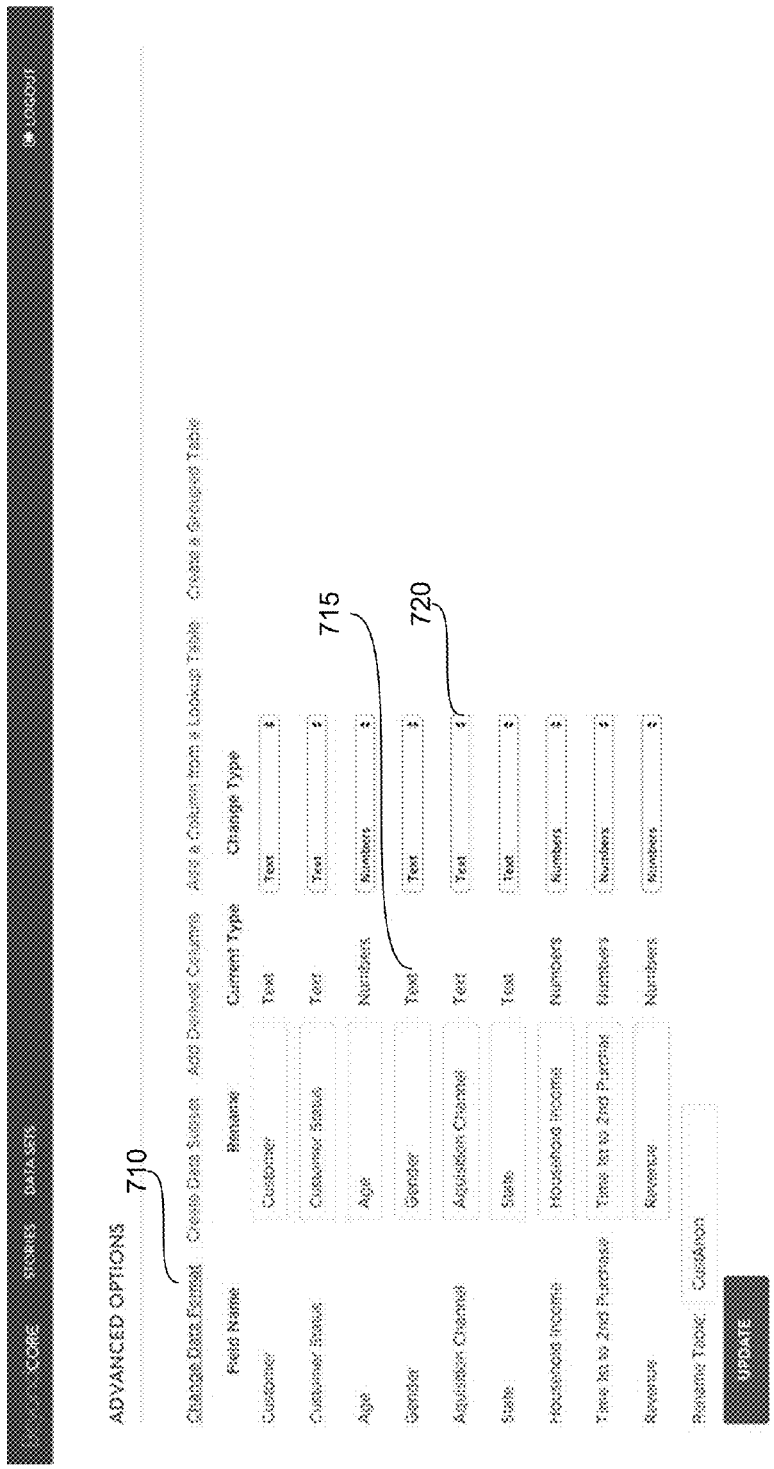
FIGS. 7A-7F are screen shots illustrating various data transformation and manipulation features underlying analysis, according to some embodiments.

FIGS. 7A-7F illustrate various data transformation and manipulation features included in BeyondCore and explained above. Referring to FIG. 7A, the user may 'Change Data Format' 710 to specify how his data should be treated. BeyondCore may guess the format of a variable (e.g., at 715), or the user may manually specify the format of a field (e.g., at 720). If the user has a numeric column that only has a few possible values (e.g. the only values are 0, 1, 1.5, 2, and 3) BeyondCore formats it as a text column instead of a number. This is because statistically such cases should be treated as categories and not as a number. If the user wants to use this column as an outcome though, the user may manually change the format to a Number. Also if a numeric field has a few non-numeric values (e.g. N/A) the user can use the Data Subset feature to exclude the rows with non-numeric values.

Figure 7B:
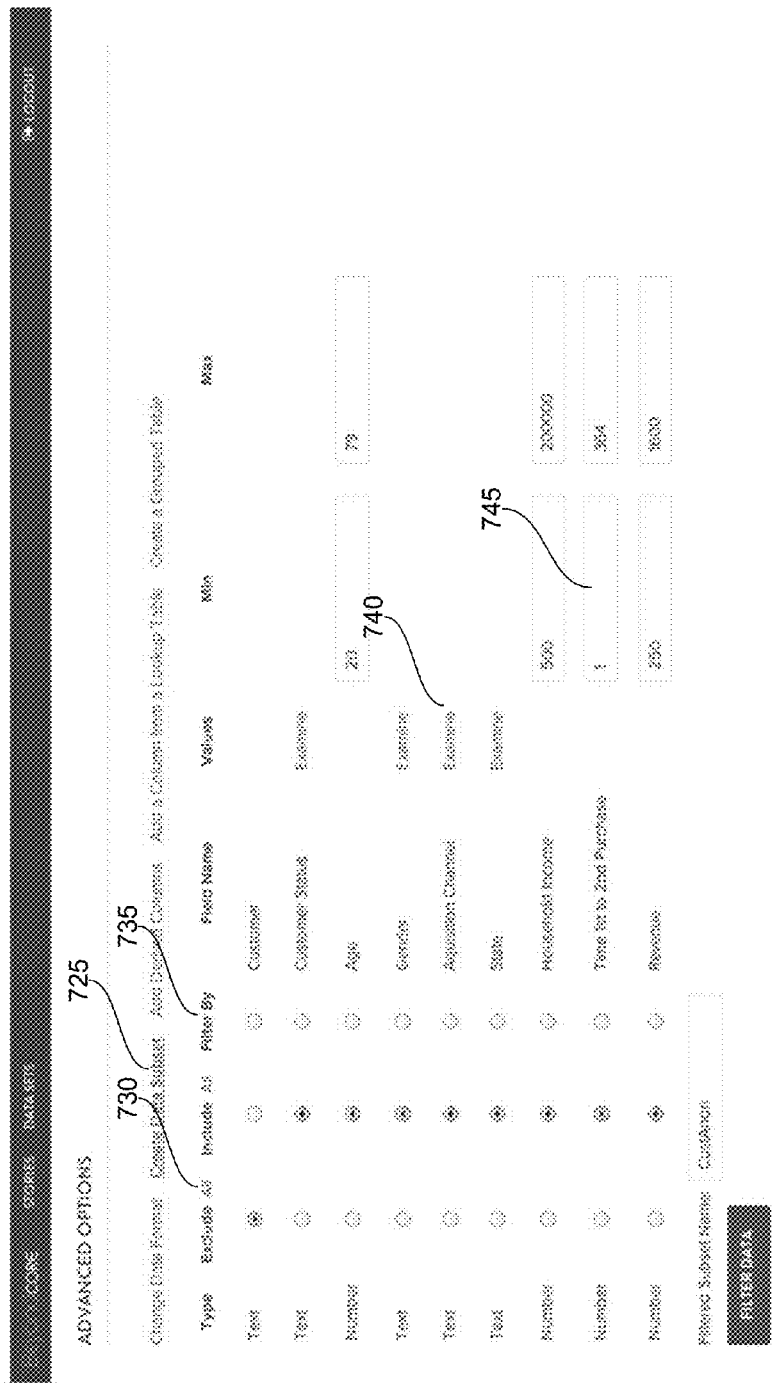

Referring to FIG. 7B, 'Create Data Subset' 725 allows a user to focus the analysis on a subset of his data. For example, the user may exclude 730 a selected column from the analysis, filter based on specified criteria 735, specify filters for categorical variables 740, and exclude rows 745 where a selected variable is below the minimum or above the maximum.

Figure 7C:
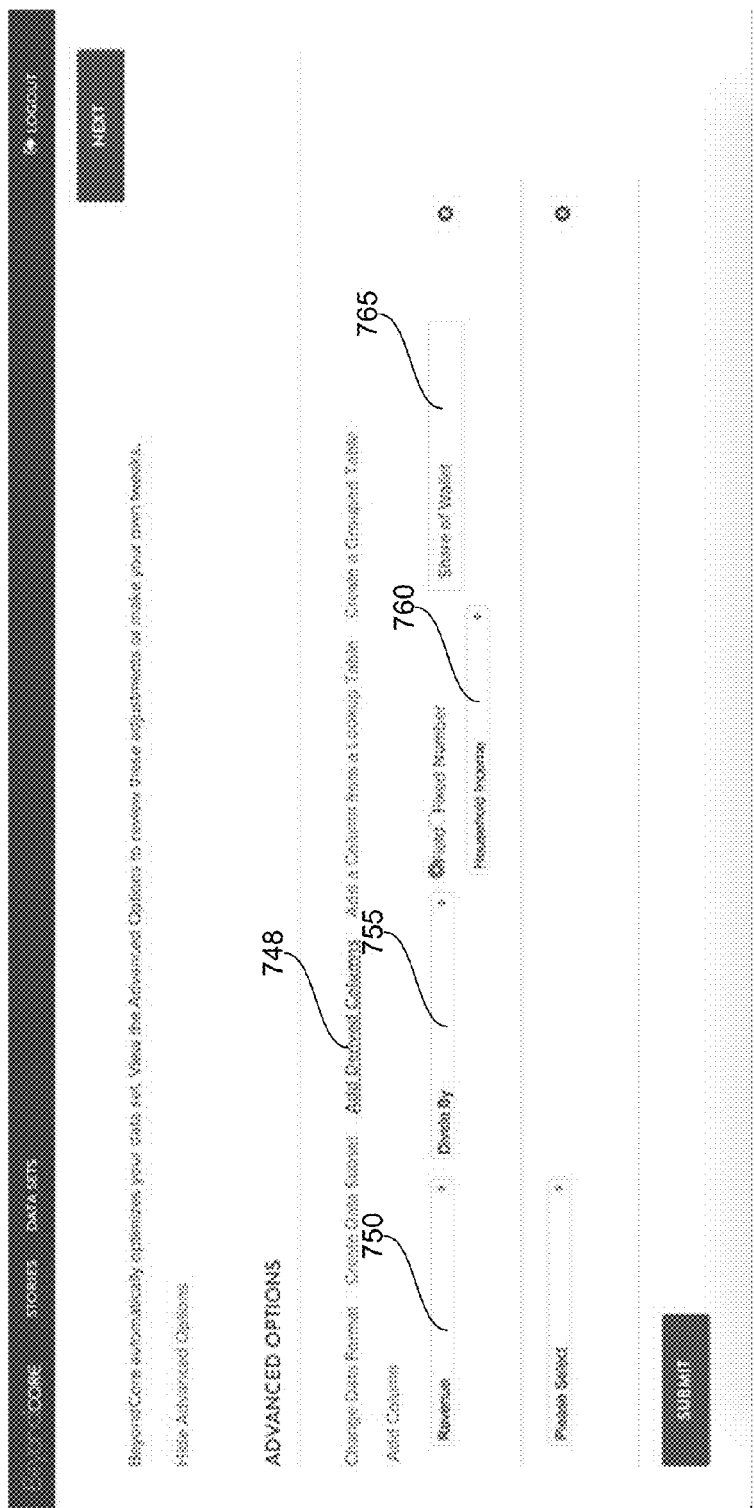

Referring to FIG. 7C, the user may 'Add Derived Columns' 748 which enables the user to create new variables based on the existing variables in his data, for example, calculating the ratio of two columns. The user may specify the variable to be transformed 750, choose the transformation 755, specify other criteria for the transformation 760, and name the new derived column 765.

Figure 7D:
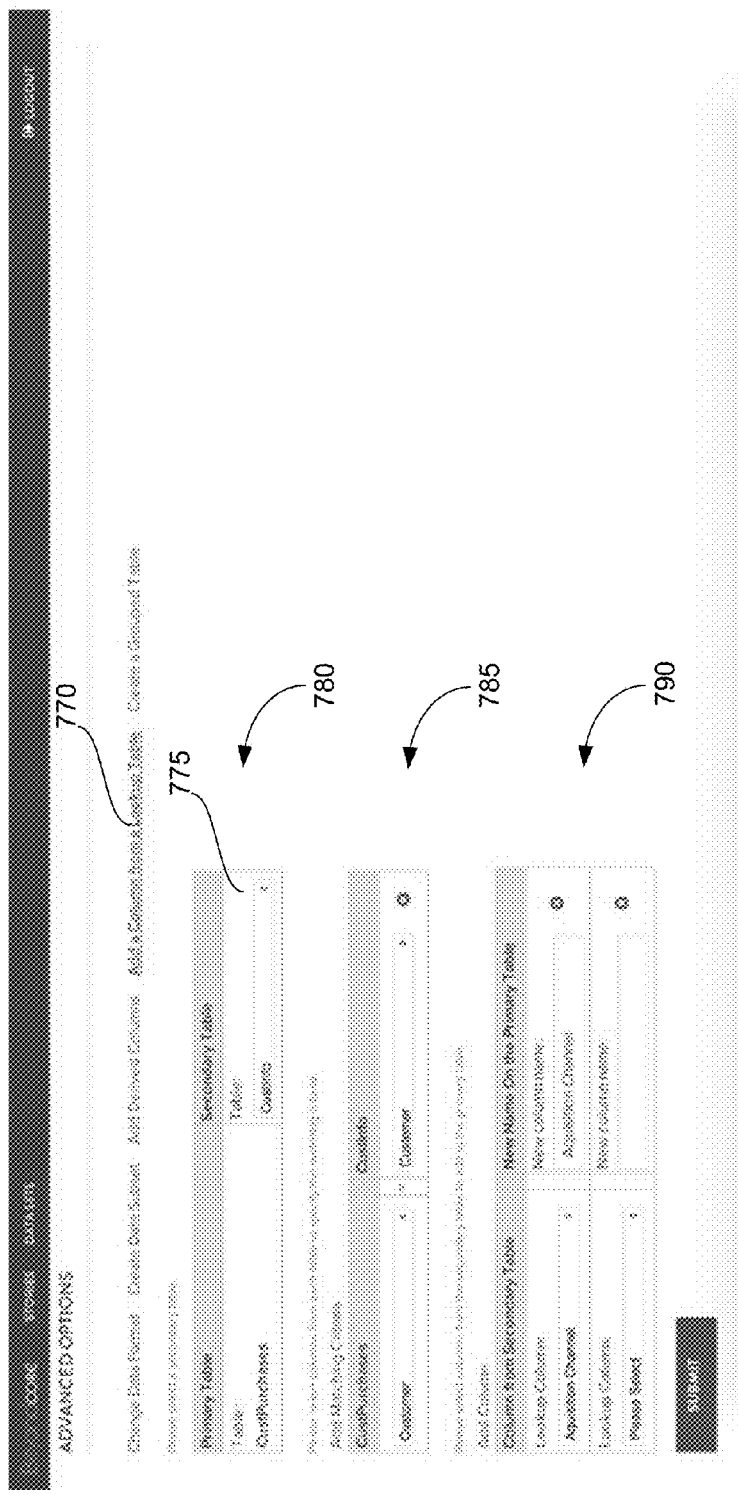

Referring to FIG. 7D, the user may additionally 'Add a Column from a Lookup Table' 770 to combine data from multiple data sets (same as a database Join). The user interface of FIG. 7D shows the user all the tables 775 that the user had already loaded or pointed to from the BeyondCore server. The user may then choose a table that the user wants to look up data from 780, specify the matching criteria (here the customer IDs have to match) 785, and specify the variables the user wants to look up from the new table 790.

Figure 7E:
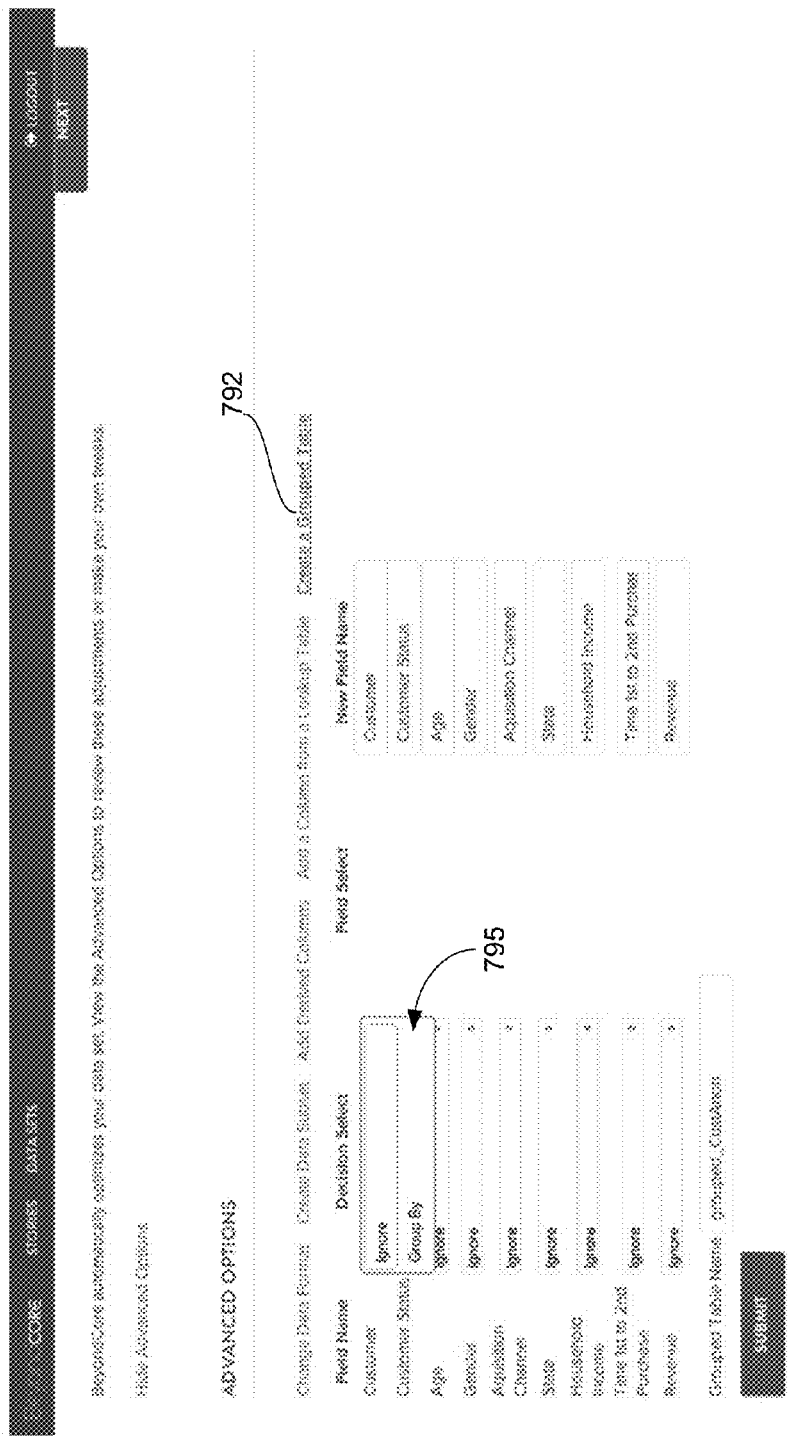
Figure 7F:
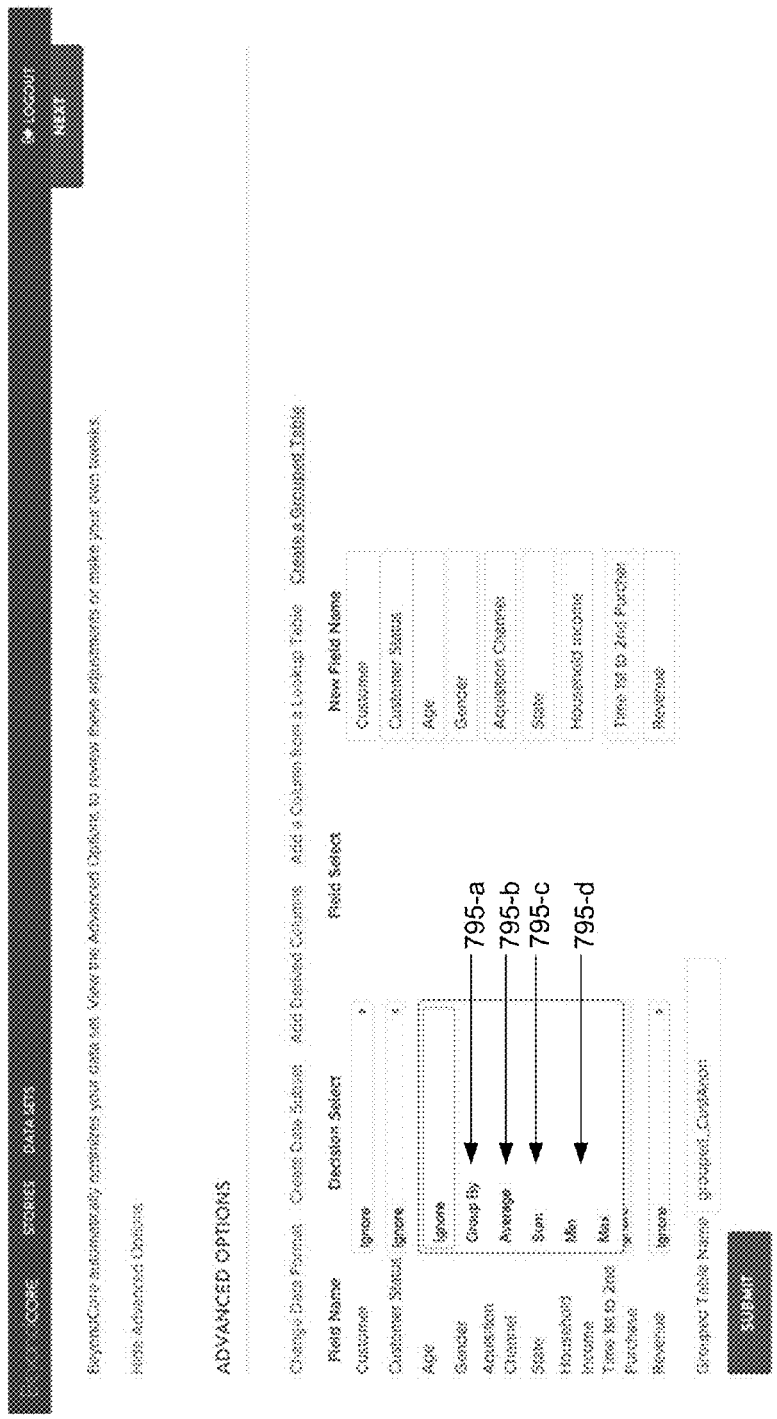

Referring to FIGS. 7E-7F, the user may 'Create a Grouped Table' 792 to combine (tabulates) multiple rows in the dataset into a single one (same as a database Group By). The data is summarized and tabulated by the variable that the user chooses to 'Group By' 795. The user can also specify how BeyondCore tabulates each of the other variables in his dataset based on the primary 'Group By' variable—for example, group by the combination of a selected variable and any other 'Group By' variable that the user may specify 795-*a*, by an average of a selected variable for each distinct value of the 'Group By' 795-*b*, the sum of a selected variable for each distinct value of the 'Group By' 795-*c*, the minimum or maximum value of this variable for each distinct value of the 'Group By' 795-*d*, and the like.

Animated Briefing (Descriptive and Interactive Graphs)

In one or more embodiments, a multi-screen reporting is generated to indicate which variable combinations have a largest estimated impact on deviations from the norm. In such embodiments, the multi-screen reporting may comprise an animated briefing comprising a sequence of graphs describing which variable combinations have a largest estimated impact on deviations from the norm. Alternatively or in addition, the multi-screen reporting comprises a multi-page text report describing which variable combinations have a largest estimated impact on deviations from the norm. In some embodiments, contents of the multi-screen reporting depend on a user's interaction with the multi-screen reporting. In some embodiments, the user's interaction with the multi-screen reporting are tracked. In some embodiments, the user's interaction with the multi-screen reporting are tracked in a manner that is auditable. In some embodiments, changes to the multi-screen reporting resulting from the user's interaction with the multi-screen reporting are sharable with other users.

Figure 8A:
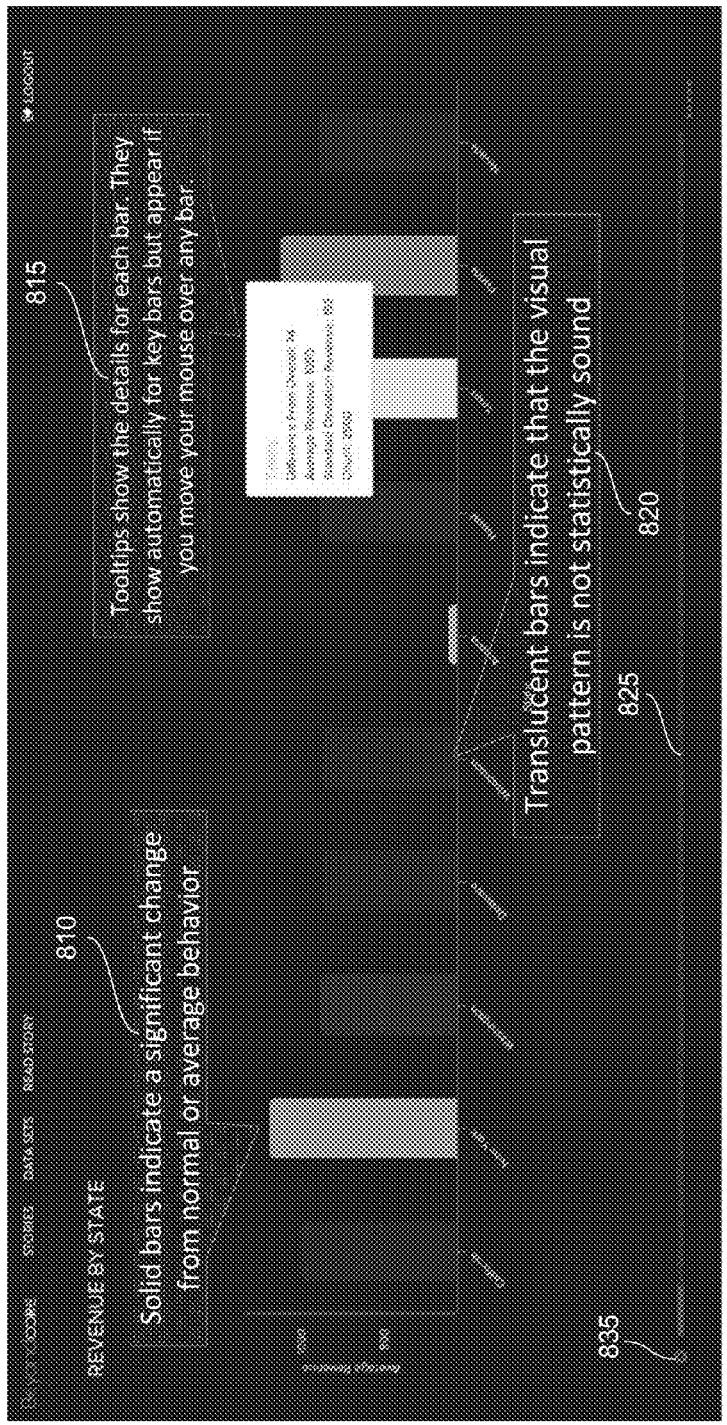
FIGS. 8A-8N are screen shots illustrating descriptive and interactive graphs that describe what is happening in a data set, according to some embodiments.
Figure 8B:
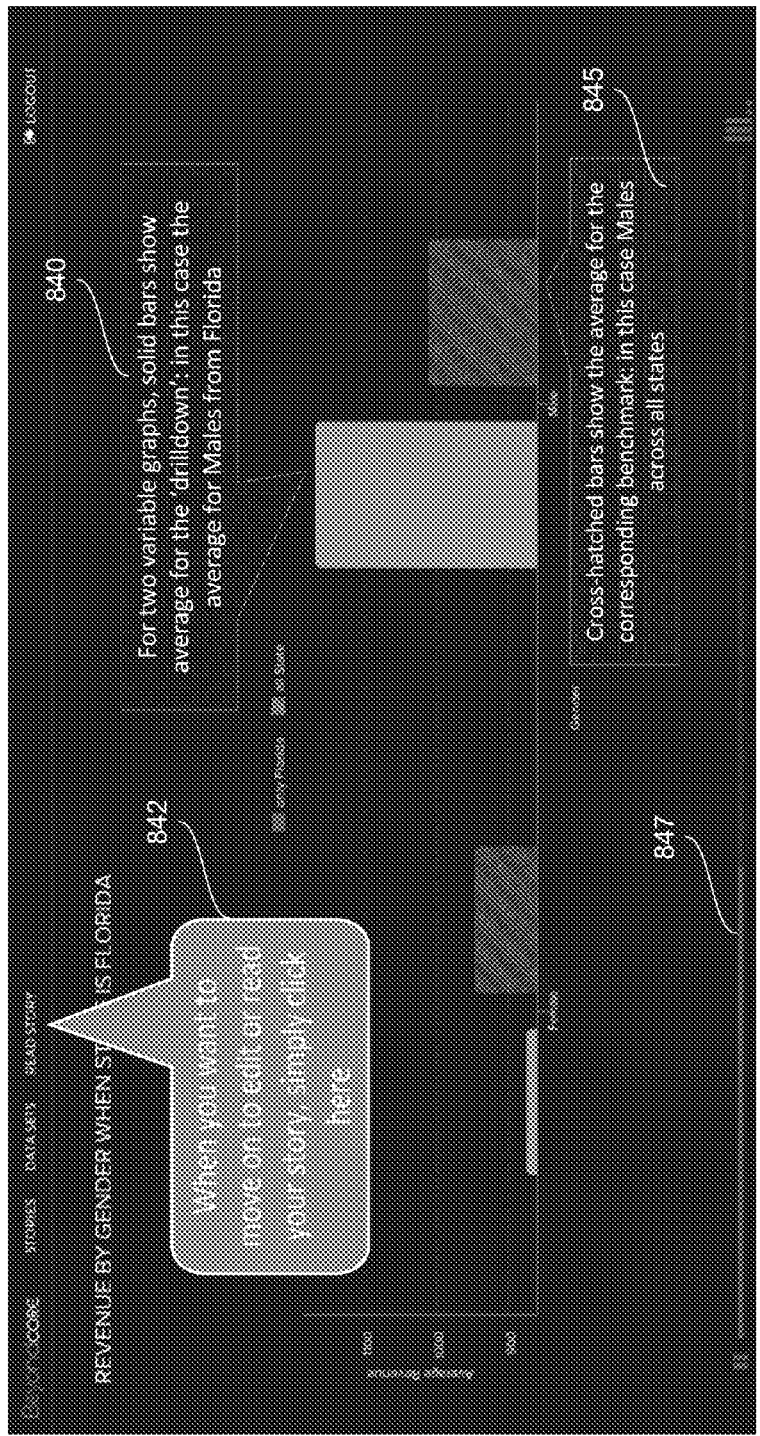
Figure 8C:
Figure 8D:
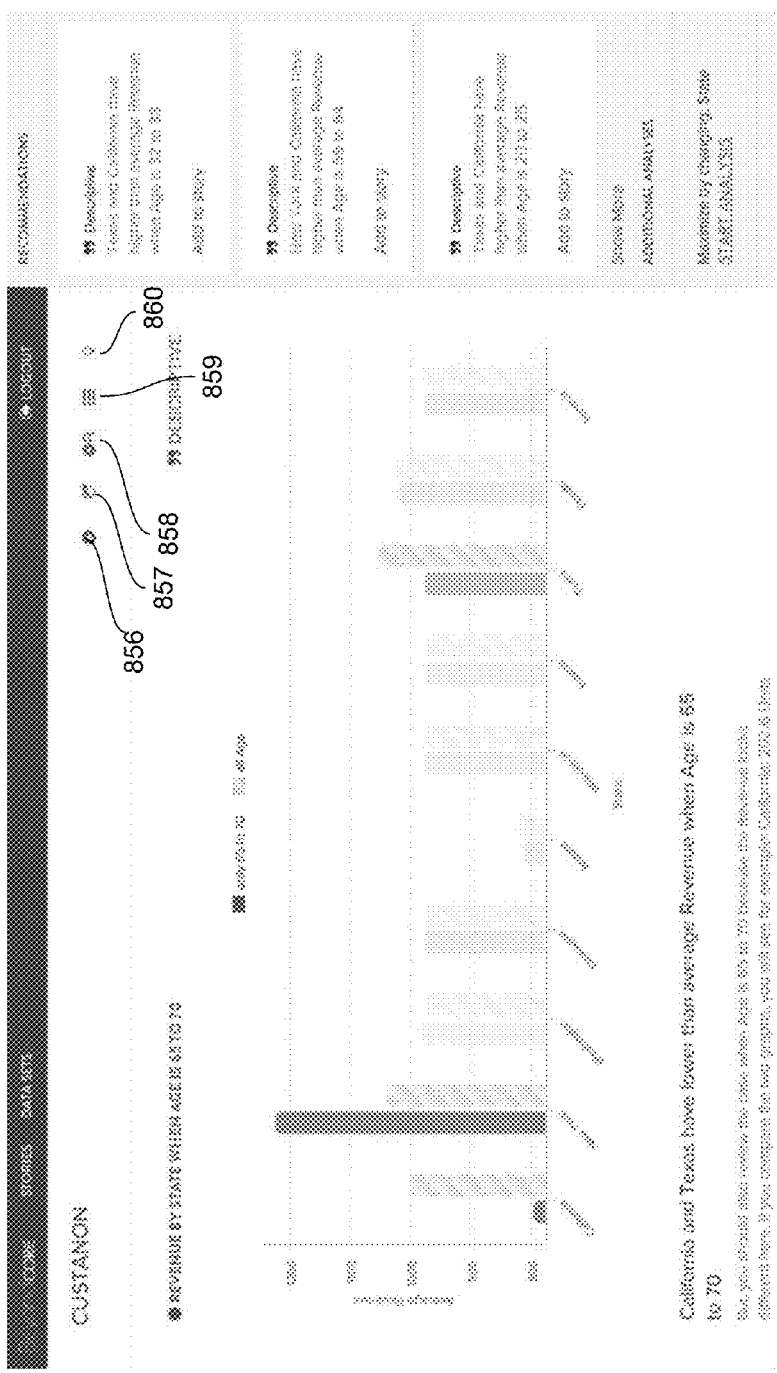
Figure 8E:
Figure 8F:
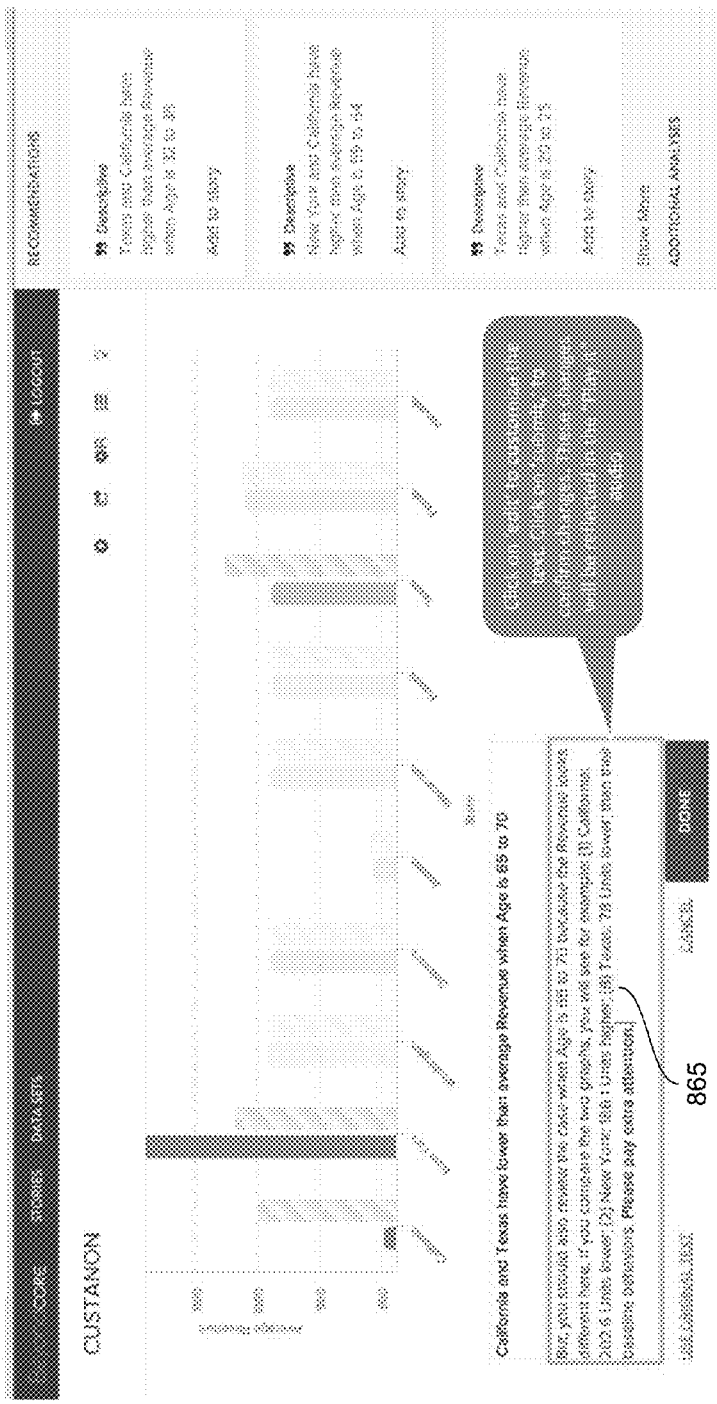
Figure 8G:
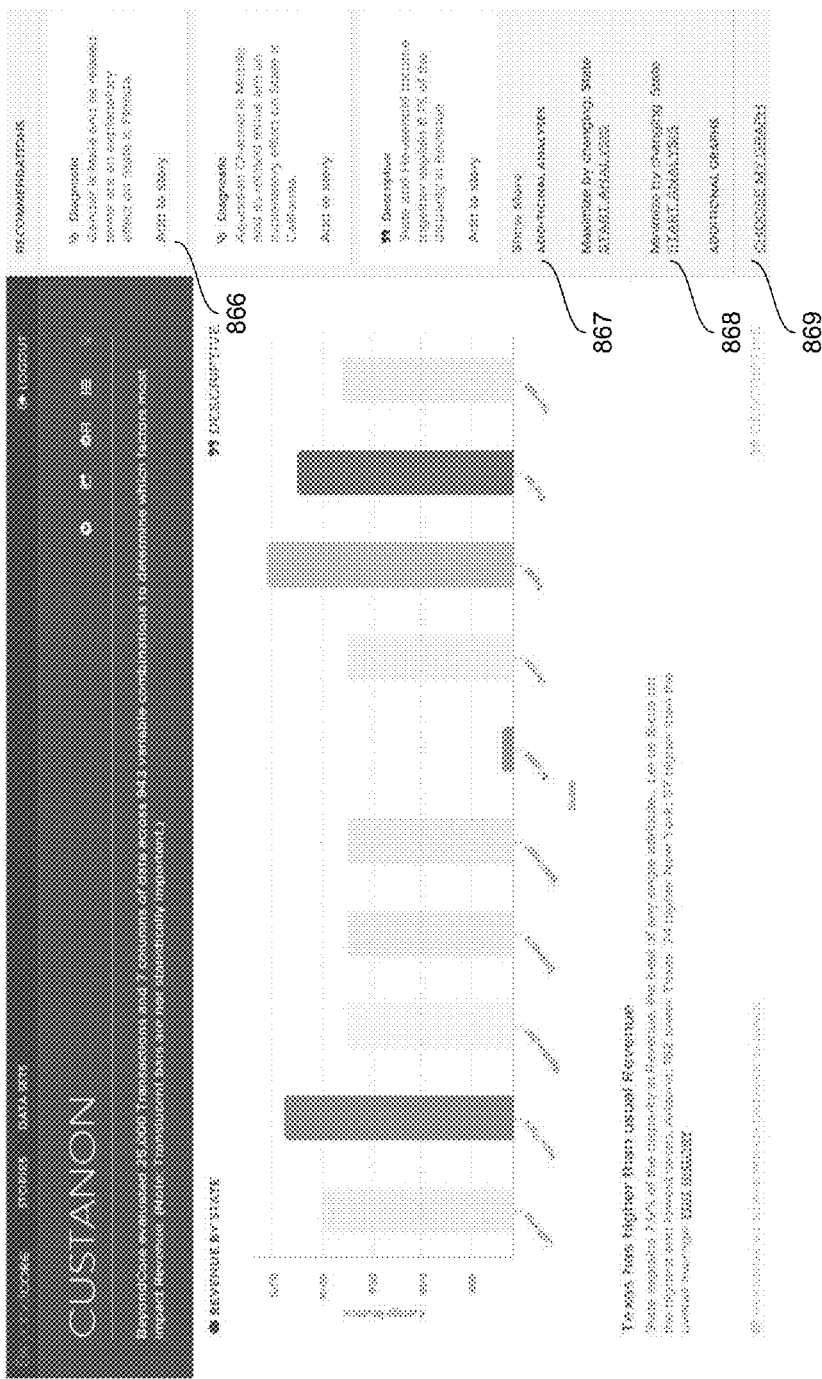
Figure 8H:
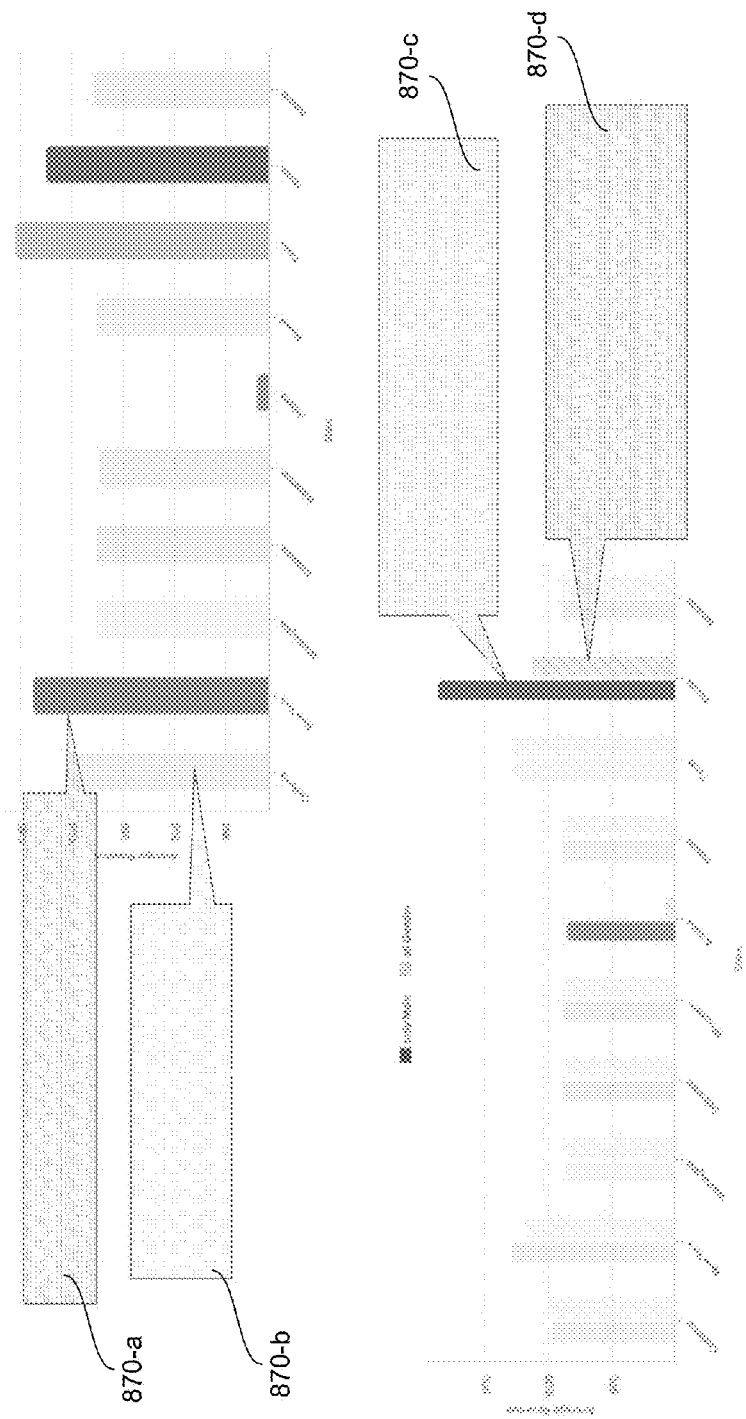
Figure 8I:
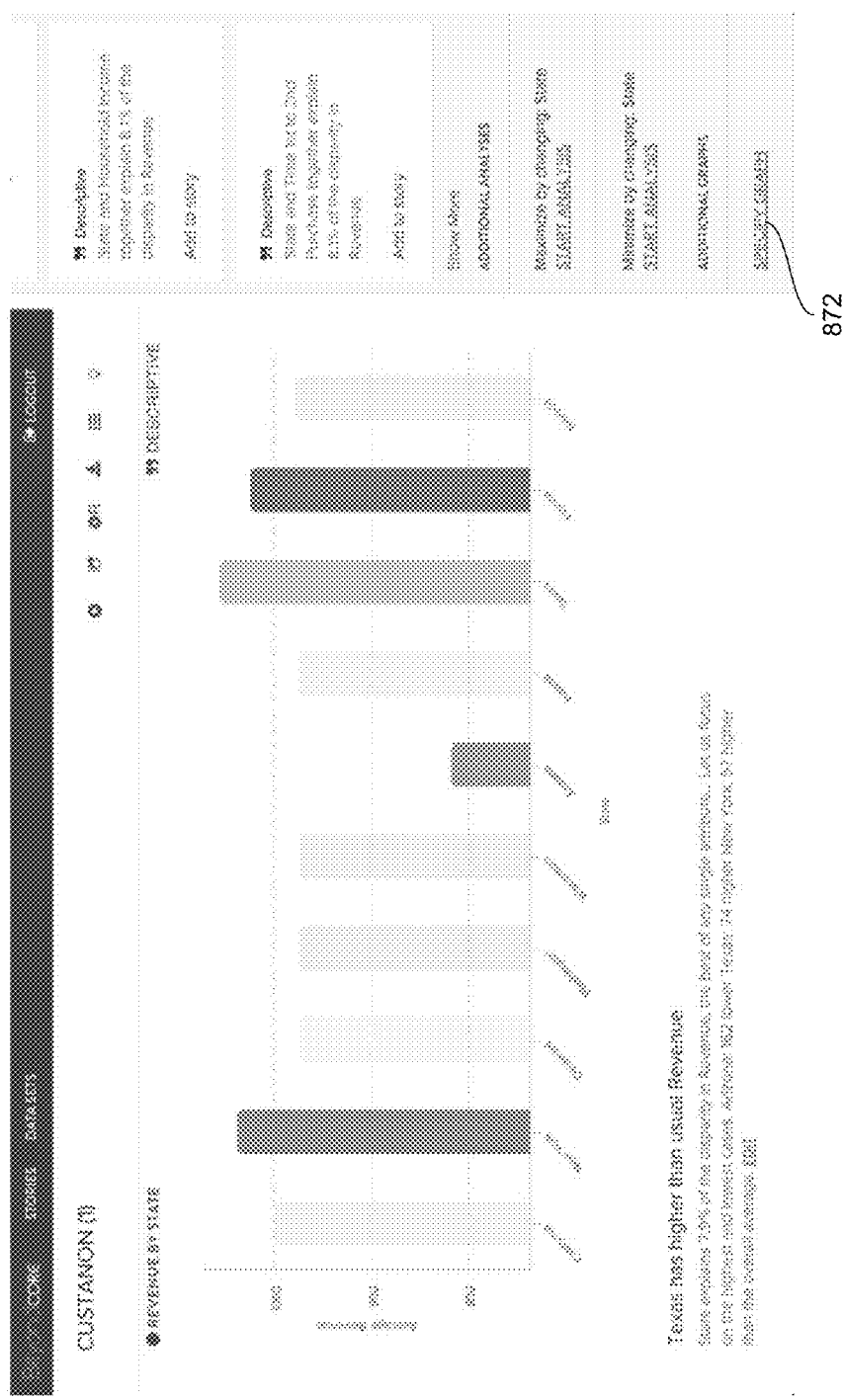
Figure 8J:
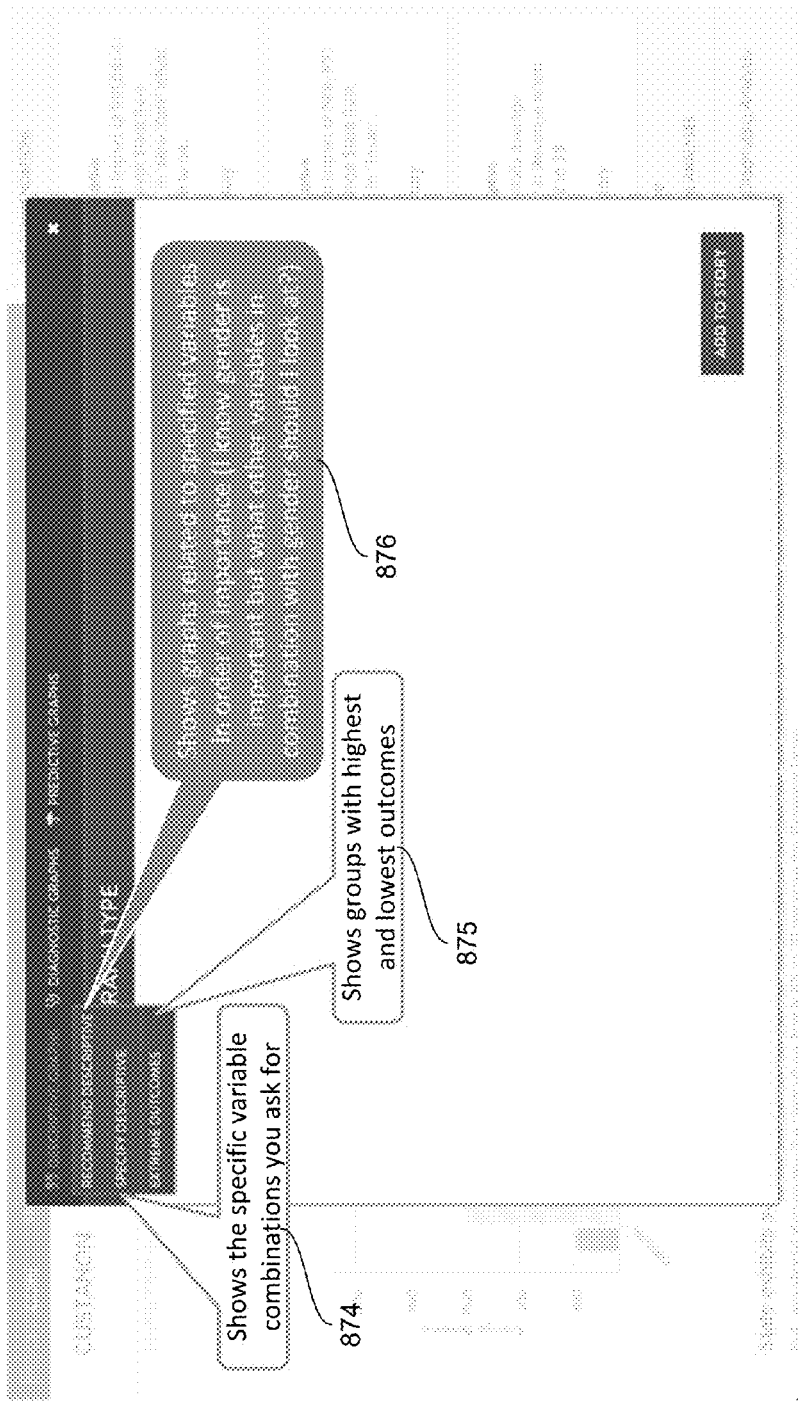
Figure 8K:
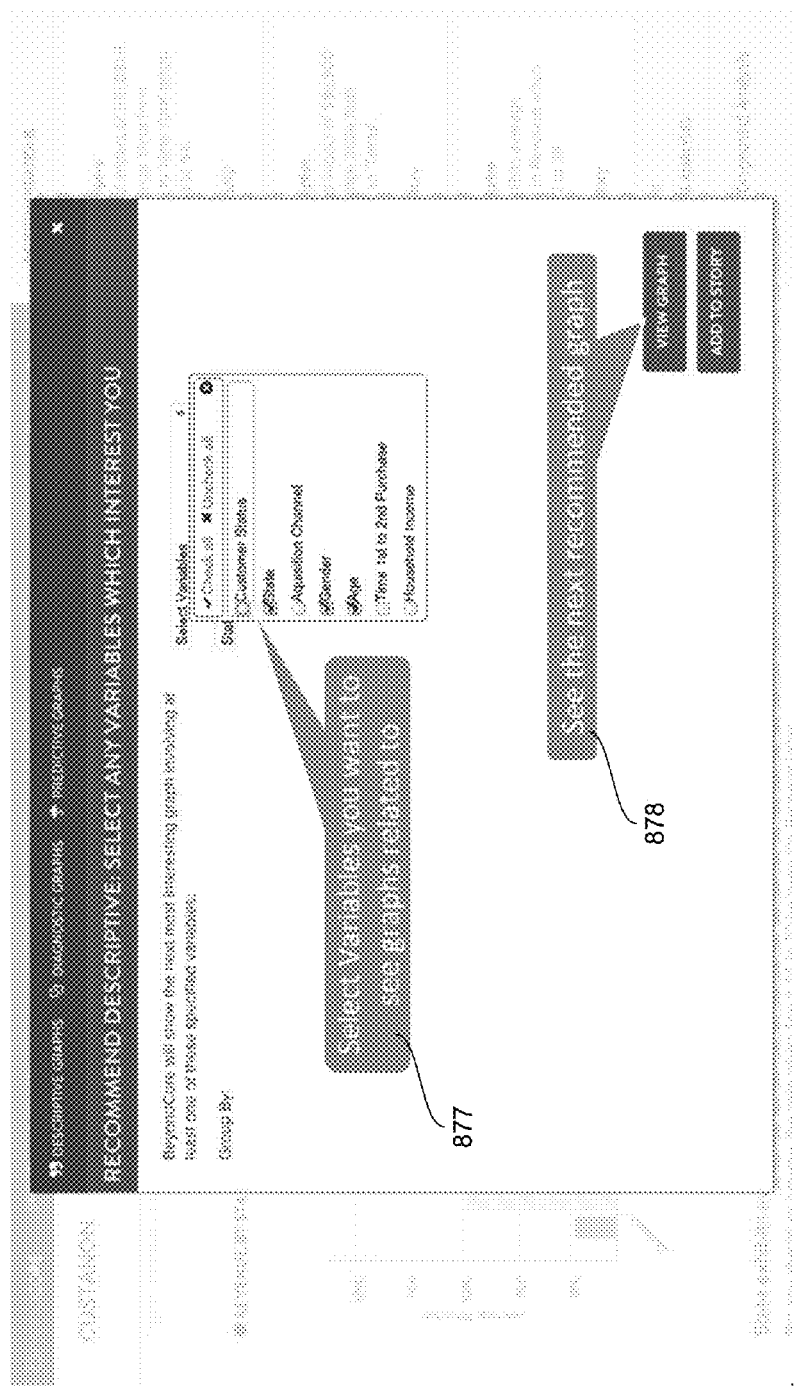
Figure 8L:
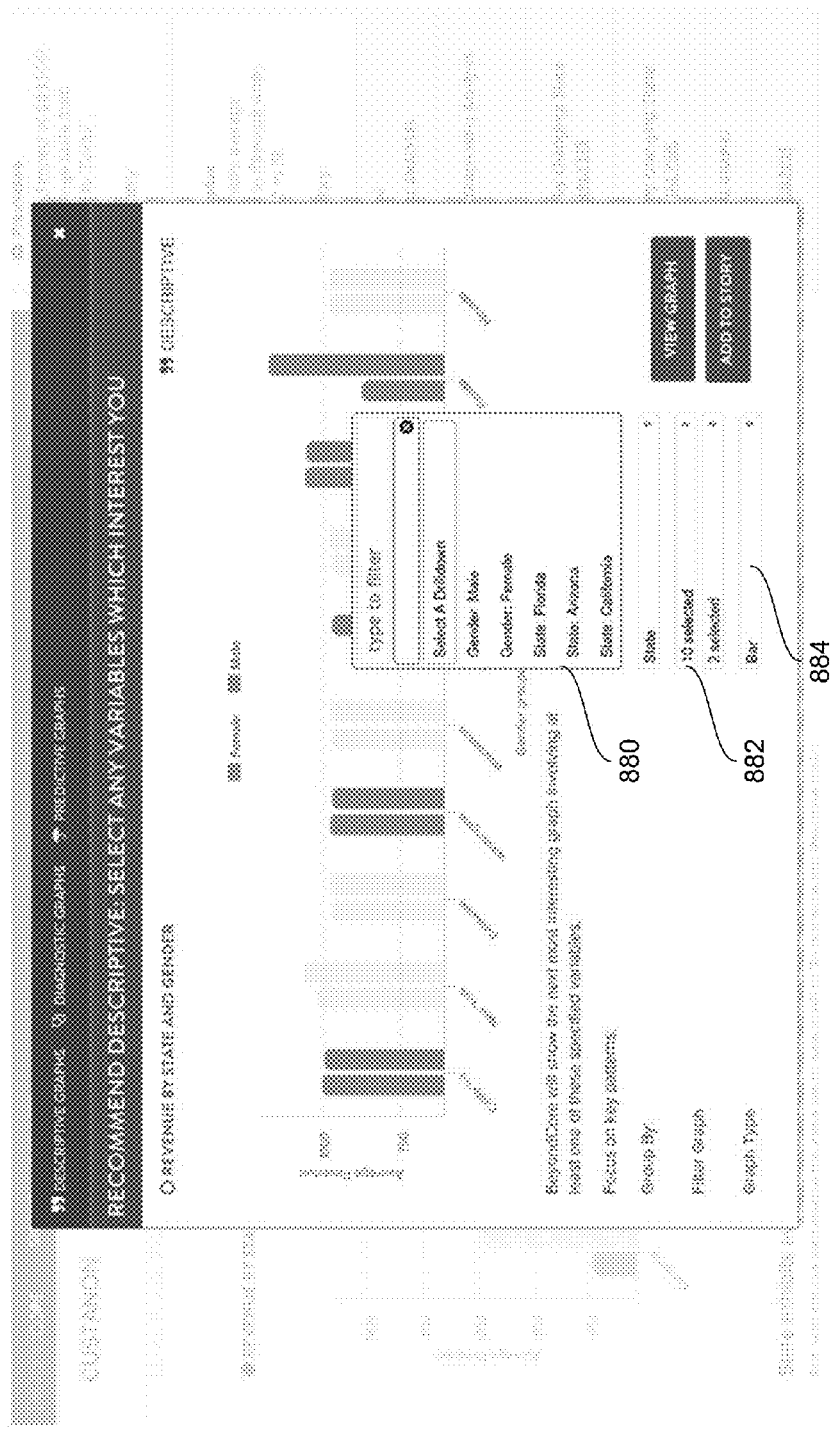
Figure 8M:
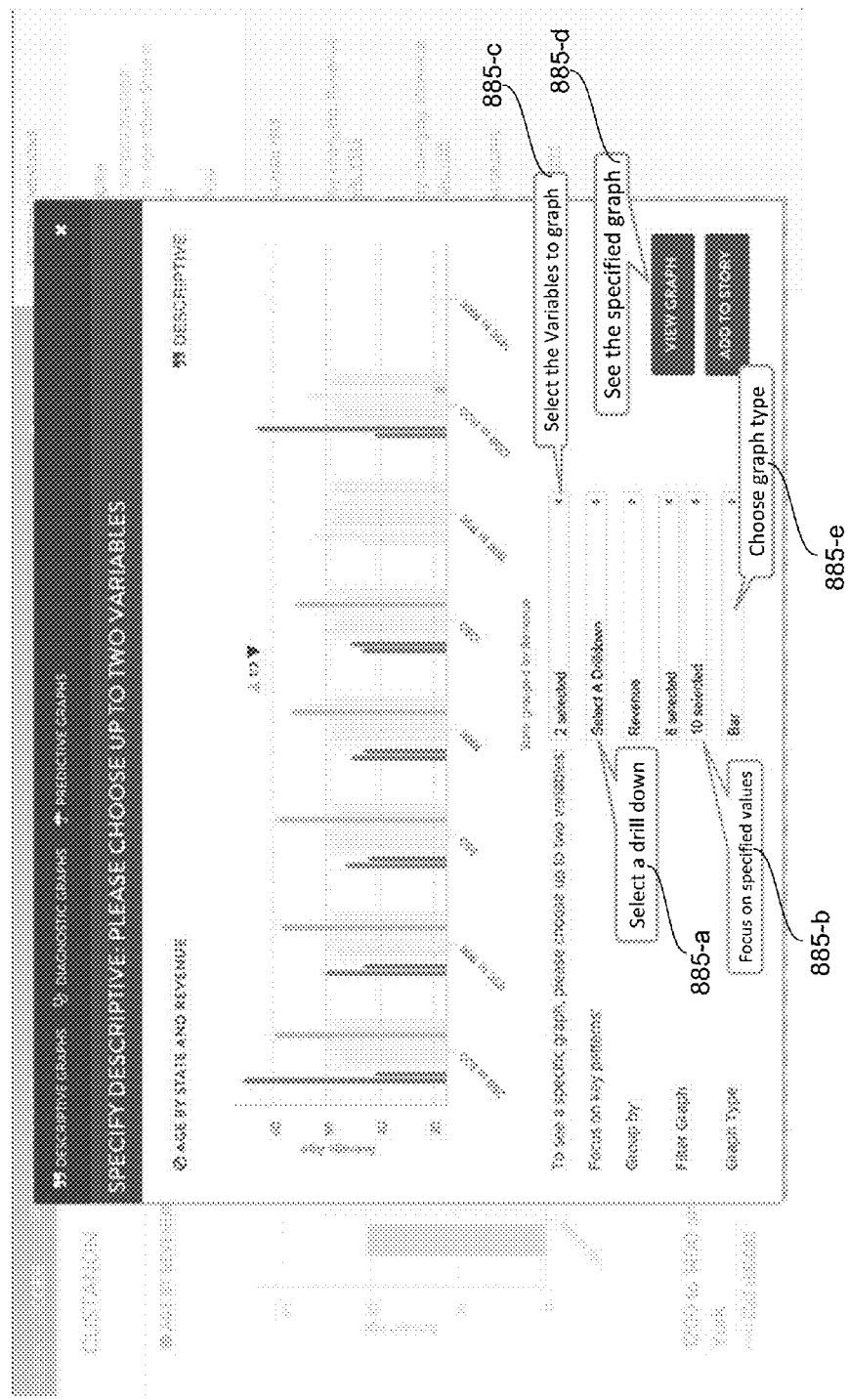
Figure 8N:
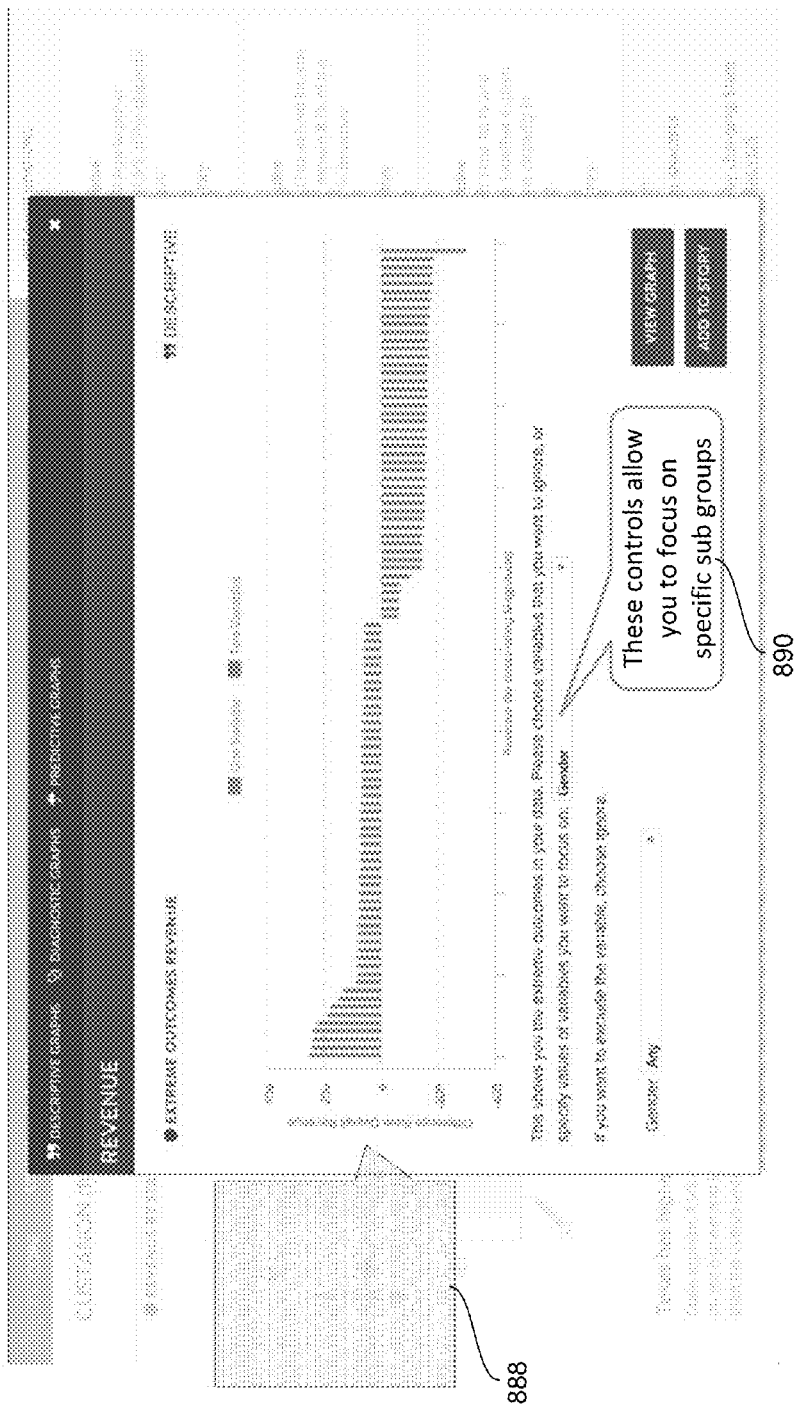

FIGS. 8A-8N illustrate descriptive and interactive graphs that contain information complementary to the analyzed data displayed on the graph. The complementary information (such as an animated briefing) may be overlaid on the graph in the form of a descriptive visual overlay or provided along with the graph as an audio narrative, to provide additional insight into the methodology, analysis frameworks, and assumptions underlying the analysis that went into generating the graphs. Moreover the overlays provide guidance to the user on how to interpret the graphs and call out key insights in the graphs. These animated briefings augment the graph and provide a visual or oral walk-through that accompanies the graph.

Referring to FIG. 8A, for instance, an animated briefing walks users through the key insights of an analysis. In this example, the outcome is average revenue and one of the variables is state. FIG. 8A is a bar graph that illustrates average revenue for each of various states such as California, NY, Washington, Delaware, and so on. The graph visually emphasizes the states for which average revenue is significantly different (greater or less) than the average revenue for all states combined. The graph also visually deemphasizes the states for which average revenue is not significantly different from the average revenue for all states combined or for which the pattern is not statistically sound. This facilitates easy visualization of deviations from the overall norm for the dataset. This is an automatically generated slideshow. BeyondCore automatically provides the user guidance towards relevant insights, in this case creating "highlighted results" by making insignificant bars translucent and significant bars solid. In addition, the visual narrative guiding text 810, 815, and 820 may be displayed as legends to aid the user in interpreting these graphs. An audio narrative may be concurrently played to guide the user through the key insights. The progress bar 825 indicates the on-going or paused audio briefing and the pause/play button 835 facilitates starting or stopping the audio briefing.

Similar visual narrative guiding text 840, 842, and 845 are illustrated in FIG. 8B, and the progress bar 847 indicates the on-going or paused audio briefing. FIG. 8B is a bar graph that illustrates average revenue for females and for males—across all states (cross-hatched bars) and for the state of Florida alone (solid bars). These graphs are based on the analysis of different variable combinations. This graph allows for easy visualization of patterns of outcomes (average revenue, in this case), across multiple different variable combinations, thereby allowing for identification of deviations from normative behavior within subsets of data. In these examples, the narrative guiding text in blue boxes (such as 840, 845) provide information about the screen, the narrative guiding text in orange boxes (such as 842) are actions taken in this example walk-through, and narrative guiding text in white boxes (none shown in FIG. 8B) are other actions that could be taken.

As illustrated in FIGS. 8A-8B, two or more graphs in a multi-screen report (story) often are related to one another. One example is a parent-child relationship between two graphs, where a parent graph (e.g., FIG. 8A) is for a first variable combination (various states) and a child graph (FIG. 8B) is for a second variable combination (states by gender) that is a subset of the first variable combination. The multi-screen animated briefing presents the two graphs, but also includes an explanation of the relationship between the parent graph and the child graph. Another type of relationship is a sibling relationship. Sibling graphs include the same variables but differ in a value of one of the variables. For example, in FIG. 8B, the right graph {state; gender=male} and the left graph {state; gender=female} are sibling graphs. They could be presented on different screens, in which case an automatic explanation noting the relationship would be more important.

The story page shows an executive report based on the results of the analysis. Illustrated in FIG. 8C are four main areas: Home Menu, Toolbar 850, Story 854, and Story Menu 852. Toolbar 850 drives the Story Menu 852 and points to other actions of interest. In some embodiments, the story is shown as soon as the initial analysis is completed. The Story Menu 852 can take different views: table of contents or recommendations. The Story 854 enables the user to scroll through the story that BeyondCore has guided the user to and that the user has optionally actively updated. In some cases, the initial story may be shown even before certain complex computations are completed.

Referring to FIG. 8D, the story page shows an executive report based on the results of the analysis. FIG. 8D is a bar graph that illustrates average revenue for various states when the ages are 65-70 versus average revenue for various states for all ages. The graph of FIG. 8D may be considered a cousin graph of FIG. 8B, since the variable combinations of the graphs of FIG. 8B {state; gender} and variable combinations of the graphs of 8D {state; age} contain the same variables except for one different variable (gender versus age). The solid bars emphasize the states for which the average revenue for ages 65-70 is significantly different from the average revenue for that same state for all ages. This representation and visual emphasis enable easy visual identification of statistical deviations from observed norms within the dataset. So in this case the software has already learned the norm that New York and Texas have slightly higher average revenues in general. However, customers aged 65 to 70 from New York have a significantly higher revenue than the norm for that state while similarly aged customers from Texas have a slightly lower revenue than the norm for Texas. While Washington also exhibits a slight difference in average revenue for this age group compared to the overall norm for this state, the difference is not statistically sound and may be immaterial or caused by factors other than age and state. The user can add graphs to the story from the 'Recommendations' pane and delete graphs from the 'Table of Contents' pane. The user may interact with the graphical user interface via icons 856 (for playing the animated briefing for this story), 857 (for sharing the story), 858 (to see the R code for the most recent prediction looked at), 859 (to skip to specific graphs in his story via the "table of contents"), 860 (to show/hide recommendations).

Referring to FIG. 8E, selecting the Table of Contents changes the Story Menu so that the user can change the order in which the graph appears in their story or remove a graph from their story. The graphs in the Table of Contents are typically in the following order:

(i) Single variable that best explains the variability in the outcome (best single predictor)
(ii) Variable that in combination with the previous variable most improves the explanatory power (best two variable predictor)
(iii) If appropriate, another variable that in combination with the first variable improves the explanatory power
(iv) Next single variable that best explains the variability on its own (2nd best single predictor)

The Table of contents 864 shows graphs in order of appearance in the user's storyline. The user can interact with the graphs, for example via icon 862 (to delete the graph from their story).

Referring to FIG. 8F, the user can edit narrative text. The story includes automatically generated text that explains the key points in each graph. To edit this text, the user can click on the 'edit link' and replace the text. The animated briefing would automatically say the edited text the user provides. Each number such as {1} illustrated by 865 corresponds to a specific bar that will be highlighted at the time the corresponding text is spoken. Even though the text indicating the bar to be highlighted looks like '{ }' in some embodiments, these are actually special characters that the user cannot type using their keyboard. If the user wants to add a tooltip on a specific bar, the user may copy over {#} from one of the existing tooltip texts and then edit it. In this case, the special characters will be copied over, that BeyondCore uses to indicate a tooltip, rather than just typing the { } using his keyboard.

FIG. 8G illustrates that selecting Recommendations from the Toolbar changes the Story Menu so that the user can add graphs to the story. BeyondCore recommends additional graphs for the user to see. These recommendations are related to the graph the user is currently looking at. The user may interact with the recommendations for example via user interface elements 866 (click on any recommendation to see the details or 'Add to story' using the link), 867(click to show more graphs), 868 (click to start prescriptive), and 869 (click to create own graphs and use predictive model). When the user pauses on a graph in the report, BeyondCore performs several complex computations to recommend the appropriate additional graphs for the user to see. Because the recommendations are related to the graphs the user adds and the user sees, the story evolves based on the unique interaction between the user and the story. Two different users who started with the exactly same story might end up with completely different stories based on what BeyondCore learns based on their interactions with the story. Here which graphs the user deletes, which graphs they see/pause on and which recommended graphs they add, all serve as structured feedback from an untrained human.

FIG. 8H is another illustration of Descriptive graphs that are added automatically to the user's story. If they have multiple variables they will include a benchmark average (this is the learned norm for one of the variables and is used to explain how the learned norm for the combination of variables differs from the norm for the individual variables). Translucent bars are used in most graphs herein to show insignificant differences and solid bars to indicate significant differences. As described with reference to FIG. 8A, the visual narrative guiding text 870-*a*, 870-*b*, 870-*c*, and 870-*d* may be displayed as legends to aid the user in interpreting these graphs.

Referring now to FIG. 8I, BeyondCore automatically shows the user the most important graphs to review. However, the user can manually choose the type of graph the user wants to see, the corresponding variable combinations and see the corresponding graph. As illustrated, the user may click 'Specify Graph' 872 to open the pop-up window for manual analysis.

Referring to FIG. 8J, the user can manually choose any variable combination and instantaneously see the corresponding graph (because BeyondCore already evaluated all possible variable combinations and stored the corresponding metrics). The user may choose any of the options indicated by the instructive text 874, 875, and 876 shown in FIG. 8J. Referring to FIG. 8K, the user can specify which variables he is interested in (via menu 877) and BeyondCore shows the user the most statistically important graph (via selection of option 878) that involves at least one of the specified variables. In this case, only graphs involving either a state, a gender or an age group would be shown. Graphs involving none of these variables would not be shown. This allows the untrained human to focus the story on certain variables without having to know the precise hypothesis up front. For example, they may request a graph related to Gender in recommend descriptive and based on that BeyondCore may point out that Males and Females have very different buying patterns in Florida. Note that the untrained human did not have to know the hypothesis that gender has a significant effect in Florida, only that gender might be a useful variable to consider given the context of the analysis.

Referring to FIG. 8L, once a graph is recommended (in this case the combination of state and gender) the user can drill into the graph further. BeyondCore recommends the order in which to drill into the graph (in this case look at male first, then female, then Florida, then Arizona) based on the normative behaviors for each subset that BeyondCore has already learned and the relative explanatory power of such subsets as detected based on search based or hill-climb or other automatic evaluations described above. The user may select a drilldown 880, focus on specified values 882, choose a graph type 884, and so on. Referring to FIG. 8M, the use has chosen two variables and BeyondCore will show the user the graph that was requested (in this case, the variables chosen are state and gender). The user can drill into the graph further. BeyondCore recommends the order in which the user should drill into the graph, for example, via text or other interactive prompts an 885-*a*, 885-*b*, 885-*c*, 885-*d*, 885-*e*. FIG. 8N illustrates an Extreme Outcomes report which shows sub-groups of the data that have the most extreme average outcomes. The user can filter down to certain types of sub-groups to focus attention on groups relevant to his analysis. As indicated in the text guide 888, for each identified group, the graph shows how much higher/lower is that group's average outcome than the overall average. As indicated in text prompt/guide 890, these controls allow the user to focus on specific sub groups.

Diagnostic Graphs

Figure 9A:
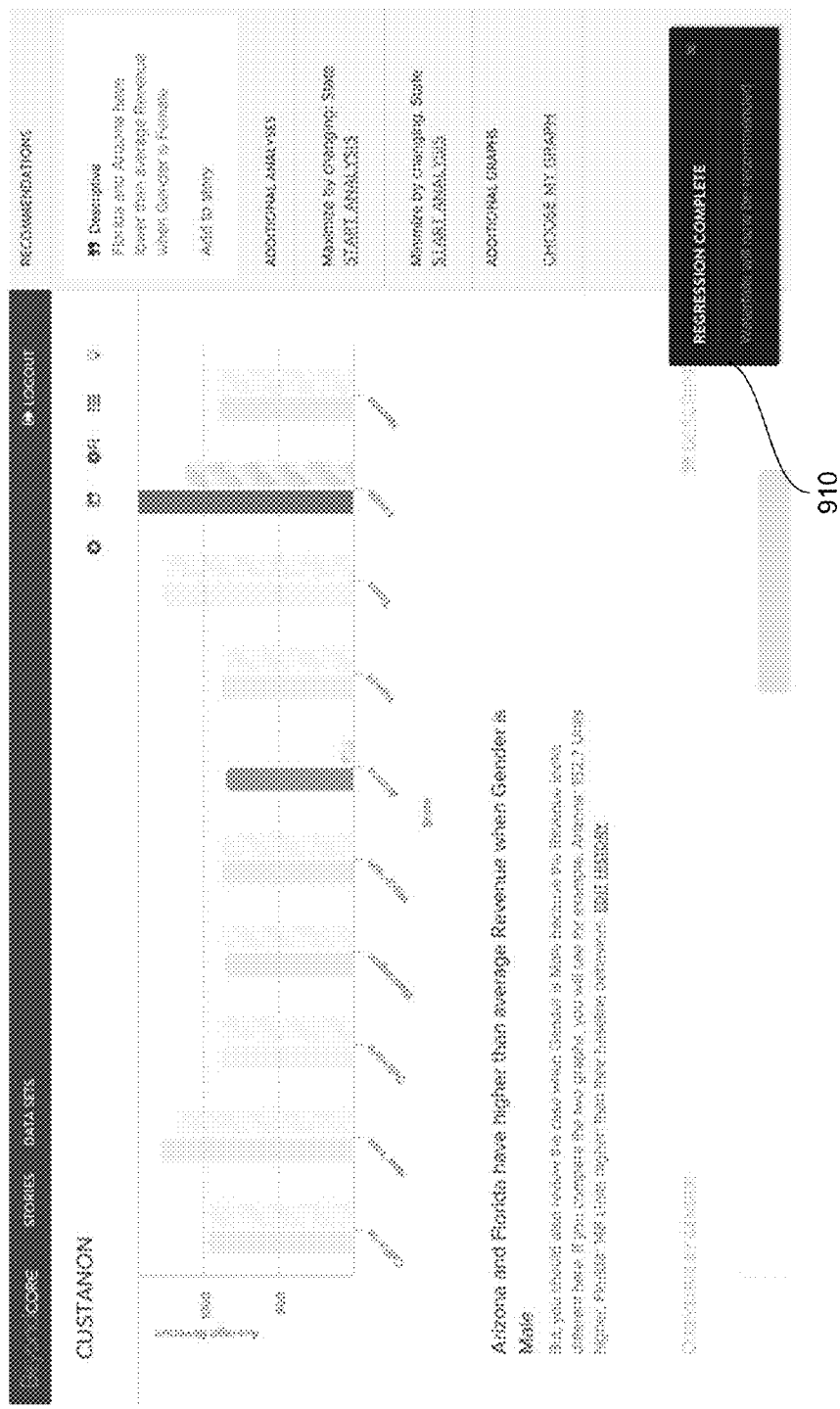
FIGS. 9A-9B are screen shots illustrating diagnostic graphs that highlight multiple factors that contribute to what is happening in a data set, according to some embodiments.
Figure 9B:
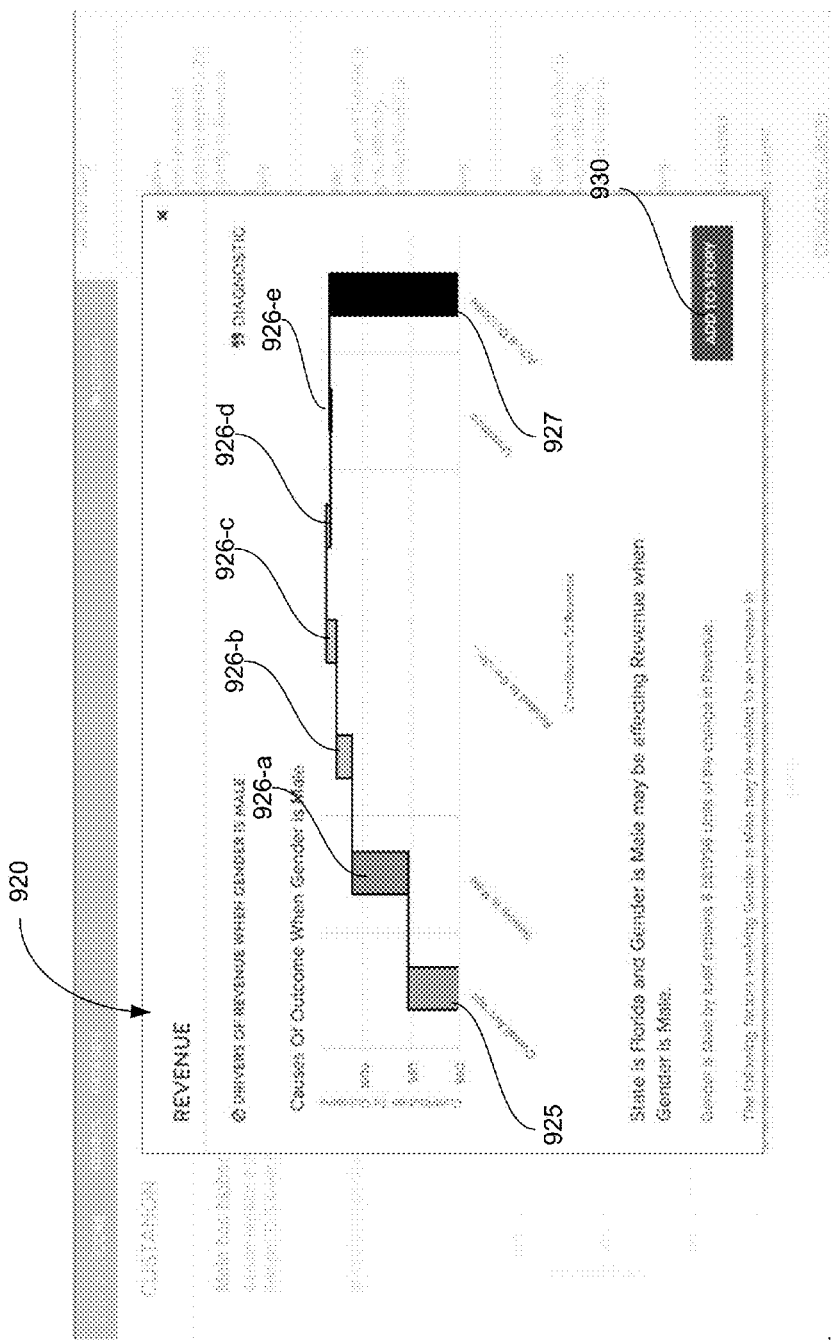

FIGS. 9A-9B illustrate diagnostic graphs that highlight multiple unrelated factors that contribute to an outcome or visual pattern displayed in a graph. A diagnostic graph results from a diagnostic analysis performed on a dataset to analyze differences in an outcome between a data set for a process and a subset of the data set. For instance, referring to the graph of FIG. 9B, outcome value 925 represents the outcome for the data set and outcome value 927 represents the outcome for the subset {gender=male}. The diagnostic analysis and the resulting diagnostic graph then presents various contributing factors (represented as 926-*a*, 926-*b*, 926-*c*, 926-*d*, and 926-*e*) that caused or can explain a discrepancy (925 versus 927) between the outcome value for the data set and that for the subset. The contributing factors are those variable combinations for which the estimated contribution to the outcome additively explain (sums up to) the difference between the outcome for the data set and for the subset.

The subset is defined where one or more test variables, which may be user specified variables, take on specific trial values. Examples are given in Table 1a below:

TABLE 1a

Examples of Subsets

| | Data Set | Subset | Test Variable and Trial Value |
|---|---|---|---|
| Example 1 (based on FIG. 9B) | {All} | {Gender = Male} | Test Variables = {Gender} Trial Values = {Male} |
| Example 2 | {All} | {City = SF; Campaign = Print} | Test Variables = {City, Campaign} Trial Values = {SF, Print} |

To determine the drivers of the differences between the data set and the subset, corresponding pairs of variable combinations are considered, where the test variables take the trial values in one of the variable combinations and are not specified in the other variable combination. Examples of pairs of variable combinations for Example 1 of Table 1a are illustrated in Table 1b.

TABLE 1b

Examples of Corresponding Variable Combinations for Subset {Gender = Male}

| | Variable Combination for Data Set | Variable Combination for Subset {Gender = Male} |
|---|---|---|
| Example Pair 1 | {All} | {Gender = Male} |
| Example Pair 2 | {State = FL} | {State = FL; Gender = Male} |
| Example Pair 3 | {State = CA; Campaign = Print} | {State = CA; Campaign = Print; Gender = Male} |

For these pairs, the analysis estimates contributions of the pair to differences in the outcome between the data set and the subset, based on differences in the behaviors of the pair and also based on differences in populations of the pair. In one approach, for each pair, an outcome for each of the two variable combinations is computed as a product of the (a) behavior of that variable combination with respect to the outcome and (b) the population of the subgroup defined by that variable combination. The difference in outcomes for the two pairs is used to assess a contribution of the pair to differences in the outcome between the data set and the subset.

Differences in the outcome between the data set and the subset is reported based on the estimated contributions for the variable combinations, for example in the form of a diagnostic graph such as the one illustrated in FIG. 9B. Similarly, contributing factor 926-*a* is due to the variable combination {Gender=Male}, which is example pair 1 in Table 1b above. Contributing factors 926-*b* et al are due to other variable combinations.

The analysis preferably considers the impact of all other variable combinations on the observed outcome as well. The following is a snippet of a narrative text for a Diagnostic graph of different Facilities/Hospitals with the outcome being Excess Stay (how many days did the patient stay at the hospital greater than what was expected by the state based on the diagnosis of the patient):

"The following factors involving Facility is Hospital A may be related to an increase in Excess Stay:
Admission Type is Emergency occurs 45.4% of the time globally but it changes to 95.1% when it is known that Facility is Hospital A. Because of these cases, the Excess Stay increases by 0.6 Days per Transaction
Payment Type is Medicare HMO occurs 8.5% of the time globally but it changes to 25.9% when it is known that Facility is Hospital A. Because of these cases, the Excess Stay increases by 0.2 Days per Transaction"

In this case, Facility Hospital A has a higher than average Excess Stay but the automated analysis has detected that this hospital has twice as many emergency cases than the norm across all hospitals and that it has three times the usual proportion of Medicare patients. Such deviations from the overall norm explain a total of 0.8 Days of the increase in Excess Stay.

Note that if the previously disclosed approach of learning the net normative behavior for each variable combination is used, calculating such a complex analysis can be achieved by just multiplying the observed net norms for each variable combination by the observed relative difference in population between the data set and the sub set. This significantly decreases the computational complexity of such an analysis.

As illustrated in FIG. 9A-9B, BeyondCore presents, to the viewing user, the story as soon as the initial analysis is completed and Descriptive graphs are available. It continues doing additional statistical tests to look for Diagnostic graphs and creates the models for Predictive and Prescriptive graphs. Once these steps are complete, a message (notification) 910 indicating 'Regression Complete' is displayed. Once this message (notification) 910 is displayed, Diagnostic graphs are available for viewing. The diagnostic graphs are not added automatically to a story. They are available for all Descriptive graphs and show up on the recommendation pane if appropriate. In some embodiments, the diagnostic graphs are displayed in a pop-up window 920 if the user selects a recommendation. The user may choose to include the graph in a story (e.g., by selecting the UI element 930).

For example, we can look at treatment decisions of doctors when faced with similar patients. In this example, rather than taking a single patient case and duplicating it for many doctors, we identify different patients whose cases are similar enough for the analysis at hand. For purposes of the analysis, there are naturally occurring "duplicates." Let's say the vast majority of doctors prescribe a set of medicines within an acceptable level of difference in prescription details. However, some of them instead recommend surgery. This can be identified as a deviation from the norm.

The plurality vote and cluster analysis techniques described earlier can be applied here. The concepts of specified equivalencies (such as a table of equivalent medications) or learned equivalencies can be applied while determining the norm. Optionally we can look at a database of previously observed deviation patterns and predict whether a specific behavior is a benign variance or a significant error. Historic patterns of behavior for operators (same as "historic error rates") can be further used for cases where there are multiple significantly sized clusters, to identify the true normative behavior. Classes of activities could be analogized to fields, and we could then apply the techniques used to consider different fields and the relative operational risk from errors in a given field. Similarly, a set of classes of activities that can be treated as a unit could be analogized to a document. Thus, each of the medical steps from a patient's initial visit to a doctor, to a final cure may be treated as a document or transaction. So, for example, pre-treatment interview notes, initial prescription, surgery notes, surgical intervention results, details of post-surgery stay, etc. would each be treated as a "field" and would have related weights of errors. The overall error E would be the weighted average of the errors in the various fields. As in the previously described methods, the occurrence of errors can be correlated to a set of process and external attributes to predict future errors. A database of error patterns and the corresponding historical root causes can also be generated and this can be used to diagnose the possible cause of an error in a field/class of activity. Continuing the analogy, the data on the error patterns of each operator, here a doctor or a medical team, can be used to create operator and/or field specific rules to reduce or prevent errors.

In another example, we can look at financial decisions of people with similar demographics and other characteristics. Let's say the vast majority of them buy a certain amount of stocks and bonds within an acceptable level of difference in portfolio details. However, some of them instead buy a red convertible. This might be a deviation from a norm and could be analyzed similarly.

The pattern of error E for a given operator over time can be used for additional analysis. Traditional correlation analysis predicts an outcome based on the current value of a variable based on correlation formulas learnt based on other observations. If the current value of the variable is 10, traditional correlation analysis will predict the same outcome regardless of whether the variable hit the value 10 at the end of a linear, exponential, sine, or other function over time. However, E can be measured for operators over time and the pattern of E over time (whether it was linear, exponential, random, sinusoidal, etc.) can be used to predict the future value of E. Moreover, one can observe how E changes over time and use learning algorithms to identify process and external attributes that are predictors of the pattern of changes in E over time. These attributes can then be used to predict the pattern of the future trajectory of the error E for other operators or the same operator at different points in time. Such an analysis would be a much more accurate predictor of future outcomes than traditional methods like simple correlation analysis.

One may also observe E for a set of operators with similar characteristics over time. In some cases, E of all of the operators in the set will shift similarly and this would be an evolution in the norm. However, in some cases, E for some of the operators will deviate from E for the other operators and form a new stable norm. This is a split of the norm. In the other cases, E for multiple distinct sets of operators will converge over time and this is a convergence of norms. Finally the errors E for a small subset of operators may deviate from E for the rest of the operators but not form a new cohesive norm. This would be a deviation of the norm. Learning algorithms may be used to find process and external attributes that are best predictors of whether a set of operators will exhibit a split, a convergence, an evolution or a deviation of the norm. Similar learning algorithms may be used to predict which specific operators in a given set are most likely to exhibit a deviation from the norm. Other learning algorithms may be used to predict which specific operators in a given set are most likely to lead an evolution or splitting or convergence of a norm. By observing E for such lead operators, we can better predict the future E for the other operators in the same set.

As described above, the error E here can be for data entry, data processing, data storage and other similar operations. However, it can also be for healthcare fraud, suboptimal financial decision-making, pilferage in a supply chain, or other cases of deviations from the norm or from an optimal solution.

Time Variation of the Diagnostic Graphs

In some embodiments, the behavior of a variable and its deviation from the norm may vary with time. In some embodiments, causes of time variations in a data set may be identified based on representations of the data set at two or more points in time. The data set is processed to determine behaviors for different variable combinations at different times with respect to the outcome. Time variations in the contributions of the variable combinations to the outcome are estimated. Table 2 illustrates examples of pairs of snapshots of the same variable combination taken at different time points.

TABLE 2

Examples of Variable Combinations at Different Times

| | Snapshot at first time instance | Snapshot at second time instance |
|---|---|---|
| Example Pair 1 | {Gender = Male; City = NY} Time = T1 (Jan. 2010) | {Gender = Male; City = NY} Time = T3 (Feb. 2014) |
| Example Pair 2 | {Gender = Female; Mkt Cmpn = Print} Time = T1 (Jan. 2010) | {Gender = Female; Mkt Cmpn = Print} Time = T3 (Feb. 2014) |

Such time variations may be estimated based on time variations in the behaviors of variable combinations and also based on time variations in populations of the variable combinations. The analysis may also determine whether the estimated time variations in the contributions of the variable combinations to the outcome represent deviations from a norm or evolutions of the norm. In one approach, for each time instance in the snapshot pairing, the net impact on the outcome for the variable combination is computed as a product of the (a) behavior of that variable combination with respect to the outcome at that time instance and (b) the relative population of the variable combination at that time instance. The difference in outcomes for the variable combination at the two time instances is used to assess time variations in the data set for the variable combination. Such analysis can be conducted across multiple or even all possible variable combinations using the approaches described herein. In one or more embodiments, an identification of whether the reported time variations represent deviations from a norm or evolutions of the norm, is received from the user. The determined behaviors for different variable combinations are adjusted based on whether reported time variations represent deviations from a norm or evolutions of the norm.

The automated analysis learns the normative behavior over time for different variable combinations. Then it continues collecting data. The data may not perfectly conform to the learned norms but may be within statistical tolerance. Over time, the analysis may encounter new data where the behaviors or relative populations for certain variable combinations start to deviate significantly from the learned norm. Such cases can be flagged to the untrained human who can intervene if this is a deviation from the norm, or who can indicate that this is a one time deviation from the norm that can be ignored (for example an impact on tourism because of the World Cup), or who can indicate that this is just an evolution of the norm, in which case the automated analysis can adjust its understanding of the normative behavior by updating the learned model based on the new data.

In one or more embodiments, determining behaviors for different variable combinations at different times with respect to the outcome comprises determining cyclical variations in behaviors for different variable combinations with respect to the outcome. In some embodiments, an identification of cyclical variations in behaviors is received from the user. In such embodiments, determining behaviors for different variable combinations at different times with respect to the outcome comprises accounting for such cyclical variations in behaviors for different variable combinations with respect to the outcome.

Prescriptive Graphs

Figure 10A:
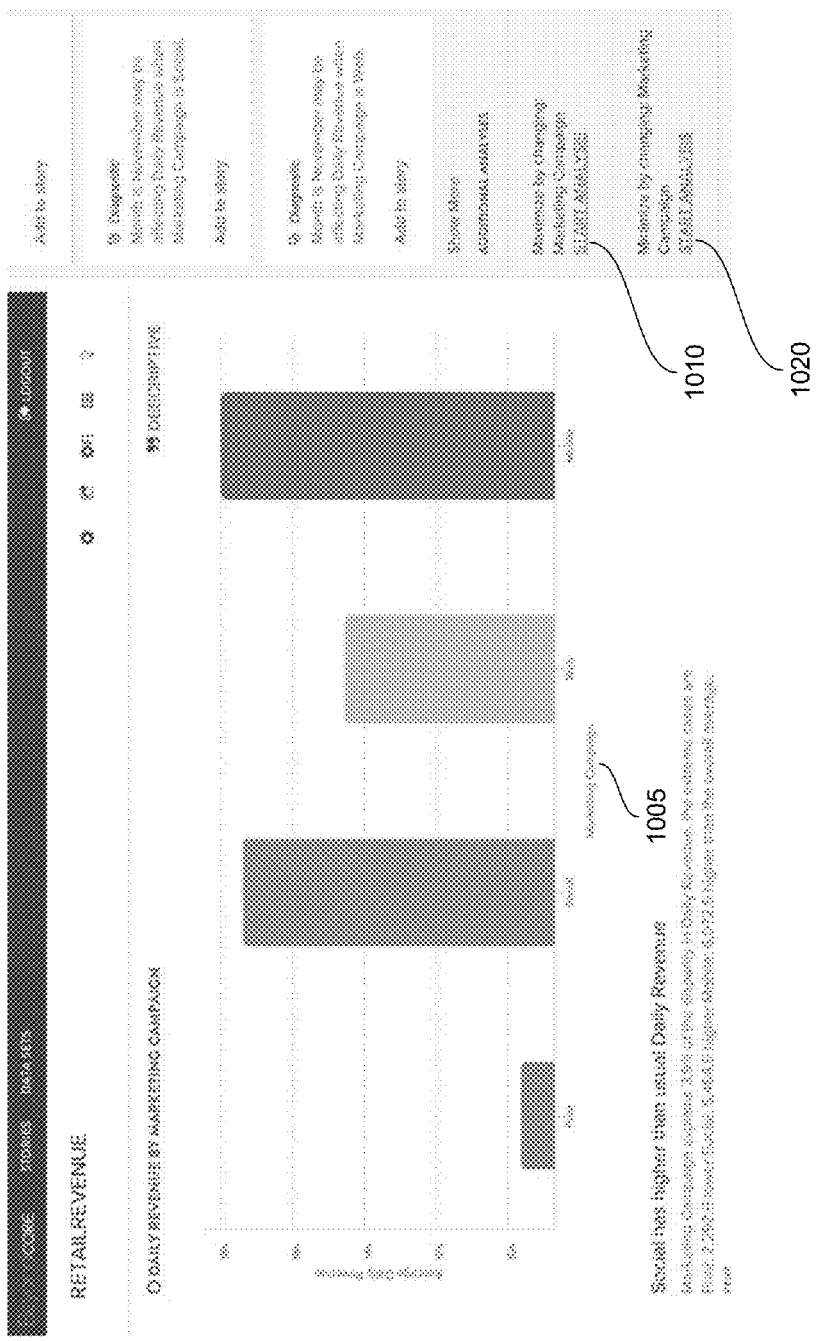
FIGS. 10A-10C are screen shots illustrating prescriptive graphs that recommend changes to improve what is happening in a data set, according to some embodiments.
Figure 10B:
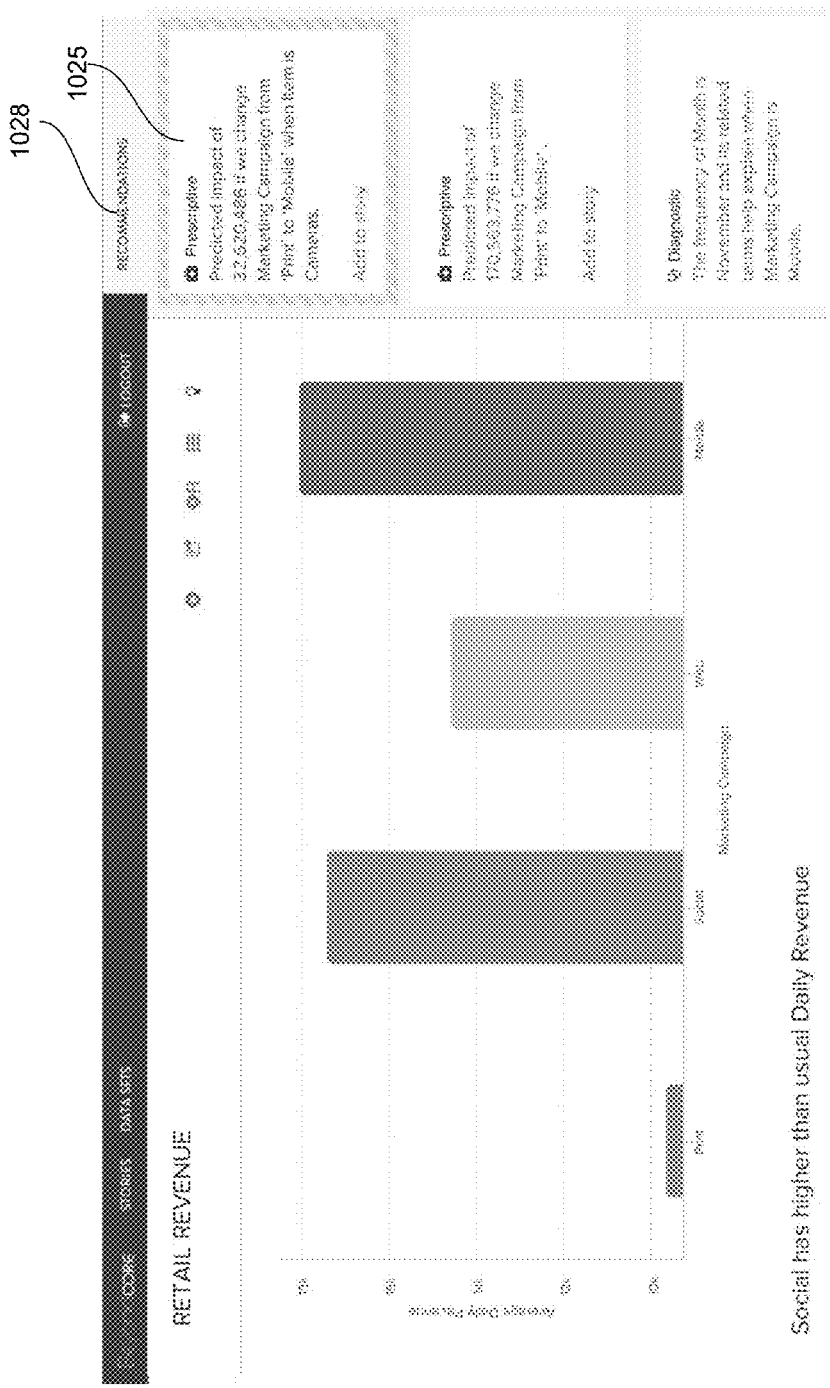
Figure 10C:
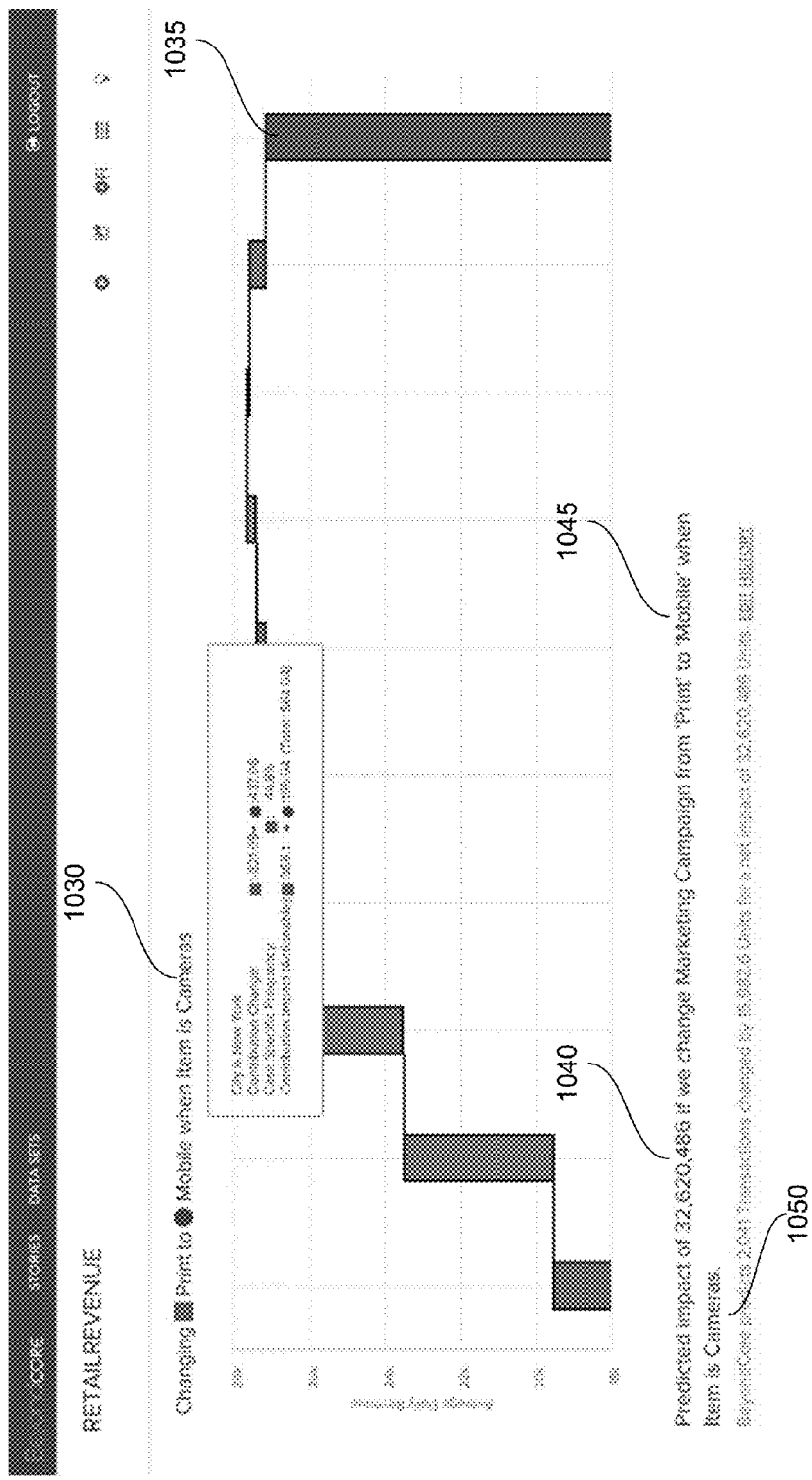

FIGS. 10A-10C illustrate prescriptive graphs which, as explained above, provide a means to communicate to BeyondCore which variables are actionable (outcomes that a user can change easily) and whether the user may want to maximize or minimize said outcome. This is a form of structured input from an untrained human. BeyondCore then looks at typically millions of possibilities, conducts Predictive analysis, and recommends (via the Prescriptive graphs) specific actions, quantifies the expected impact, and explains the reasoning behind the recommendations. In other words, to conduct a Prescriptive Analysis the user may select whether to minimize or maximize an outcome (using the links in the recommendations pane).

In a first example, if marketing campaign (the currently selected variable 1005) is something the user can change easily to maximize revenue, the user would click on the 'Start Analysis' link 1010 below the 'Maximize by Changing Marketing Campaign.' Alternatively, the user may opt to minimize an outcome by selecting the 'Start Analysis' link 1020 below the 'Minimize by Changing Marketing Campaign.' The actionable variable may be a single variable or a combination of variables. Optionally the variable may only be actionable under certain circumstances (we can change price for most customers but not government customers). Such input is a form of structured input from an untrained human. In some embodiments, the identification of one or more actionable variables is received based on an analysis of the data set.

Referring to the Prescriptive graph of FIG. 10B, the user runs a prescription analysis. The Recommendations pane for that variable will show a rank-ordered list of things the user can do to effect the outcome variable. For example, a prescriptive analytics report 1025 is displayed in the recommendations pane 1028 of the report illustrated in FIG. 10B.

BeyondCore determines which recommended action should be taken in the recommended situation to have the predicted result looking at potentially millions of similar cases where the actionable variable was different. BeyondCore adjusts for unrelated factors that made the two groups different (for example, one group might be older than the other, but that is unrelated to marketing campaigns).

Referring to FIG. 10C, each prescription recommends a specific action 1045 under specific circumstances 1050 and the precise anticipated/expected/predicted result (impact) of the change 1040. Referring to the displayed result 1030, in this example, 44.8% of print advertising for cameras was run in New York, and print did much worse than average in New York. Referring to the graphical illustration 1035, average revenue for the benchmark (mobile when item is cameras) after we adjust for unrelated differences between the two cases (such as in which month the campaigns were run).

The illustration of prescriptive analysis herein is an instantiation of above-described techniques such as learning the normative behavior of subsets of the data, observing how the behavior changes as the subset is expanded or shrunk, leveraging accidental experiments in large volumes of data where two groups are similar expect for a few characteristics (in this case the difference is the actionable variable), automatically generating regression models based on the data, statistically adjusting for behaviors, and the like.

FIGS. 10D-10K provide an example of prescriptive analysis performed on an underlying data set to identify the potential impact on an outcome when a value of an actionable variable is changed under automatically identified specified circumstances, in some embodiments. In this example, BeyondCore analyzes "accidental experiments" by identifying corresponding pairs of "before change" and "after change" variable combinations which are the same or similar based on factors unrelated to the actionable variable but differ by the value of the actionable variable. If the objective is to maximize the outcome, the outcome for the after change subset would be higher than the corresponding before change subset. If the objective is to minimize the outcome, the outcome for the after change subset would be lower than the corresponding before change subset. For each of the identified pairs constituting the "accidental experiments," the method predicts an impact of changing the actionable variables by applying (a) the behavior of the "after" variable combination to (b) a population of the "before" variable combination. In some embodiments, this is accomplished by computing a behavior difference between the behavior of the "before" and "after" variable combinations, and multiplying the behavior difference by the population of the "before" variable combination.

In the example of FIGS. 10D-10K, the outcome is average daily revenue and the actionable variable is marketing campaign. That is, the marketing campaign variable can take on different values—Print, Mobile, Social, etc.—and the user wants to investigate the predicted impact of changing marketing campaigns under certain situations. The data set also contains many other variables: city, item, month, etc. The prescriptive analysis recommends possible actions to change the marketing campaign.

It does this by analyzing the variable combinations. There are a large number of variable combinations involving the actionable variable (marketing campaign) in combination with the other variables. When a pair of variable combinations is the same except that the actionable variable takes on different values, this is an "accidental experiment" that can be used to predict the contribution of that variable combination to changing the actionable variable from one value to another value. Table 3 gives some examples of pairs of variable combinations that could be used to predict the impact of a candidate action.

TABLE 3

Examples of Pairs of Variable Combinations to Predict Impact of Candidates Changes

| | Contributing Factor | First Variable Combination ("Before") | Second Variable Combination ("After") |
|---|---|---|---|
| Example Pair 1 | Change Mktg Cmpn from Social to Print, only for items = Headphones | {Items = Headphones; Mktg Cmpn = Social} | {Items = Headphones; Mktg Cmpn = Print} |
| Example Pair 2 | Change Mktg Cmpn from Print to Social, only for items = Headphones (FIG. 10H) | {Items = Headphones; Mktg Cmpn = Print} | {Items = Headphones; Mktg Cmpn = Social} |
| Example Pair 3 | Change Mktg Cmpn from Print to Social, for all cases (FIG. 10I) | {Mktg Cmpn = Print} | {Mktg Cmpn = Social} |
| Example Pair 4 | Change Mktg Cmpn from Print to Social, only for items = Headphones and City = NY (FIG. 10J) | {Items = Headphones; City = NY; Mktg Cmpn = Print} | {Items = Headphones; City = NY; Mktg Cmpn = Social} |

For each pair, the predicted contribution to the impact is computed by applying the behavior of the second variable combination (or the difference in behaviors between the two variable combinations) to the population of the first variable combination. It should be noted that all possible pairs of variable combinations that involve the two different values of the actionable variable may be considered in this analysis. Thus, while calculating the impact of changing from Print to Social when item is Headphones, we would also apply the behavior of Social in each city to the corresponding frequency of each city for Print and apply the behavior of Social in each month to the corresponding frequency of each month for Print, and so on. This can be done for all accidental experiments and then different candidate actions can be compared to create a ranked list of the most effective actions. For example, consider the candidate action of changing Mktg Cmpn from Print to Social only for items=Headphones. This will be affected by the bottom three pairs in Table 3, in addition to any other pairs which (a) include Headphones and (b) where the only difference between the pair is changing Mktg Cmpn from Print to Social. Each of the candidate actions can be evaluated and then recommendations can be made.

Figure 10D:
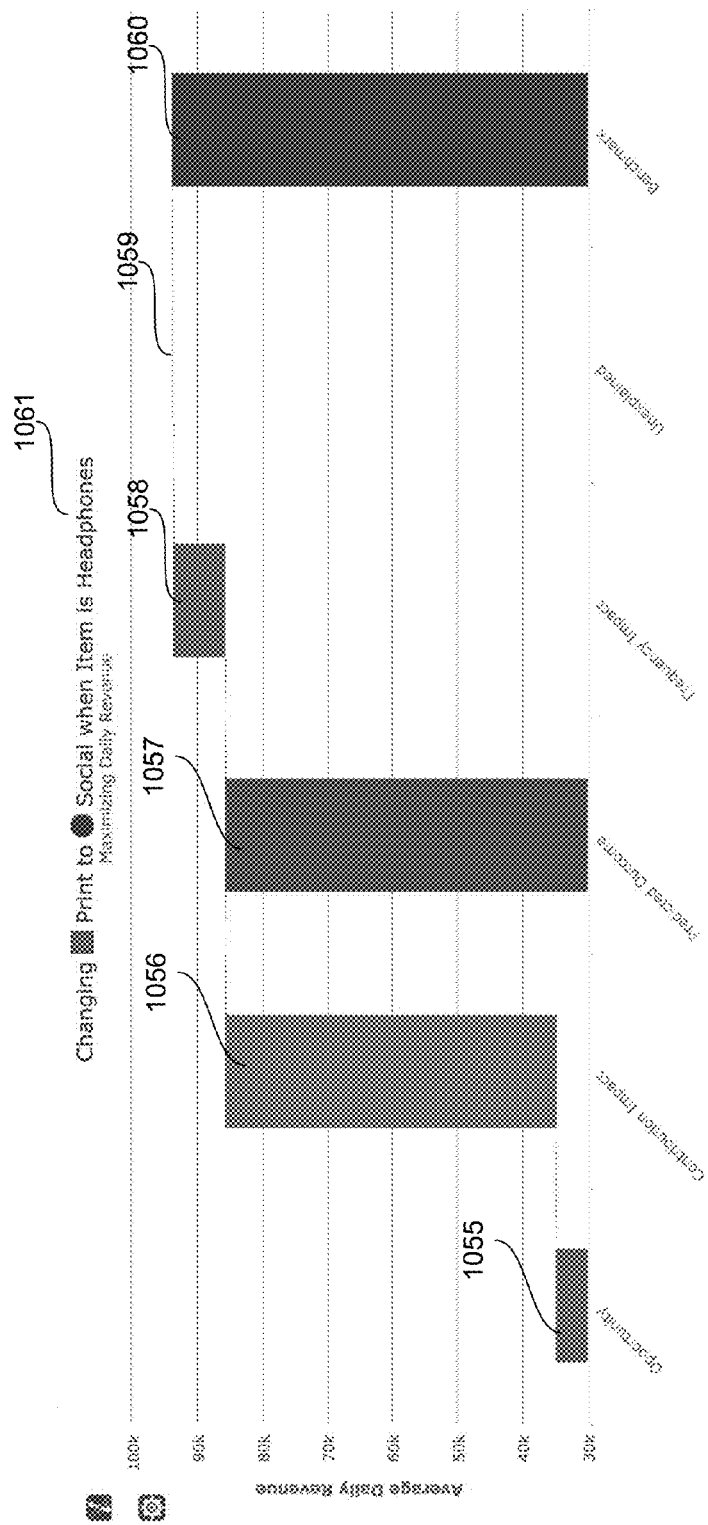
FIGS. 10D-10K provide an example of prescriptive analysis performed on an underlying data set, according to some embodiments.

The graph of FIG. 10D illustrates an analysis of a candidate change, where Mktg Cmpn is changed from Print to Social—under the circumstance that the item is Headphones. The graph of FIG. 10D illustrates measures of the outcome variable (average daily revenue, in this case) for different cases: average revenue 1055 for Headphones when the marketing campaign is Print, what the average revenue 1057 for Headphones could be if the cases where the marketing campaign was originally Print had been changed to Social instead, and the predicted impact 1056 of making only that change.

There may be other differences between the Print and Social variable combinations, such as differences in population distribution. Accounting for all of those additional differences results in the average revenue 1060 for Headphones when the marketing campaign is Social. FIG. 10D also shows the part 1058 of the differences in outcome that was due to unrelated factors (e.g., such as the percent of Print campaigns run in November was different than the percent of Social campaigns run in November) that cannot be impacted by changing the campaign type, and the part 1059 of the differences in averages that was due to factors that could not be explained by the analysis.

Figure 10E:
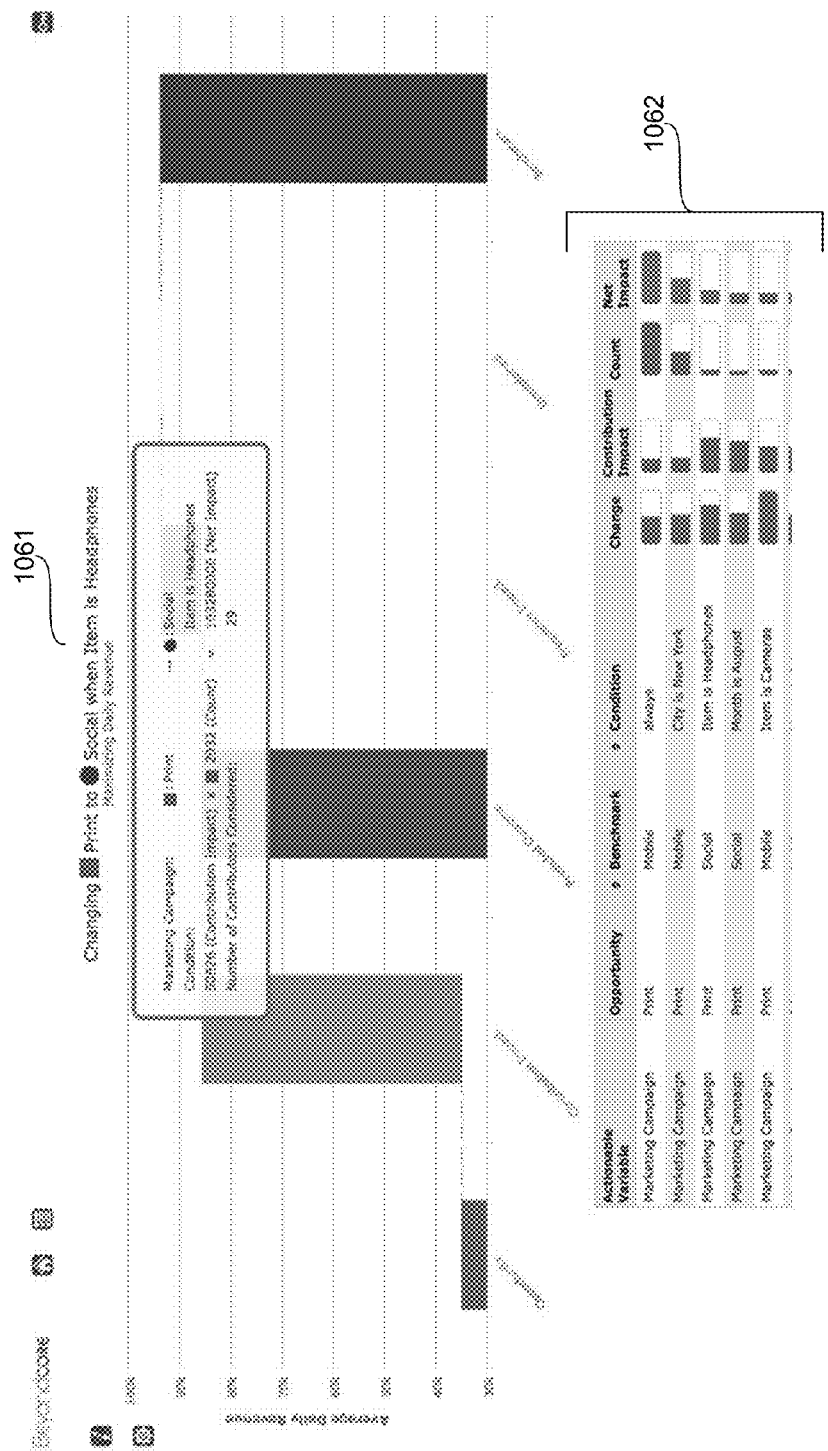

In this example, the recommendation 1061 is to change marketing campaign from Print to Social for item being Headphones. FIG. 10E lists additional recommendations 1062. The top recommendation is to change marketing campaign from Print to Mobile for all cases. The second recommendation is to change marketing campaign from Print to Mobile for city being New York. The third recommendation is the one shown in FIGS. 10D-E.

FIGS. 10E-10K include a more detailed explanation of various variables or variable combinations that define constituent subgroups of the dataset that resulted in or influenced the impact that the action had on the outcome.

Figure 10F:
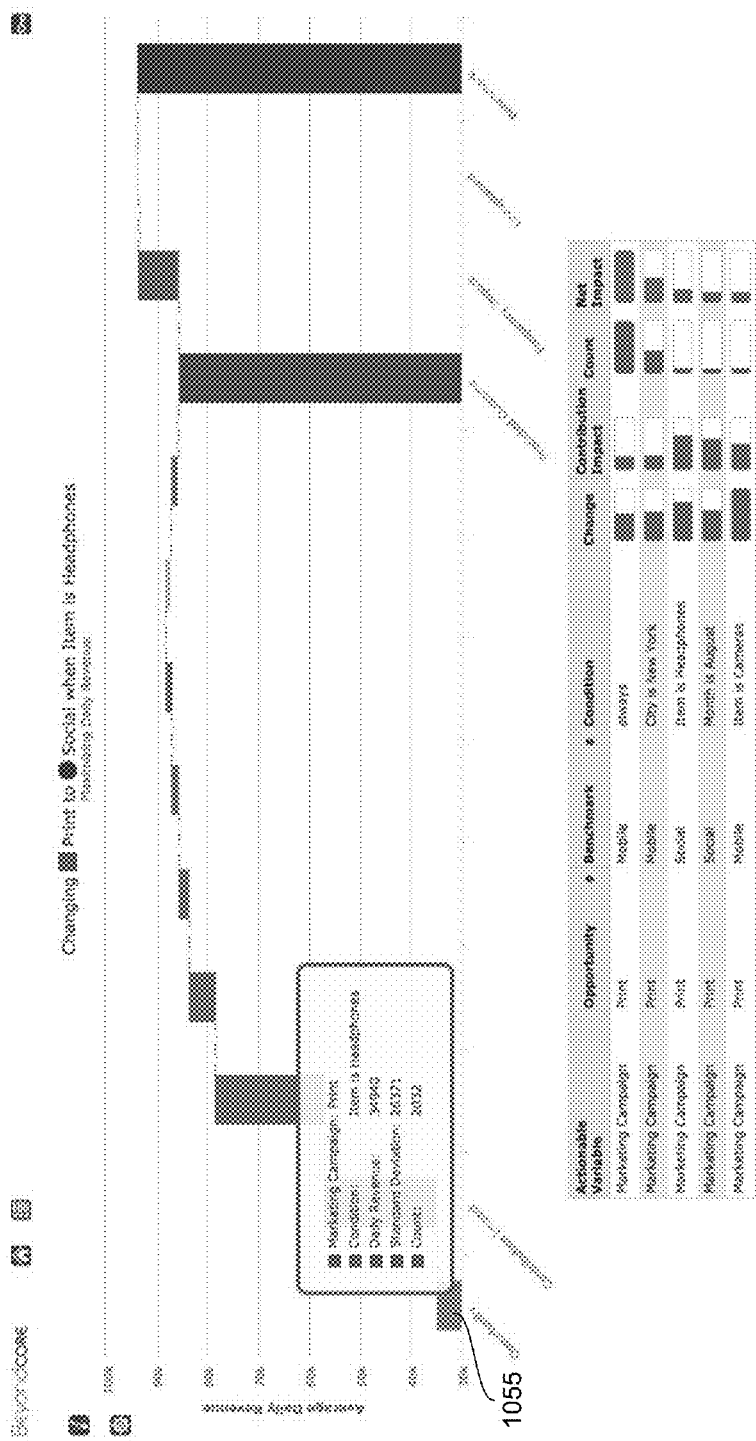
Figure 10G:
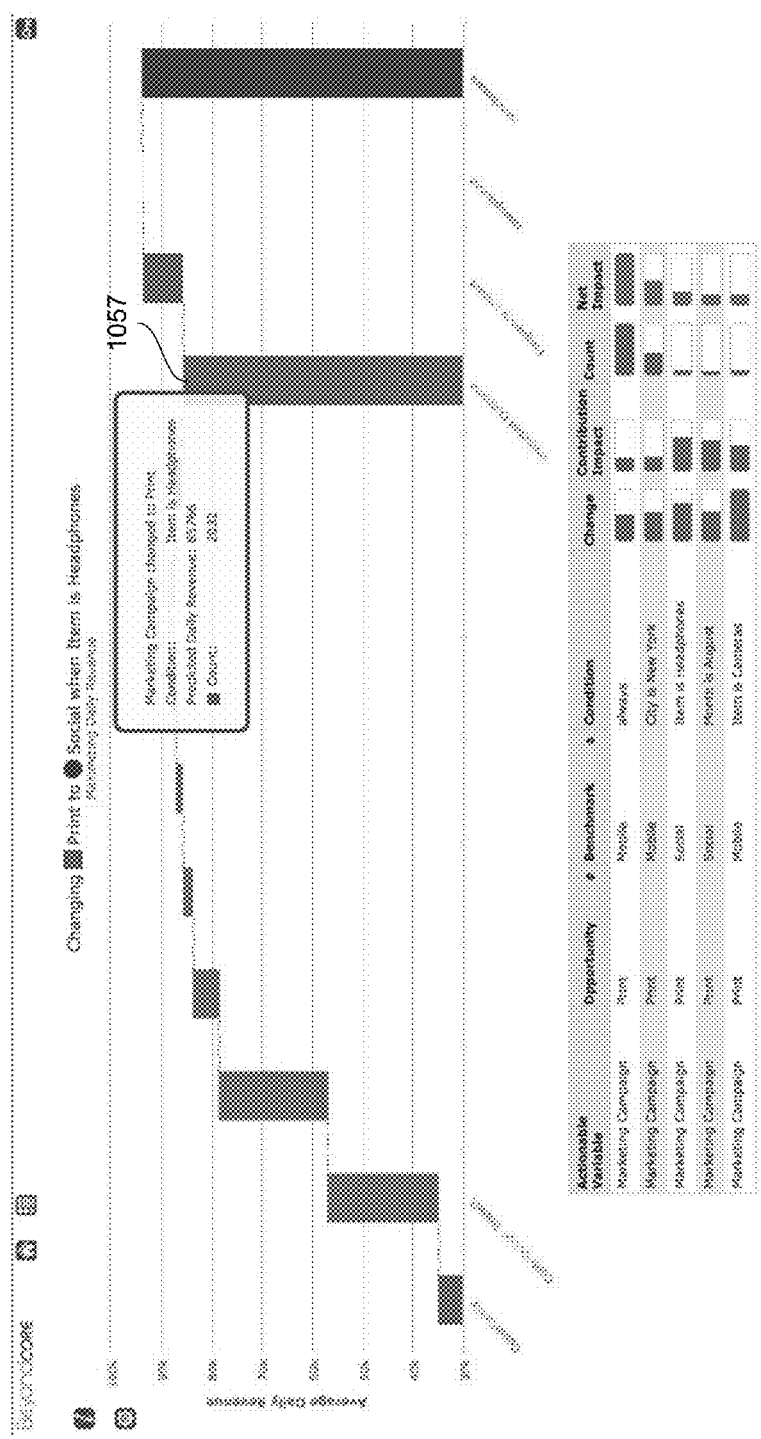
Figure 10H:
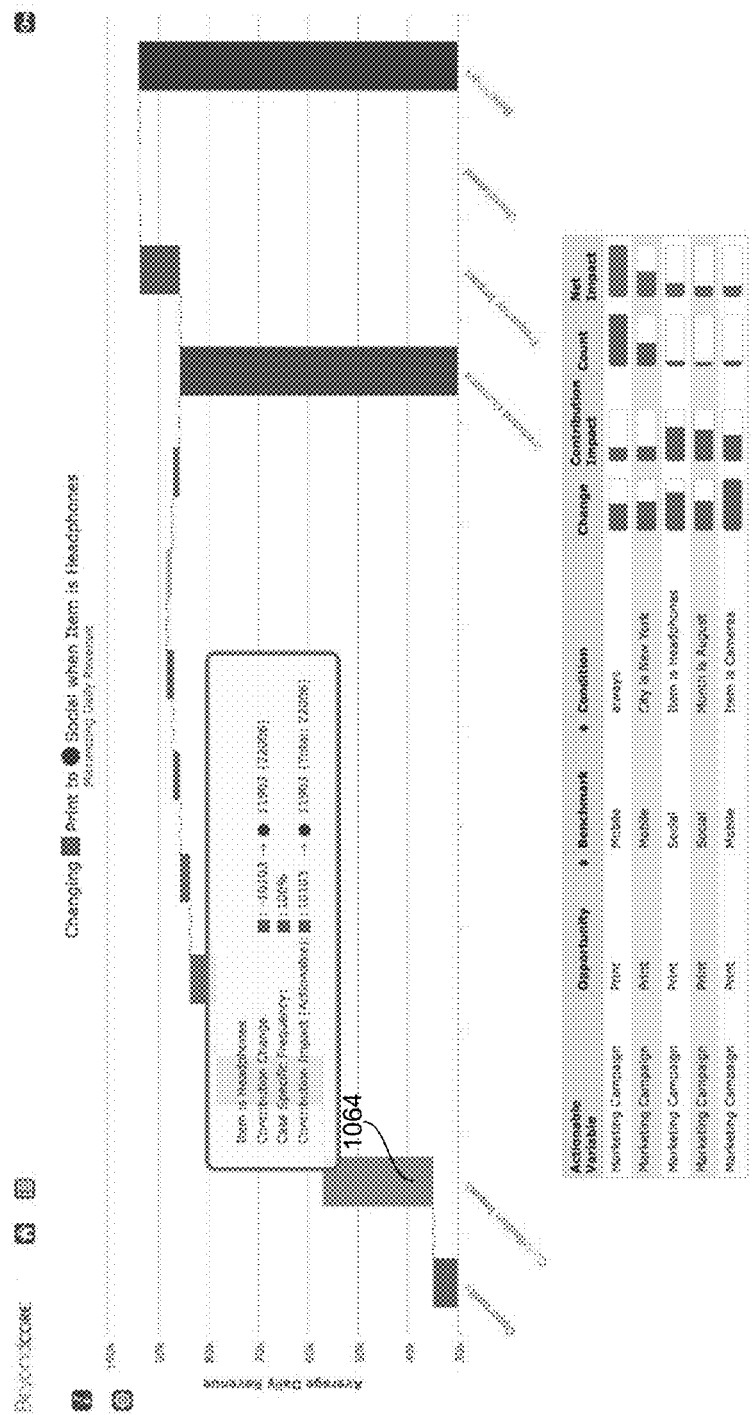
Figure 10I:
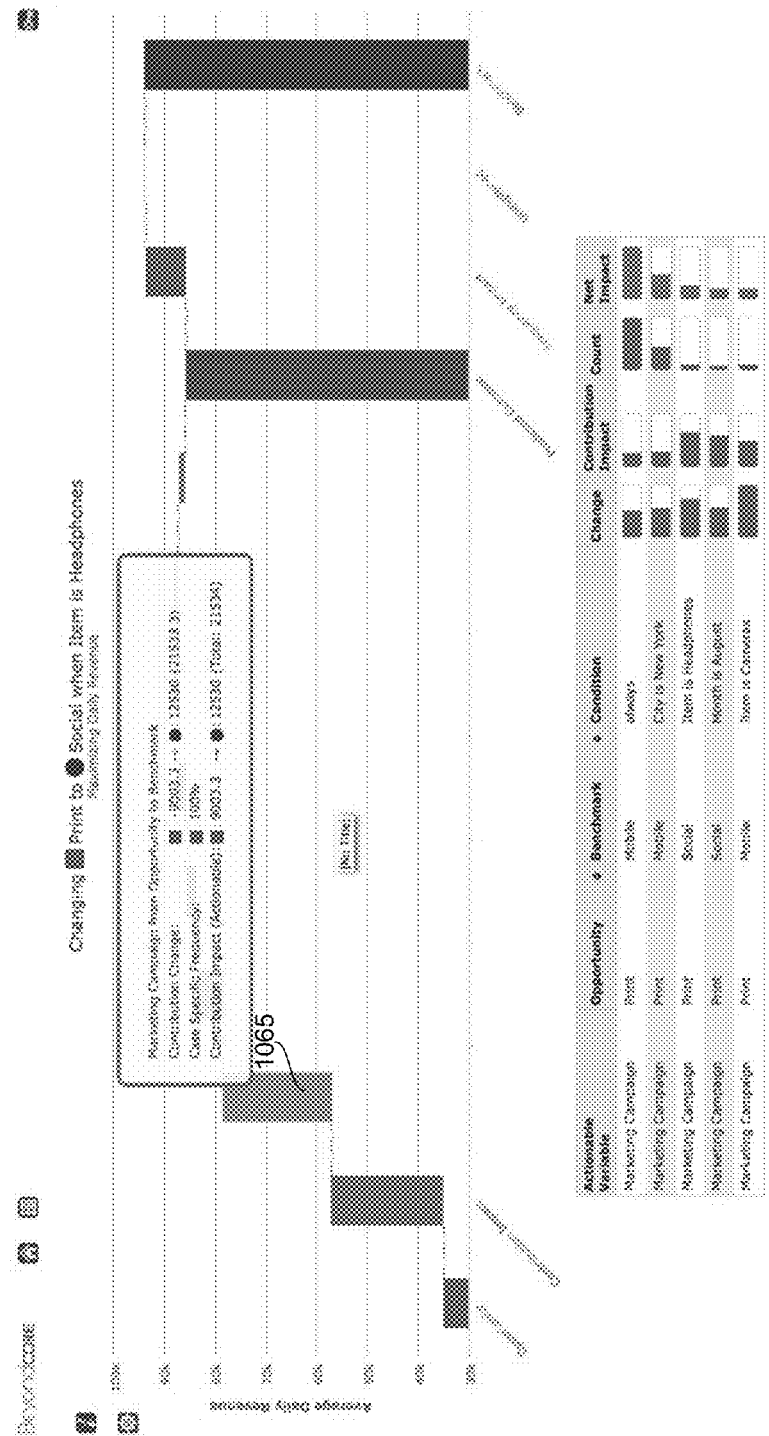
Figure 10J:
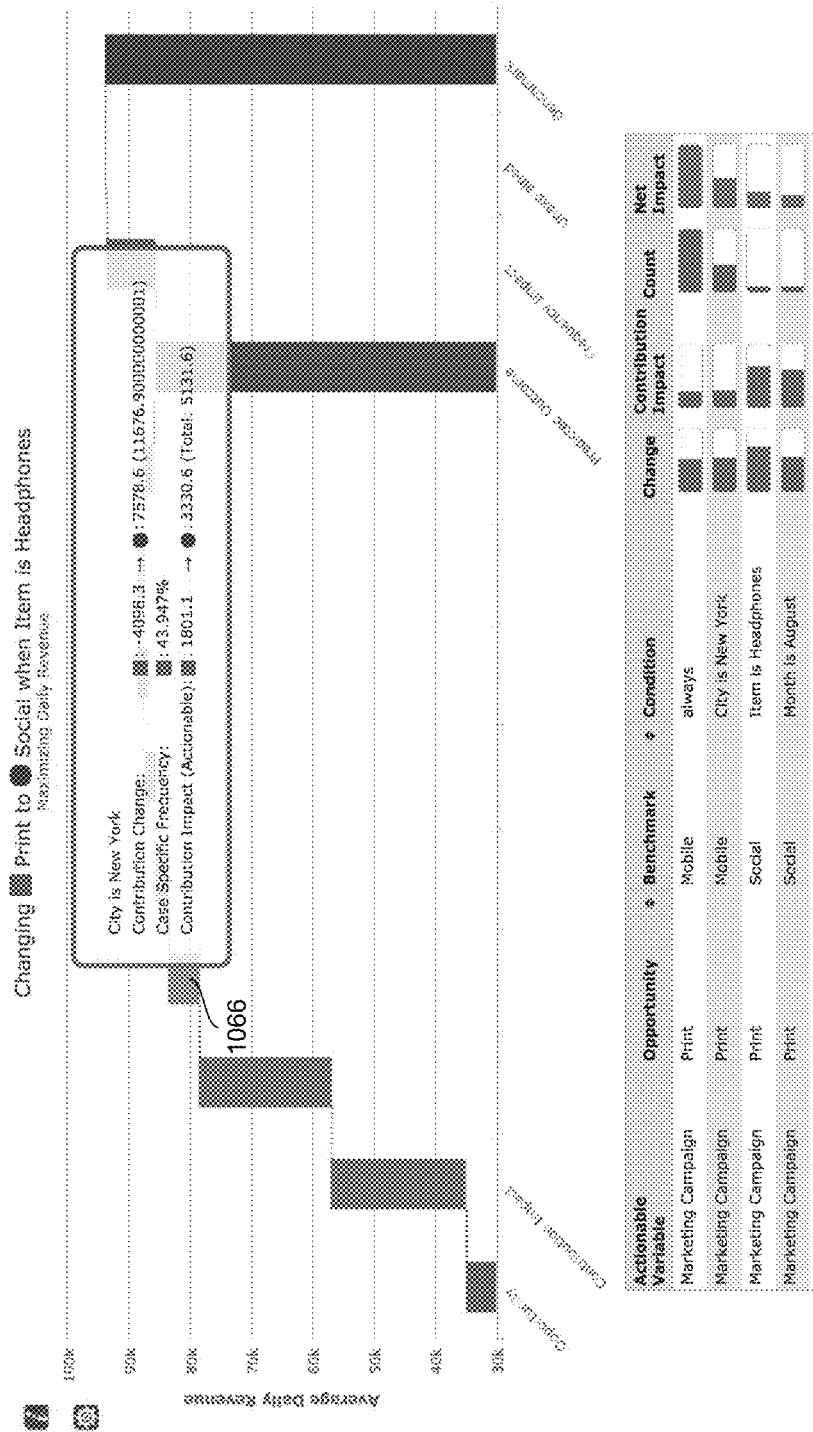

As shown in FIG. 10F, revenue 1055 is the starting point of the walk-through (revenue when marketing campaign is print; item is headphones). As shown in FIG. 10G, revenue 1057 is where the revenue could end up if the candidate change was made, i.e., if the observations where campaign was Print for Headphones had instead been Social. FIG. 10H illustrates the portion 1064 of the overall change that is due to changing from print to social specifically for Headphones, which affects 100% of the observations in the candidate change. FIG. 10I illustrates the portion 1065 of the overall change that is due to changing from print to social in general, irrespective of the item being headphones, which also affects 100% of the observations in the candidate change. FIG. 10J illustrates the portion 1066 of the overall change that is due to changing from print to social specifically for Headphones in New York, but note this factor only affects 43.9% of the observations in the candidate change.

Figure 10K:
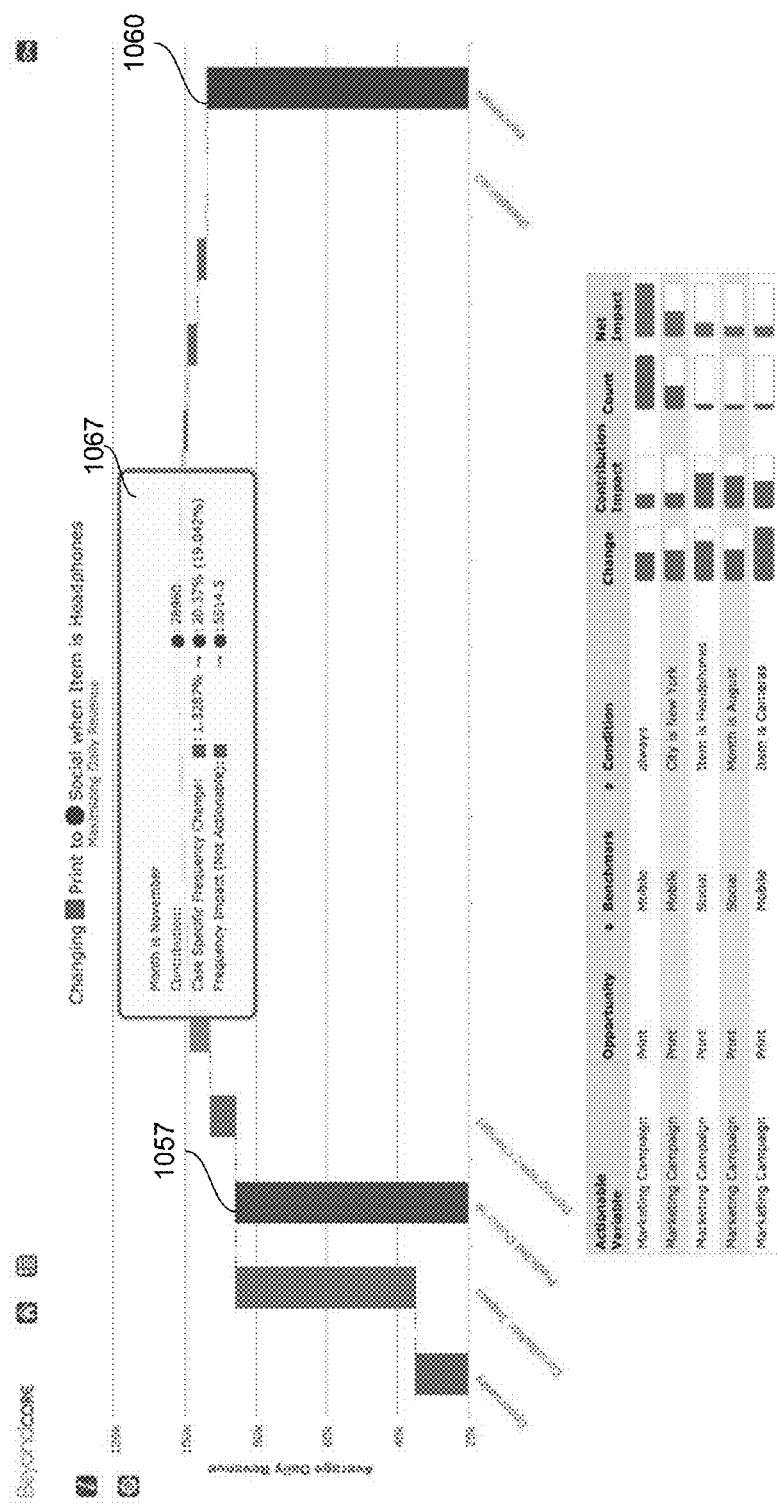

FIG. 10K illustrates that a similar analysis can be made when comparing revenue 1057 and revenue 1060, which accounts for differences in population between the two variable combinations. However, this difference is not actionable by just changing the values of the specified actionable variable.

Predictive Graphs

Figure 11A:
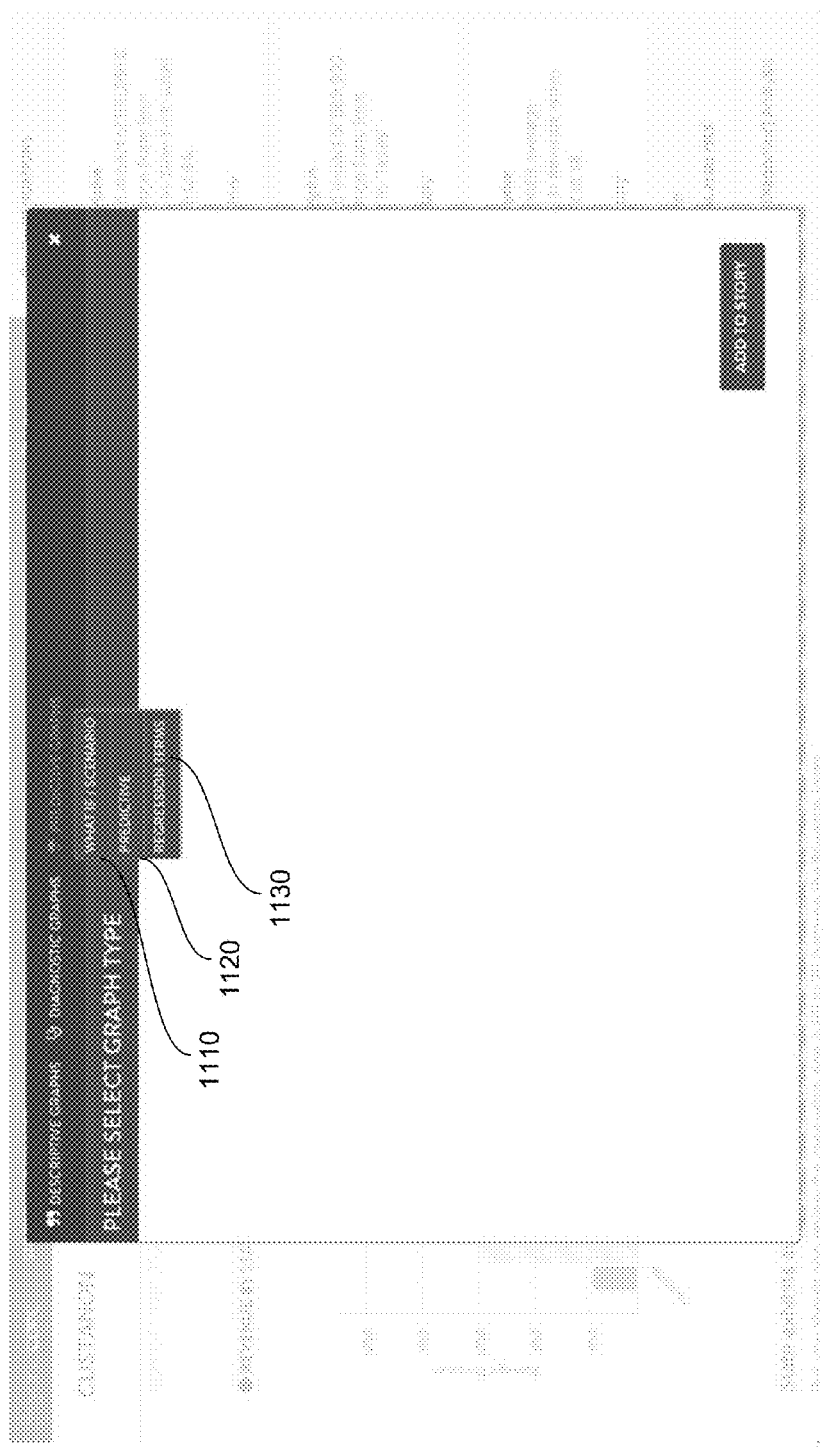
FIGS. 11A-11D are screen shots illustrating predictive graphs that contain an outcome of a predictive analysis, according to some embodiments.

FIGS. 11A-11D illustrate predictive graphs, according to some embodiments. BeyondCore automatically creates a predictive model but the untrained user can manually choose specific variables to include or exclude from the model. Users can also specify any predictive scenario to evaluate. Referring to FIG. 11A, the user may select 1110 a what if scenario to view graphs comparing specified "what if" scenarios where BeyondCore compares the predicted outcomes for different values of a what-if variable under specified conditions. The user may also select 1120 to view visual representations of predictive models for specific variable combinations or select 1130 to view the coefficient terms of the regression model.

Figure 11B:
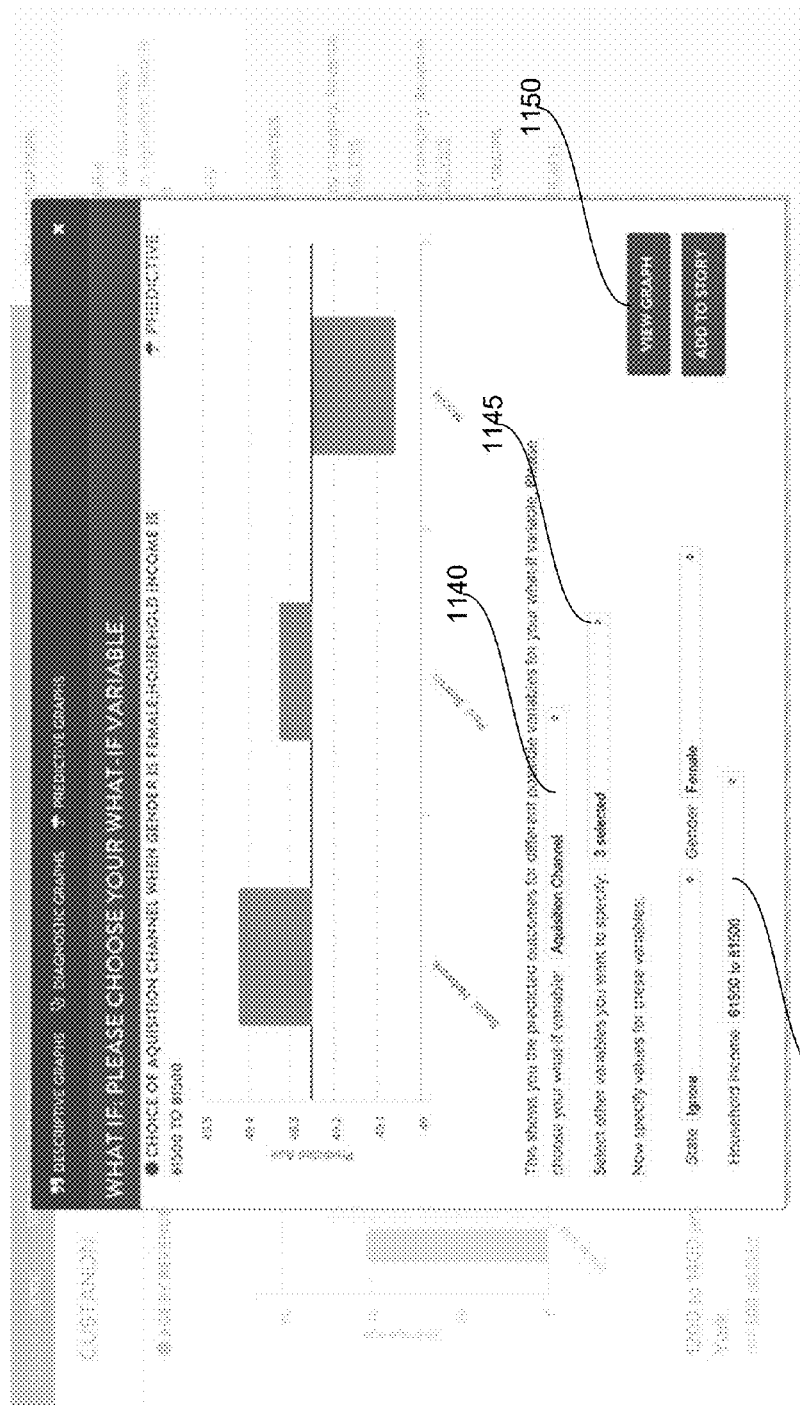

Referring to FIG. 11B, what-if scenario analysis enables a user to compare predicted outcomes for different values of a variable under specified conditions. The user interface may allow the user to select 1140 the variable that the user wishes to compare different outcomes for (e.g., in the example of 1140, what acquisition channel should the user use?). The user may also choose 1145 the variables to constrain based on. The user may also click 'View Graph' 1150 to see the analysis. The user may also specify 1155 conditions under which the user wants to compare the what-if variable (in this case, Females with income between 61500 and 81500).

Figure 11C:
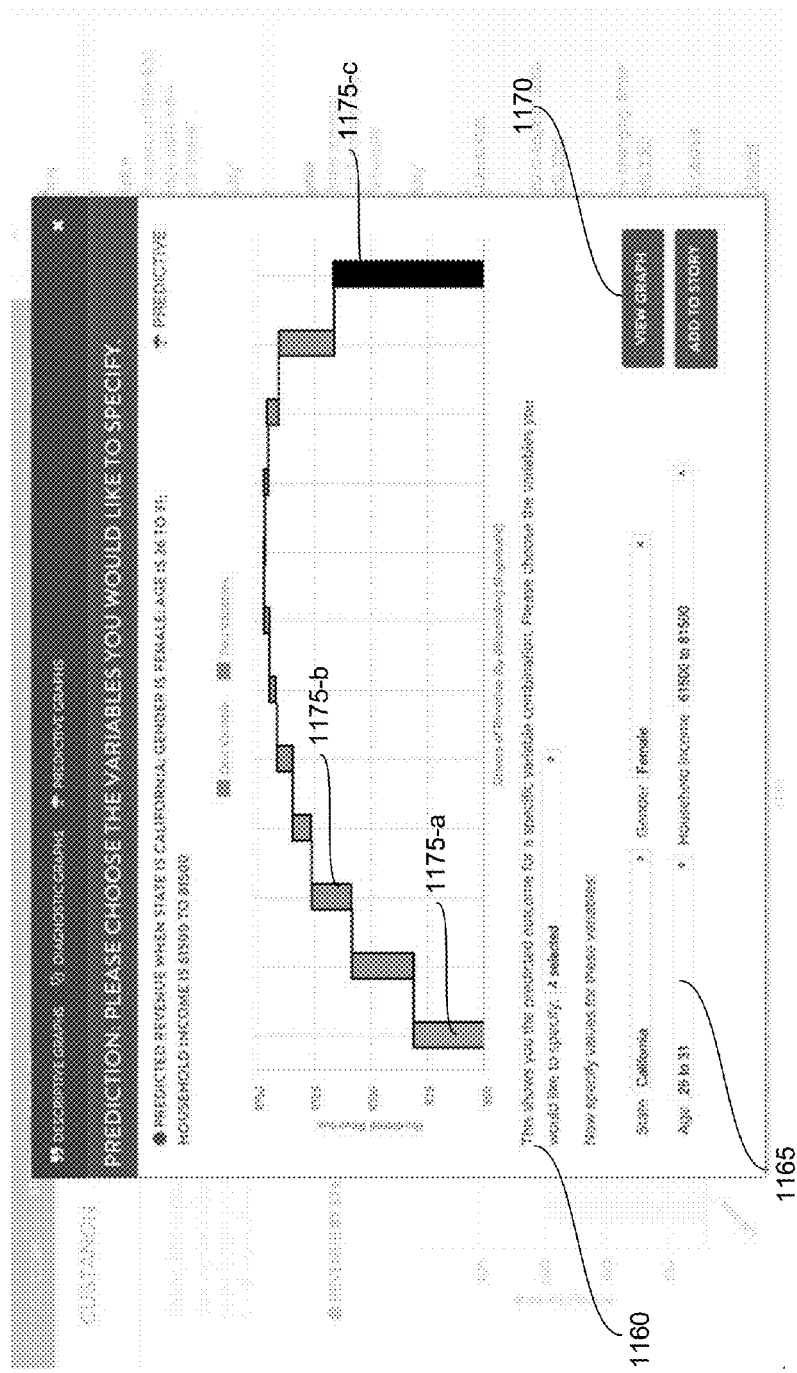

As illustrated in FIG. 11C, the Predictive Analysis shows the expected outcome under specified circumstances and explains the reasons behind the prediction. The user may additionally select variables to constrain based on 1160, conditions 1165 for which to predict the outcome (in this case, Californian females who are 20 to 25 years old with income between 61500 and 81500), and an option to view the graph with the analysis 1170. The graph itself includes the overall average 1175-*a*, reasons behind the prediction 1175-*b* (the user may hover or mouse over to see additional details), and predicted outcome 1175-*c*. The prediction is based on the automatically learned features of the data set, the automated analysis approach for which has been described above.

Figure 11D:
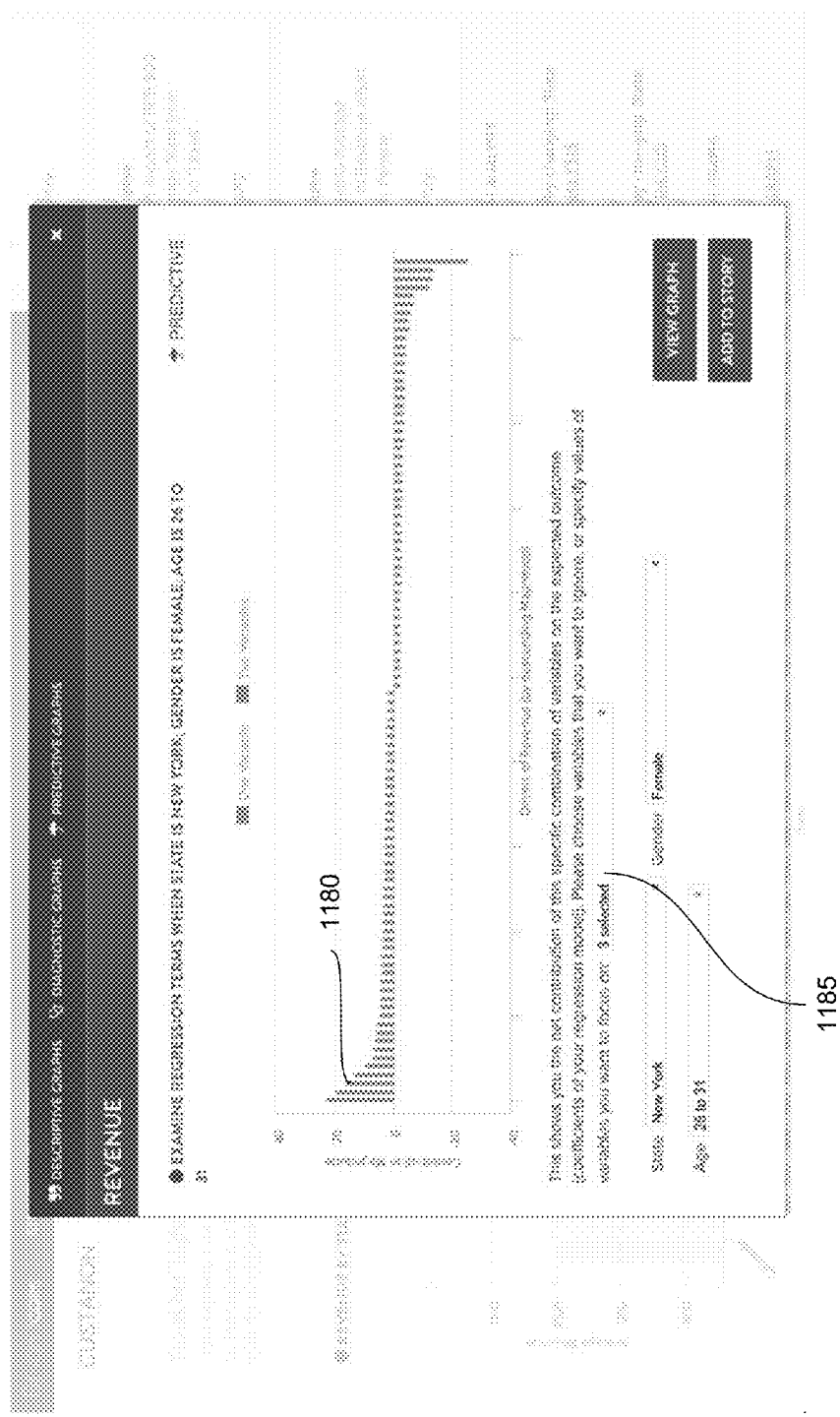

Referring to FIG. 11D, the Regression Terms shows how each variable combination affects the expected outcome. These are the "coefficients" of the underlying regression model. For each identified group, 1180 shows how much it positively or negatively contributes to the predicted outcome. The controls 1185 allow the user to focus on specific sub groups.

Drivers of Difference

Figure 12A:
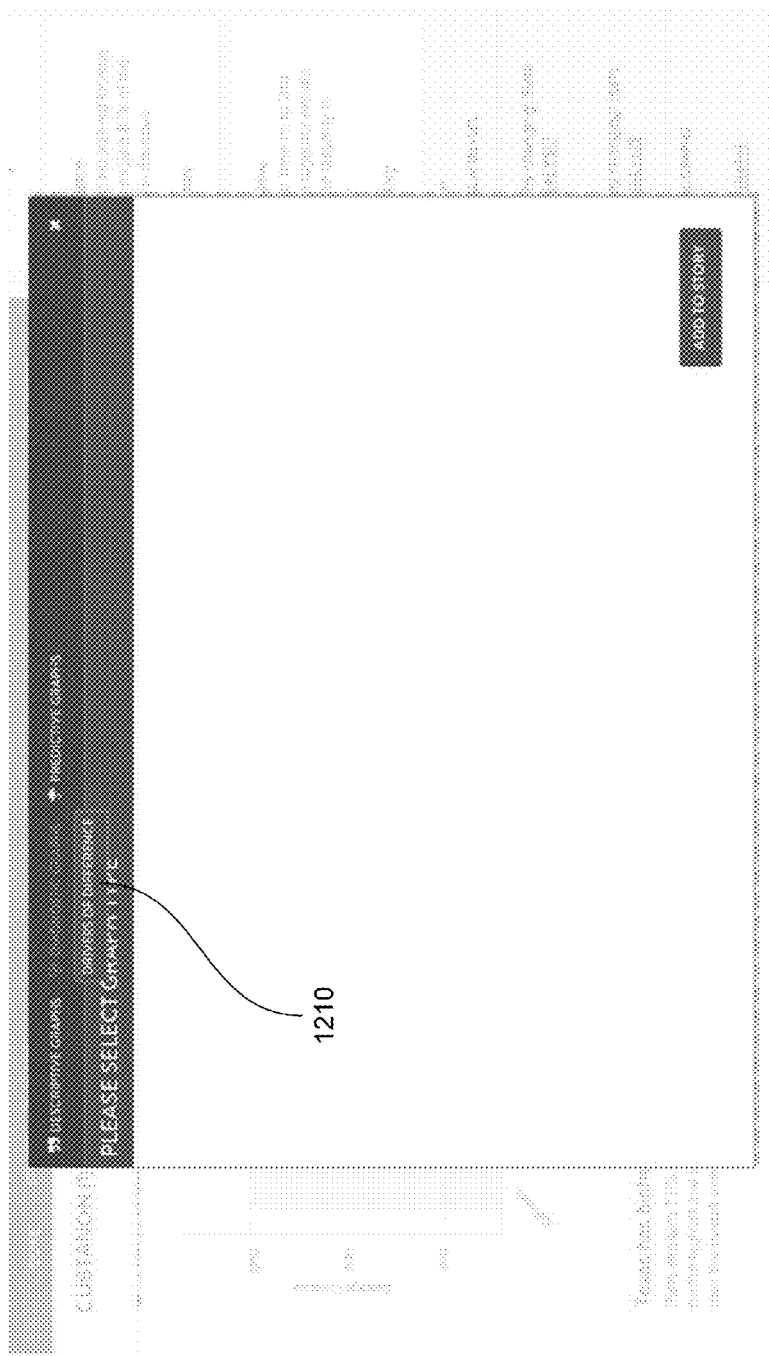
FIGS. 12A-12C are screen shots illustrating analysis comparing two subsets of a data set, according to some embodiments.
Figure 12B:
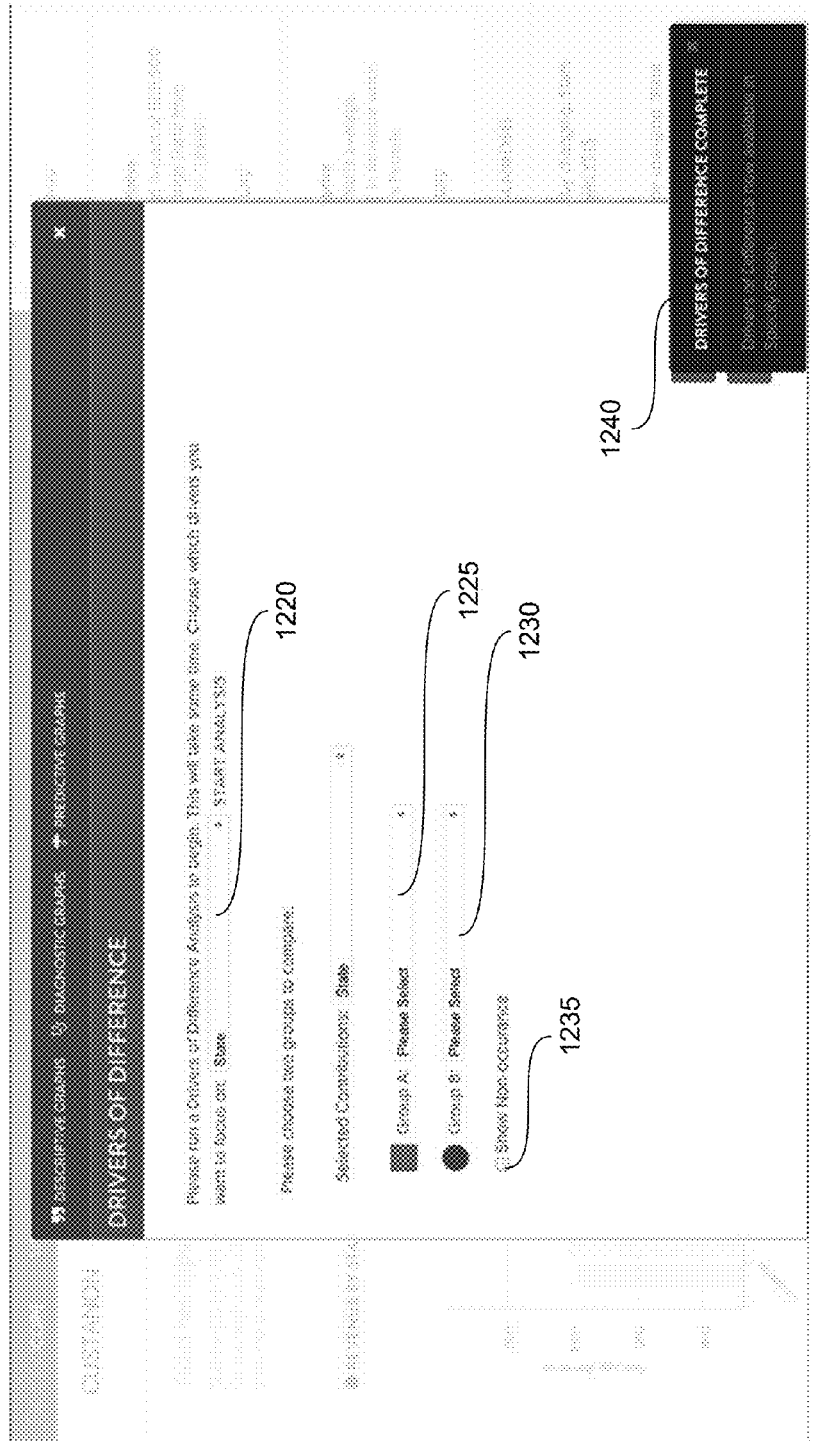
Figure 12C:
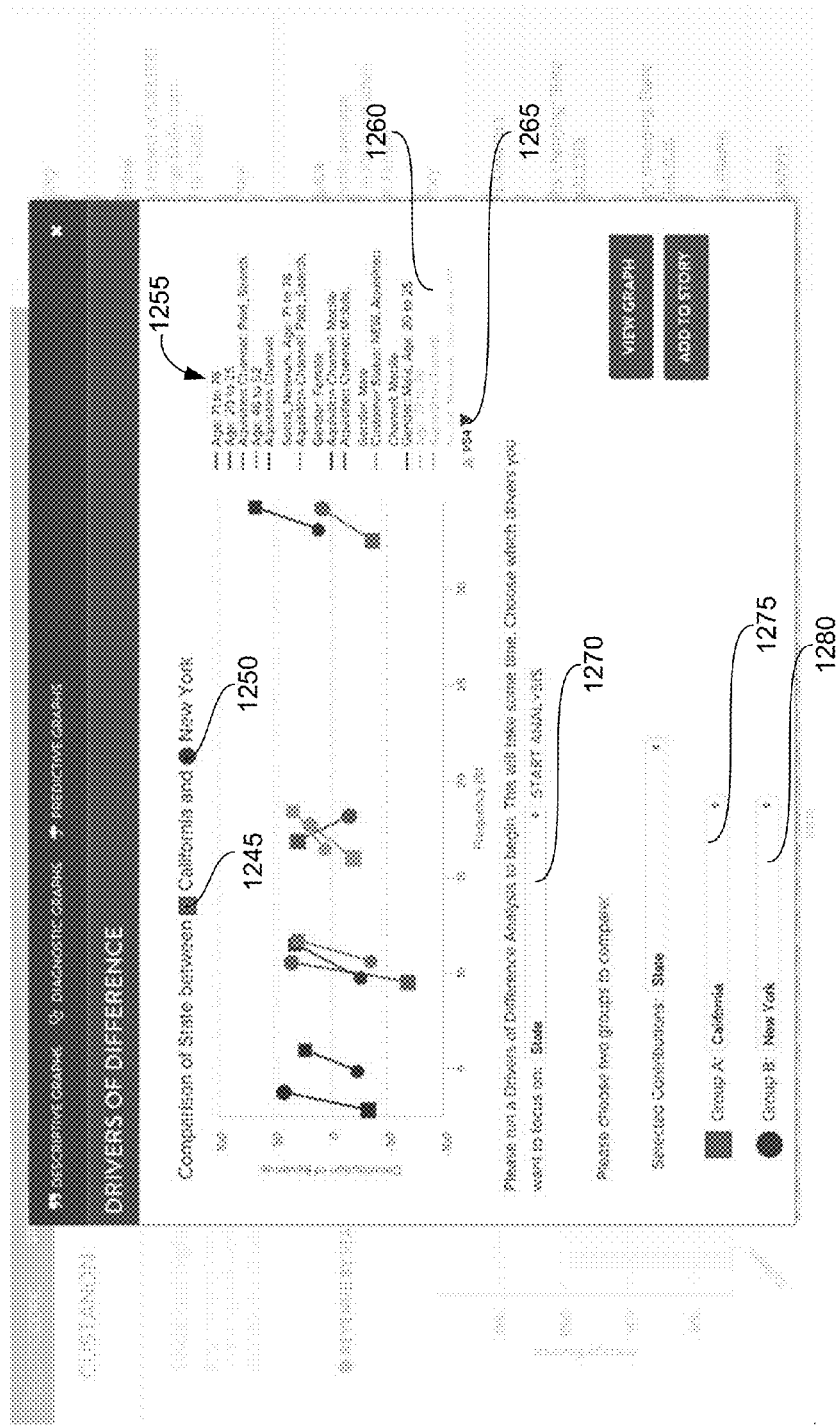

FIGS. 12A-12C illustrate a Drivers of Difference report which provides a rank-ordered list of factors that most impact the difference in average outcomes between selected groups. In the example illustrations of FIGS. 12B-12C, the drivers of difference analysis and resulting report (FIG. 12C) provide a tool for analyzing differences in an outcome (e.g., revenue, in this case, as shown on the Y-axis of FIG. 12C) between a subset A from a data set (e.g., in this case, Group A: state=California 1245) for a process and a subset B from the same data set (e.g., in this case, Group B: state=New York 1250). The drivers of difference report may be provided as a type of diagnostic graph (e.g., by selecting 1210 in FIG. 12A), or separately.

Referring to FIG. 12B, to access the Drivers of Difference page, the user chooses the groups to compare. The user may change the comparison variable 1220, specify the first comparison group 1225, and change the second comparison group 1230. The user may also choose (e.g., by checking box 1235) to include or exclude factors that occur for only one of the two groups. Notification 1240 indicates that drivers of difference graphs have been prepared for the selected groups and are ready for viewing.

FIG. 12C includes an illustration of differences in outcome (revenue) between two subsets of data defined by two different values of a test variable (in this case "state")—the two different values being California and New York. The difference in outcome (revenue) is decomposed by corresponding pairs of variable combinations defined by common values of other variables (Age, Acquisition Channel, Gender, Customer Status, and so on). Referring to FIG. 12C, the Drivers of Difference page provides a rank-ordered list 1255 of factors that most impact the difference in outcomes (in this case, revenue) between the selected groups (in this case, CA and NY). This analysis is performed by comparing corresponding variable combinations. Table 4 lists some of the variable combinations used in the analysis shown in FIG. 12C. Differences in behavior and population between the pairs can be evaluated for many different pairs. This can be used to determine which factors drive the differences between the two subsets.

TABLE 4

Examples of Pairs of Variable Combinations for Drivers of Difference

| | Contributing Factor | Subset A Variable Combination (CA) | Subset B Variable Combination (NY) |
|---|---|---|---|
| Example Pair 1 | Age: 71 to 76 | {Age = 71 to 76; State = CA} | {Age = 71 to 76; State = NY} |
| Example Pair 2 | Acq Ch: Paid Search | {Acq Ch = Paid Search; State = CA} | {Acq Ch = Paid Search; State = NY} |
| Example Pair 3 | Acq Ch: Paid Search; Gender: Female | {Acq Ch = Paid Search; Gender = Female; State = CA} | {Acq Ch = Paid Search; Gender = Female; State = NY} |

In some embodiments, this allows the user to ask questions like what were the key drivers for the difference in average revenue between last quarter and the current one and BeyondCore looks at all possible factors and points out things like we had 5% increase in sales transactions in Boston but the average price dropped by $5. Both the frequency and statistical impact of differences between the factors are considered in the analysis and are shown in the graphical plot of FIG. 12C. The graph of FIG. 12C illustrates markers for the first comparison group 1245 and for the second comparison group 1250, and a rank-ordered list 1255 of the top differentiators between the groups. The user may interact with the graph and/or the ordered list displayed adjacent to the graph to show or hide a factor 1260, scroll to view a next page of factors 1265, change the comparison variable 1270, change the first comparison group 1275, or change the second comparison group 1280.

Additionally, in some embodiments, techniques described herein (e.g., with reference to Drivers of Difference and Prescriptive Analysis) can be used to statistically back out the impact of the differences in population that may otherwise limit methods of A/B testing that rely on test and control sets having approximately identical population characteristics.

For example, when testing out two different marketing campaigns A and B on two groups of prospects X and Y, some methods of A/B testing may rely on X and Y having approximately the same percentage of 18 year olds and the same percentage of males. However, upon looking at variable combinations, such methods may be limited by discrepancies in populations of the variable combinations. For instance, the proportion of 18 year old men might be different in X and Y even though the two groups had substantially identical proportions of 18 year olds and of men individually. Under such circumstances, if the marketing campaigns A and B have a different impact for 18 year old men specifically, the A/B test may need to be redone after ensuring that the proportions of 18 year old men in both test groups are substantially the same.

In contrast, the techniques disclosed herein (e.g., with reference to Drivers of Difference and Prescriptive Analysis) can be used to statistically back out the impact of the differences in population for 18 year old men. Since the analysis model individually learns the behavior and population impact of each variable combination on the outcome being analyzed, the analysis can evaluate hypothetical questions and scenarios such as what would have been the outcome for marketing campaigns A and B if groups X and Y had substantially the same percentage of 18 year old men. This enables gleaning statistically sound results for A/B testing even when the population characteristics of X and Y may not be identical.

Figure 13:
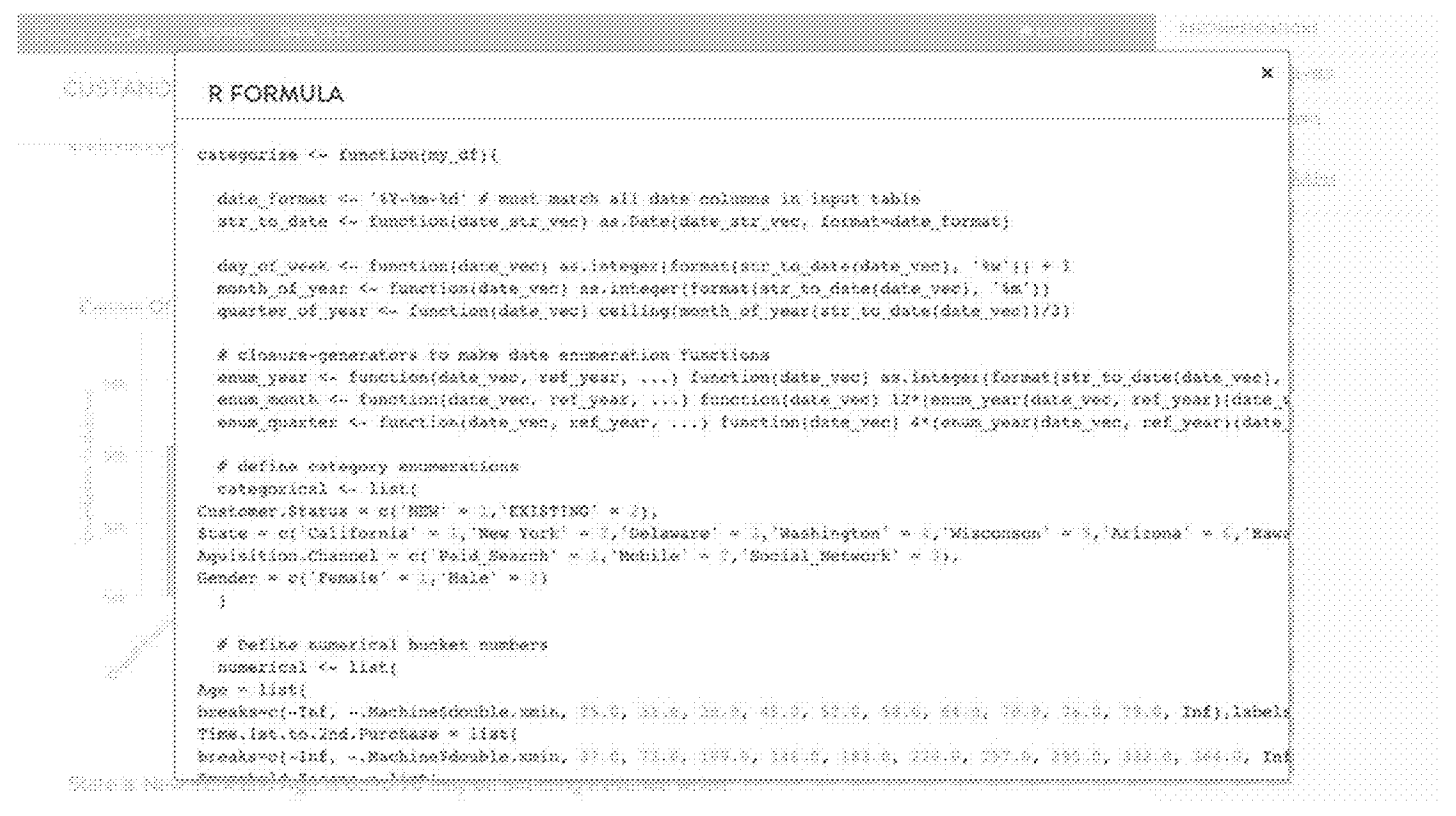

FIG. 13 illustrates illustrative code that could be used for the various models used to generate the graphs and stories described above. Clicking the R Formula button in the Toolbar exports the automatically generated model for the most recent Diagnostic, Predictive or Prescriptive graph the user has seen. This R code (e.g., of FIG. 13) can be used by experts to independently validate the model. The user can copy the R Code to a different development environment and further test or enhance the accuracy of the model. The model can be stored or shared publicly. This is beneficial for academic papers or regulatory/legal compliance.

While the preferred embodiments of the invention have been illustrated and described, it will be clear that it is not limited to these embodiments only. Numerous modifications, changes, variations, substitutions and equivalents will be apparent to those skilled in the art, without departing from the spirit and scope of the invention, as described in the claims.

What is claimed is:

1. A method for identifying causes of time variations in a data set for a process, the method comprising a computer system automatically performing the following:
   processing a data set containing observations of the process taken at different times, the observations expressed as values for a plurality of variables and for the outcome, wherein processing the data set determines behaviors for different variable combinations at different times with respect to the outcome, the variable combinations defined by values for one or more of the variables;
   estimating time variations in the contributions of the variable combinations to the outcome, based on time variations in the behaviors of variable combinations and also based on time variations in populations of the variable combinations; and
   reporting time variations based on the estimated time variations for the variable combinations.

2. The method of claim 1, wherein determining behaviors comprises determining cyclical variations in behaviors for different variable combinations with respect to the outcome.

3. The method of claim 1, further comprising:
   receiving from a user an identification of cyclical variations in behaviors, wherein determining behaviors comprises accounting for such cyclical variations in behaviors for different variable combinations with respect to the outcome.

4. The method of claim 1, further comprising:
   determining whether the estimated time variations in the contributions of the variable combinations to the outcome represent deviations from a norm or evolutions of the norm.

5. The method of claim 1, further comprising:
   receiving from a user an identification of whether the reported time variations represent deviations from a norm or evolutions of the norm.

6. The method of claim 5, further comprising:
   adjusting the determined behaviors for different variable combinations based on whether reported time variations represent deviations from a norm or evolutions of the norm.

7. The method of claim 1, wherein estimating time variations in the contributions of the variable combinations to the outcome comprises:
   estimating contributions of the variable combination at a first time by multiplying the behavior of the variable combination at the first time by the population of the variable combination at the first time;
   estimating contributions of the variable combination at a second time by multiplying the behavior of the variable combination at the second time by the population of the variable combination at the second time; and
   computing a difference between the estimated contributions.

8. The method of claim 1, wherein reporting time variations comprises:
   based on the estimated contributions, automatically generating an animated briefing comprising a sequence of graphs describing the reported time variations.

9. The method of claim 8, wherein graphs correspond to different reported time variations, the graphs depicting first outcome values at the first time, second outcome values at the second time, and predicted differences in the outcome between the first time and the second time.

10. The method of claim 8, wherein the animated briefing is interactive, and the sequence of graphs depends on a user's interaction with the animated briefing.

11. The method of claim 10, wherein, upon a user's activation of a reported time variation, the animated briefing presents a supplementary graph explaining contributions of different variable combinations to the reported time variation.

12. The method of claim 8, wherein the animated briefing includes visual tool-tips explaining the reported time variations.

13. The method of claim 8, wherein the animated briefing includes oral narratives explaining the reported time variations.

14. The method of claim 1, wherein reporting time variations comprises, upon a user's activation of a reported time variation, presenting a supplementary graph explaining contributions of different variable combinations to the reported time variation.

15. The method of claim 1, wherein reporting time variations comprises reporting time variations in an order according to impact of the reported time variations.

16. The method of claim 1, wherein reporting time variations comprises presenting a listing of reported time variations.

17. The method of claim 1, wherein behaviors for variable combinations with respect to the outcome are expressed as regression coefficients, as correlation coefficients or as net-effect impact net of all other variables.

18. The method of claim 1, wherein population is expressed as counts of observations, as frequency of observations, as percentage of overall population, or as relative frequencies of observations.

19. The method of claim 1, wherein the outcome is derived from one or more observed variables.

20. A computer program product for identifying causes of time variations in a data set for a process, the computer program product comprising a non-transitory machine-readable medium storing computer program code for performing a method, the method comprising:
   processing a data set containing observations of the process taken at different times, the observations expressed as values for a plurality of variables and for the outcome, wherein processing the data set determines behaviors for different variable combinations at different times with respect to the outcome, the variable combinations defined by values for one or more of the variables;

estimating time variations in the contributions of the variable combinations to the outcome, based on time variations in the behaviors of variable combinations and also based on time variations in populations of the variable combinations; and reporting time variations based on the estimated time variations for the variable combinations.

* * * * *